US010664722B1

(12) United States Patent
Sharma et al.

(10) Patent No.: US 10,664,722 B1
(45) Date of Patent: May 26, 2020

(54) IMAGE PROCESSING ARRANGEMENTS

(71) Applicant: Digimarc Corporation, Beaverton, OR (US)

(72) Inventors: Ravi K. Sharma, Portland, OR (US); Tomas Filler, Beaverton, OR (US); Utkarsh Deshmukh, Hillsboro, OR (US); Vahid Sedighianaraki, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 130 days.

(21) Appl. No.: 15/726,290

(22) Filed: Oct. 5, 2017

Related U.S. Application Data

(60) Provisional application No. 62/556,276, filed on Sep. 8, 2017, provisional application No. 62/456,446, filed on Feb. 8, 2017, provisional application No. 62/426,148, filed on Nov. 23, 2016, provisional application No. 62/418,047, filed on Nov. 4, 2016, provisional application No. 62/414,368, filed on Oct. 28, 2016, provisional application No. 62/404,721, filed on Oct. 5, 2016.

(51) Int. Cl.
*G06K 9/62* (2006.01)
*G06Q 30/06* (2012.01)
*G06N 3/04* (2006.01)
*G06N 3/08* (2006.01)

(52) U.S. Cl.
CPC ......... *G06K 9/6256* (2013.01); *G06K 9/6201* (2013.01); *G06K 9/628* (2013.01); *G06Q 30/0641* (2013.01); *G06N 3/04* (2013.01); *G06N 3/08* (2013.01)

(58) Field of Classification Search
CPC .... G06K 9/6256; G06K 9/6201; G06K 9/628; G06Q 30/0641; G06N 3/08; G06N 3/04
See application file for complete search history.

(56) References Cited

U.S. PATENT DOCUMENTS

| 5,903,884 | A | 5/1999 | Lyon | |
|---|---|---|---|---|
| 1,000,786 | A1 | 6/2018 | Pereira | |
| 2013/0308045 | A1 | 11/2013 | Rhoads | |
| 2014/0108309 | A1* | 4/2014 | Frank | G06Q 10/00 706/12 |
| 2015/0055855 | A1 | 2/2015 | Rodriguez | |
| 2015/0161482 | A1* | 6/2015 | Preetham | G06K 9/6256 382/159 |
| 2015/0170001 | A1* | 6/2015 | Rabinovich | G06K 9/66 382/110 |

(Continued)

OTHER PUBLICATIONS

Babenko, et al, Neural Codes for Image Retrieval, arXiv preprint, arXiv:1404.1777 (2014).

(Continued)

*Primary Examiner* — Solomon G Bezuayehu
(74) *Attorney, Agent, or Firm* — Digimarc Corporation

(57) ABSTRACT

Aspects of the detailed technologies concern training and use of neural networks for fine-grained classification of large numbers of items, e.g., as may be encountered in a supermarket. Mitigating false positive errors is an exemplary area of emphasis. Novel network topologies are also detailed—some employing recognition technologies in addition to neural networks. A great number of other features and arrangements are also detailed.

26 Claims, 42 Drawing Sheets

ITEM A

ITEM B

ITEM C

. . .

(56) References Cited

U.S. PATENT DOCUMENTS

| | | | |
|---|---|---|---|
| 2015/0242707 A1* | 8/2015 | Wilf | G06K 9/00302 |
| | | | 382/159 |
| 2015/0278224 A1 | 10/2015 | Jaber | |
| 2016/0140425 A1 | 5/2016 | Kulkarni | |
| 2016/0267358 A1 | 9/2016 | Shoaib | |
| 2016/0379091 A1* | 12/2016 | Lin | G06K 9/00724 |
| | | | 382/156 |
| 2017/0294010 A1* | 10/2017 | Shen | G06T 7/0002 |
| 2017/0316281 A1 | 11/2017 | Criminisi | |
| 2018/0032844 A1* | 2/2018 | Yao | G06K 9/00362 |
| 2018/0165548 A1* | 6/2018 | Wang | G06N 3/084 |
| 2019/0057314 A1* | 2/2019 | Julian | G06N 20/00 |

OTHER PUBLICATIONS

Bengio, et al, Curriculum Learning, Proceedings of the 26th ACM Annual International Conference on Machine Learning, pp. 41-48, 2009.

Felzenszwalb, et al, Object Detection with Discriminatively Trained Part-Based Models, IEEE Transactions on Pattern Analysis and Machine Intelligence, pp. 1627-45. 2010.

Goodfellow et al, Explaining and Harnessing Adversarial Examples, arXiv preprint, arXiv:1412.6572v3, 2015.

Krizhevsky, et al, Imagenet Classification with Deep Convolutional Neural Networks, Advances in Neural Information Processing Systems, 2012.

Kurakin, Adversarial Examples in the Physical World, arXiv preprint arXiv:1607.02533v3, Nov. 4, 2016.

LeCun et al, Handwritten Digit Recognition with a Back-Propagation Network, Advances in Neural Information Processing Systems, pp. 396-404, 1990.

Rumelhart et al, Learning Representations by Back-Propagating Errors, Nature, 323, 533-536, 1986.

Selvaraju et al, Visual Explanations from Deep Networks via Gradient-based Localization, arXiv preprint, arXiv:1610.02391v3, Mar. 21, 2017.

Shrivastava et al, Training Region-based Object Detectors with Online Hard Example Mining, arXiv preprint, arXiv:1604.03540v1, Apr. 12, 2016.

Simonyan, et al, Deep Inside Convolutional Networks: Visualising Image Classification Models and Saliency Maps, arXiv preprint, arXiv:1312.6034v2, 2014.

Springenber, et al, Striving for Simplicity: the All Convolutional Net, arXiv preprint, arXiv:1412.6806v3, 2015.

Szegedy, et al, Going Deeper with Convolutions. IEEE Conference on Computer Vision and Pattern Recognition, pp. 1-9, 2015.

Szegedy, et al, Intriguing Properties of Neural Networks, arXiv preprint, arXiv:1312.6199v4, 2014.

Wang, et al, A-Fast-RCNN: Hard Positive Generation via Adversary for Object Detection, arXiv preprint, arXiv:1704.03414v1, Apr. 11, 2017.

Wei, et al, Object Region Mining with Adversarial Erasing: A Simple Classification to Semantic Segmentation Approach, arXiv preprint, arXiv:1703.08448v2, Mar. 27, 2017.

Zhou, et al, Learning Deep Features for Discriminative Localization, IEEE Conference on Computer Vision and Pattern Recognition, pp. 2921-2929, Jun. 26, 2016.

Bazzani, et al, Self-Taught Object Localization with Deep Networks, arXiv preprint 1409:3964v7, 2016.

Cinbis, et al, Weakly supervised object localization with multi-fold multiple instance learning, arXiv:1503.00949, 2015.

Dai, et al, Convolutional Feature Masking for Joint Object and Stuff Segmentation, IEEE Conference on Computer Vision and Pattern Recognition, pp. 3992-4000, 2015.

Dai, R-fcn: Object detection via region-based fully convolutional networks, Advances in Neural Information Processing Systems, pp. 379-387, 2016.

Girshick, Fast R-CNN, Proceedings of the IEEE International Conference on Computer Vision, pp. 1440-1448, 2015.

Gupta, et al, Learning rich features from RGB-D images for object detection and segmentation, European Conference on Computer Vision, pp. 345-360, 2014.

Hariharan, et al, Simultaneous Detection and Segmentation, arXiv preprint 1407.1808v1, 2014.

Jiang, et al, Salient Object Detection: A Discriminative Regional Feature Integration Approach, IEEE Conference on Computer Vision and Pattern Recognition, pp. 2083-2090, 2013.

Kolesnikov, et al, Seed, Expand and Constrain: Three Principles for Weakly-Supervised Image Segmentation, arXiv preprint 1603:06098v3, 2016.

Krizhevsky, et al, Imagenet classification with deep convolutional neural networks, Advances in Neural Information Processing Systems, pp. 1097-1105, 2012.

Oquab, et al, Is Object Localization for Free?—Weakly-Supervised Learning with Convolutional Neural Networks, IEEE Conference on Computer Vision and Pattern Recognition, pp. 685-694, 2015.

Pathak, et al, Context Encoders: Feature Learning by Inpainting, IEEE Conference on Computer Vision and Pattern Recognition, pp. 2536-2544, 2016.

Sermanet, et al, Overfeat: Integrated recognition, localization and detection using convolutional networks, arXiv preprint arXiv:1312.6229, 2013.

Shrivastava, et al, Training region-based object detectors with online hard example mining, Proceedings of the IEEE Conference on Computer Vision and Pattern Recognition, pp. 761-769, 2016.

Song, et al, On Learning to Localize Objects with Minimal Supervision, International Conference on Machine Learning, 2014.

Sung et al, Example-based learning for view-based human face detection, IEEE Transactions on Pattern Analysis and Machine Intelligence, 20(1):39-51, 1998.

Wei, et al, A Simple to Complex Framework for Weakly-Supervised Semantic Segmentation, arXiv preprint 1509:03150v2, 2016.

Zeiler et al, Visualizing and Understanding Convolutional Networks, European Conference on Computer Vision, 2014.

\* cited by examiner

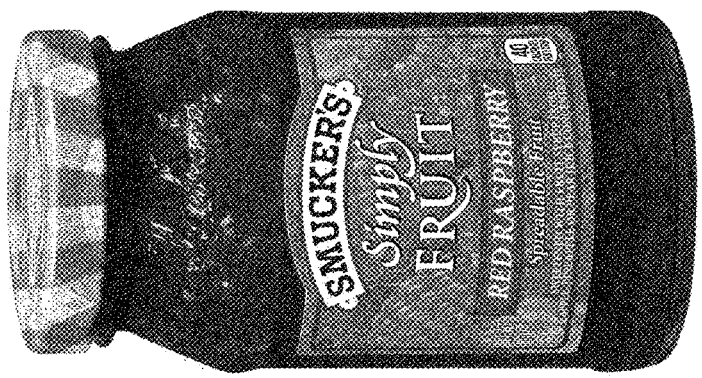
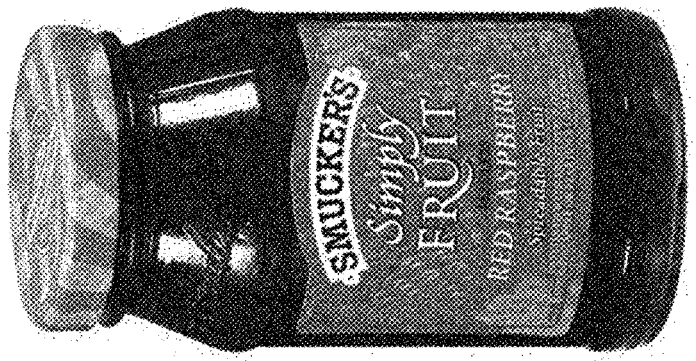
ITEM C
ITEM B
ITEM A
FIG. 1

TRAINING IMAGES FOR CLASS1:

TRAINING IMAGES FOR CLASS2:

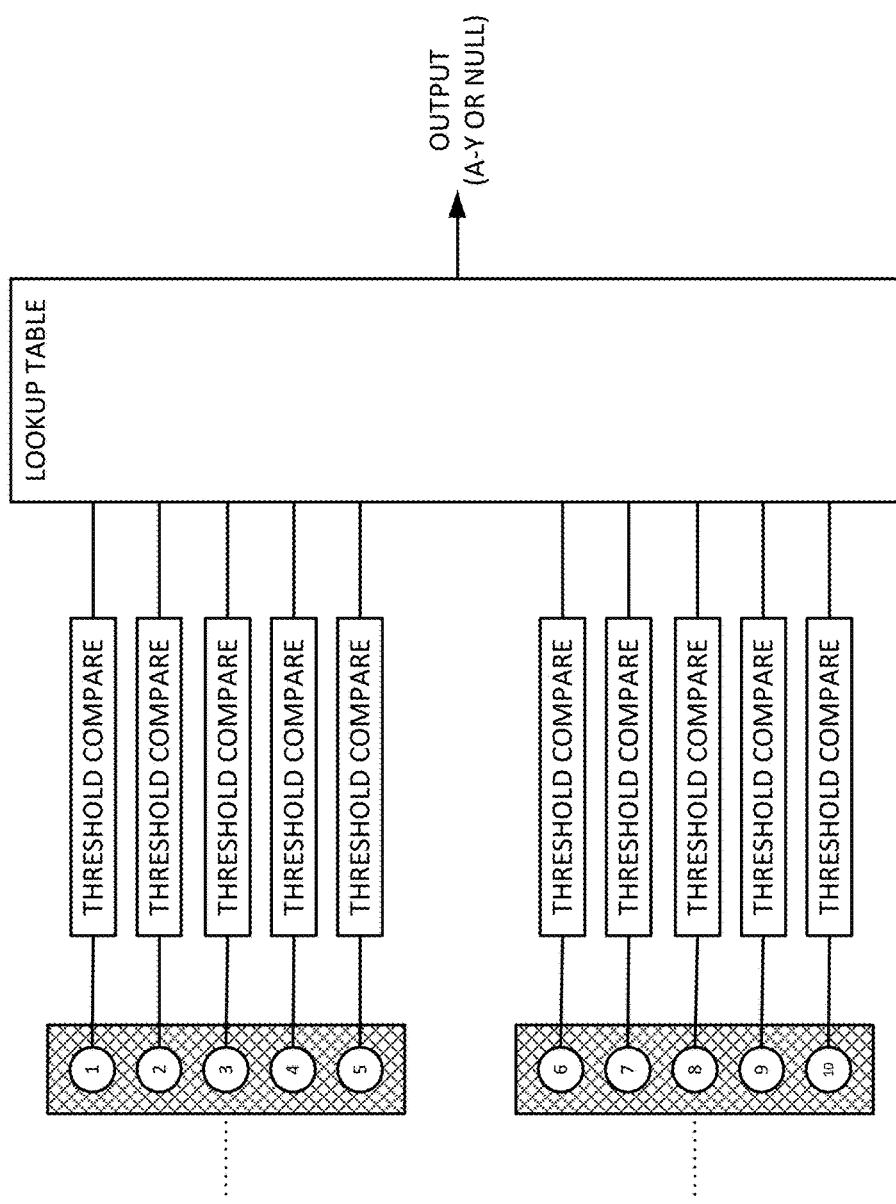

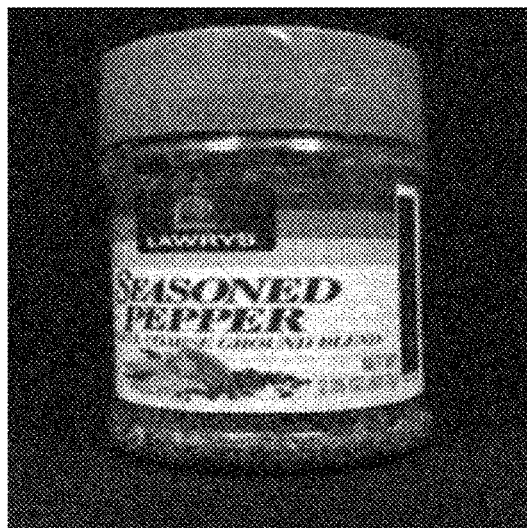
TRAINING IMAGE
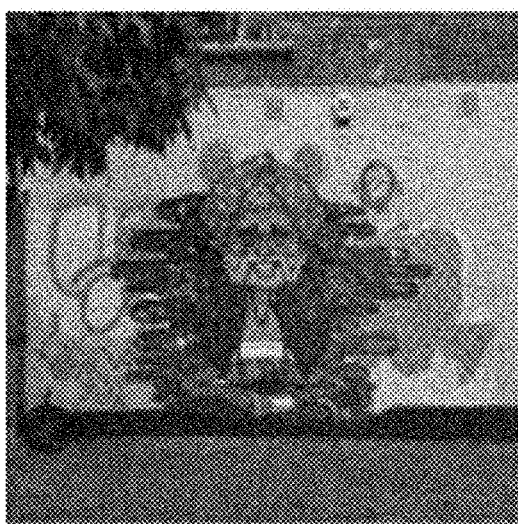
FOOL IMAGE
(PROBABILITY 0.98032)
FIG. 15A
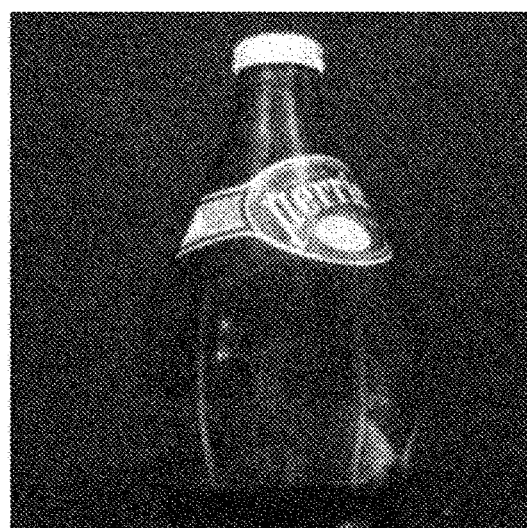
TRAINING IMAGE
FOOL IMAGE
(PROBABILITY 0.999)
FIG. 15B

| NEURON | ITEM |
|---|---|
| 1 | Wheaties cereal (front) 1600027565 |
| 2 | Wheaties cereal (back) 1600027565 |
| 3 | Quaker oatmeal (front) 030000010204 |
| 4 | Quaker oatmeal (120°) 030000010204 |
| 5 | Quaker Oatmeal (240°) 030000010204 |
| 6 | Hinkley Springs water 071091009142 |
| 7 | Erath Pinot Gris wine (front) 084687007019 |
| 8 | Erath Pinot Gris wine (back) 084687007019 |
FIG. 38
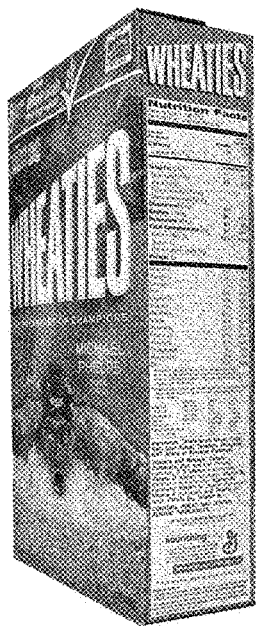
FIG. 39A
FIG. 39B
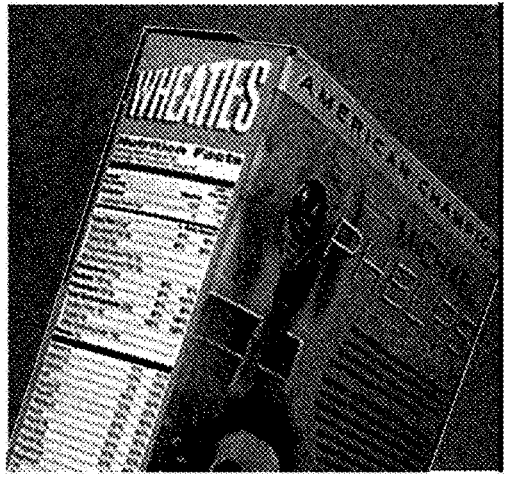
FIG. 40

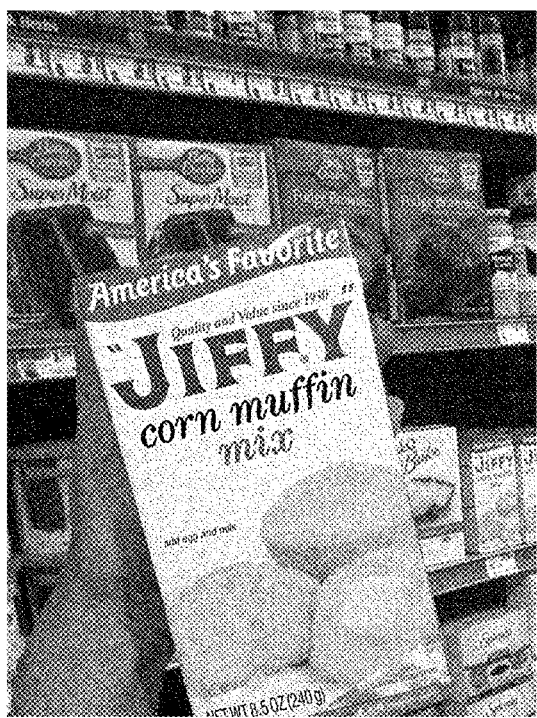
FIG. 41A
FIG. 41B
FIG. 41C
FIG. 41D
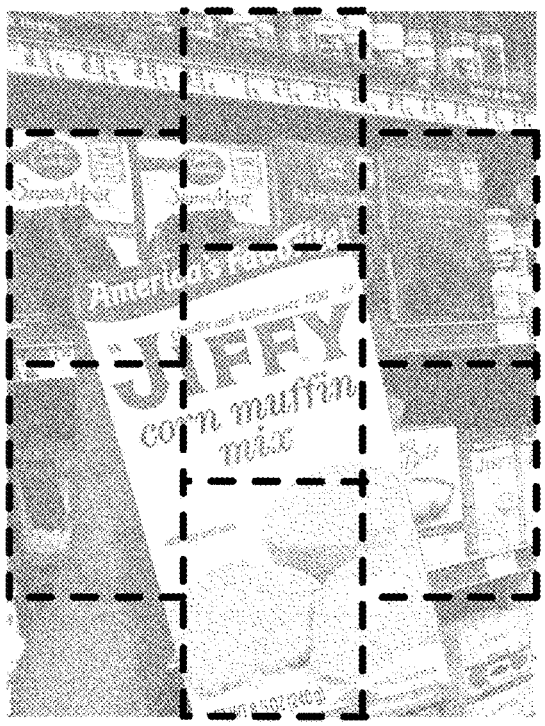

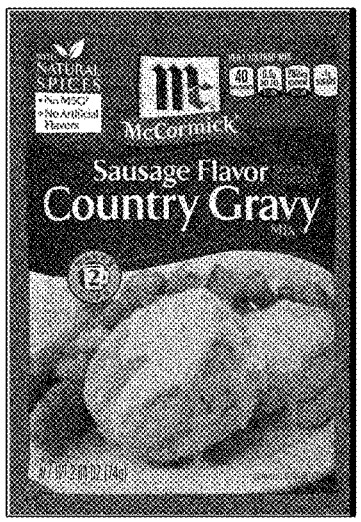
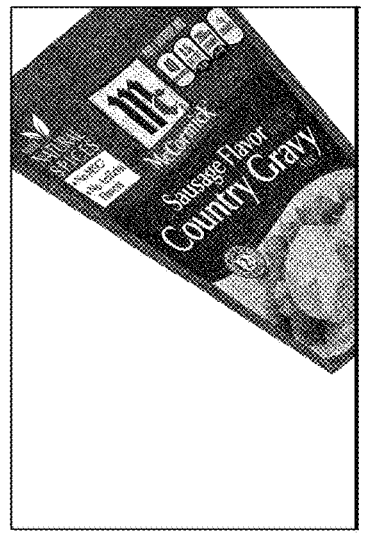
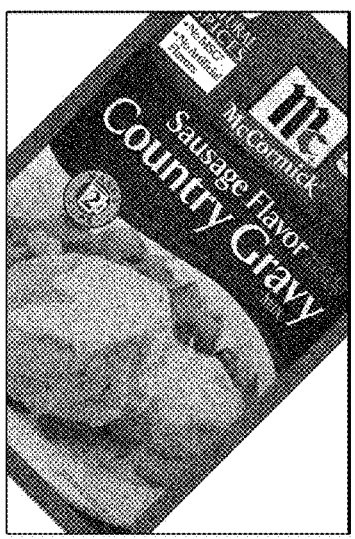
FIG. 45B
FIG. 46C
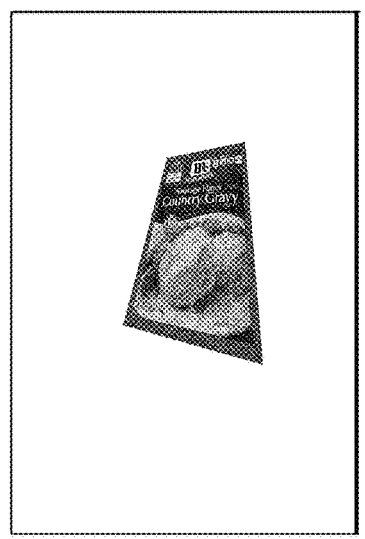
FIG. 46A
FIG. 46D
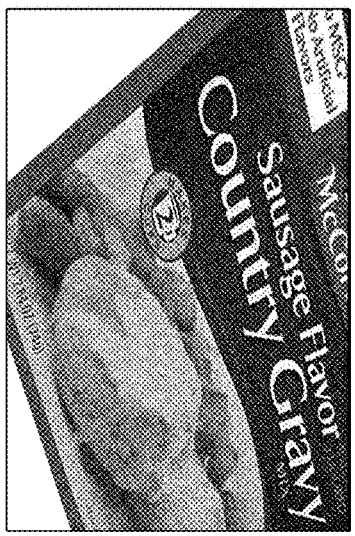
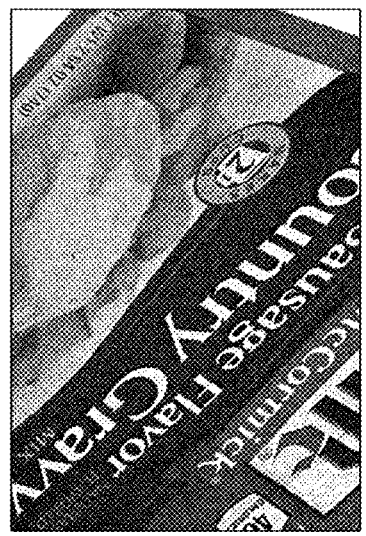
FIG. 46B
FIG. 46E

|  |  | Detection Rate | Misread Rate | False Positive Rate(Flickr-5M) | False Positive rate @ ~65% Detection rate |
|---|---|---|---|---|---|
| Augmented Set | Baseline | 72.57% | 4% | 26.86% | 12.02% |
|  | Class 0 | 66.92% | 3.59% | 1.5% | 0.52% |
|  | No Mem. Class 0 | 68.38% | 1.45% | 0.083% | 0.0476% |
|  | Adv. Class 0 | 59.45% | 0.43% | 0.00433% | 0.01123% |
| Desk Set | Baseline | 69.17% | 5.61% | 13.0% | 6.65% |
|  | Class 0 | 72.16% | 3.54% | 0.88% | 0.65% |
|  | No Mem. Class 0 | 59.36% | 0.58% | 0.0115% | 0.0372% |
|  | Adv. Class 0 | 51.39% | 0.26% | 0.00225% | 0.00976% |

FIG. 48

IMAGE PROCESSING ARRANGEMENTS

RELATED APPLICATION DATA

This application claims priority from provisional applications 62/556,276, filed Sep. 8, 2017, 62/456,446, filed Feb. 8, 2017, 62/426,148, filed Nov. 23, 2016, 62/418,047, filed Nov. 4, 2016, 62/414,368, filed Oct. 28, 2016, and 62/404,721, filed Oct. 5, 2016, and, the disclosures of which are incorporated herein by reference.

TECHNICAL FIELD

The present technology relates to image processing for item recognition, e.g., by a mobile device (e.g., smartphone) or by a checkout scanner in a supermarket.

Background and Introduction Identification of retail products in supermarkets has long been performed with conventional barcodes. Barcodes are advantageous in that they identify products with certainty. However, they pose a bottleneck to checkout, as a checkout clerk must first find the barcode marking on the product, and then manipulate the product so that the marking faces the checkout scanner. Additionally, barcode markings occupy label real estate that brands would rather devote to consumer messaging.

Digital watermarks retain the certainty-of-identification advantage of barcodes, while eliminating the noted disadvantages. Many brands and retailers are making the transition to digital watermarks (i.e., applicant's Digimarc Barcode markings), and most checkout equipment vendors have updated their scanner software to read digital watermarks. However, the production cycle for digitally watermarked packaging prevents an instantaneous switch-over to this improved technology.

While retail inventories are being switched-over to digital watermarking, it would be advantageous if retail clerks could be spared the repetitive chore of first finding a conventional barcode marking on each package, and then manipulating the package to present that marking to a scanner device. Image recognition technologies have previously been considered as alternatives to barcode product identification, but have regularly disappointed due to accuracy concerns.

The accuracy concerns stem from the fact that image based product recognition is based on finding a "best match" between a product presented for checkout, and a library of reference data. Such matching approaches, however, are inherently probabilistic in nature. Referring to FIG. 1, an image recognition system may indicate that there's a 24% probability that an item presented for check-out matches Item A, a 23% probability it matches Item B, a 19% probability it matches item C, and so-on for a dozen or more items. Which is it?

Prior art image recognition systems have not been able to discriminate with the required degree of accuracy among the countless visually-similar products offered in a typical supermarket.

Certain aspects of the present technology concern improvements to image recognition technologies to mitigate the accuracy failings of the prior art. Many of these improvements concern enhancements to deep neural networks.

Other aspects of the present technology concern other improvements to image recognition technologies, e.g., in connection with mobile devices such as smartphones.

For example, many image recognition technologies that show experimental promise do not transfer well into commercial products, such as smartphone apps. Considerations that are critical to everyday users, such as battery life, response speed, and false positive behavior, are often overlooked or discounted in the research world.

Battery life can be improved by performing image recognition away from the mobile handset (e.g., in the "cloud"). But time delays associated with the smartphone establishing a connection over its data network, passing imagery to the cloud, and receiving results back, can be impediments to user satisfaction. In addition, many users are on data plans having usage caps. If the usage caps are exceeded, substantial charges can be incurred—a further deterrent to reliance on cloud image processing.

Response speed can be optimized, and data charges can be avoided, by performing image recognition tasks on the handset. But due to the large number of calculations typically involved, handset-based image recognition can quickly reduce battery life. In addition, handsets typically lack access to the substantial quantities of reference data used in recognizing imagery, impairing recognition results.

Applicant has devised advantageous arrangements that provide accurate image recognition capabilities—particularly to smartphone users, in commercially practical manners.

The foregoing and other features and advantages of the present technology will be more readily apparent from the following detailed description, which proceeds by reference to the accompanying drawings.

BRIEF DESCRIPTION OF THE DRAWINGS

FIG. 1 shows three different supermarket items.

FIG. 12 shows another hardware arrangement to detect differently-paired activations of output neurons in the FIG. 9 arrangement.

FIG. 13 details the lookup table data structure depicted in FIG. 12.

FIGS. 15A and 15B show representing object class depictions, and corresponding "fool" images.

FIGS. 18AA, 18BB and 18CC depict excerpts of FIGS. 18A, 18B and 18C, respectively.

FIG. 38 illustrates part of a data structure employed in a different embodiment of the present technology.

FIGS. 39A and 39B show training images for neurons 1 and 2, respectively, of FIG. 38.

FIG. 40 shows an image captured by a point of sale scanner.

FIG. 41A shows a product image captured by a user with a mobile device, in an aisle of a supermarket.

FIGS. 41B, 41C and 41D show a few possible divisions of the image of FIG. 41A.

FIG. 45B shows a partial depiction of artwork for a gravy mix packet, from an artwork origination file.

FIGS. 46A-46E show synthetic images generated from FIG. 45B, depicting the gravy mix packet as it would appear using different virtual camera viewpoint parameters.

FIG. 48 provides an illustrative set of test results.

DETAILED DESCRIPTION

Figure 2:
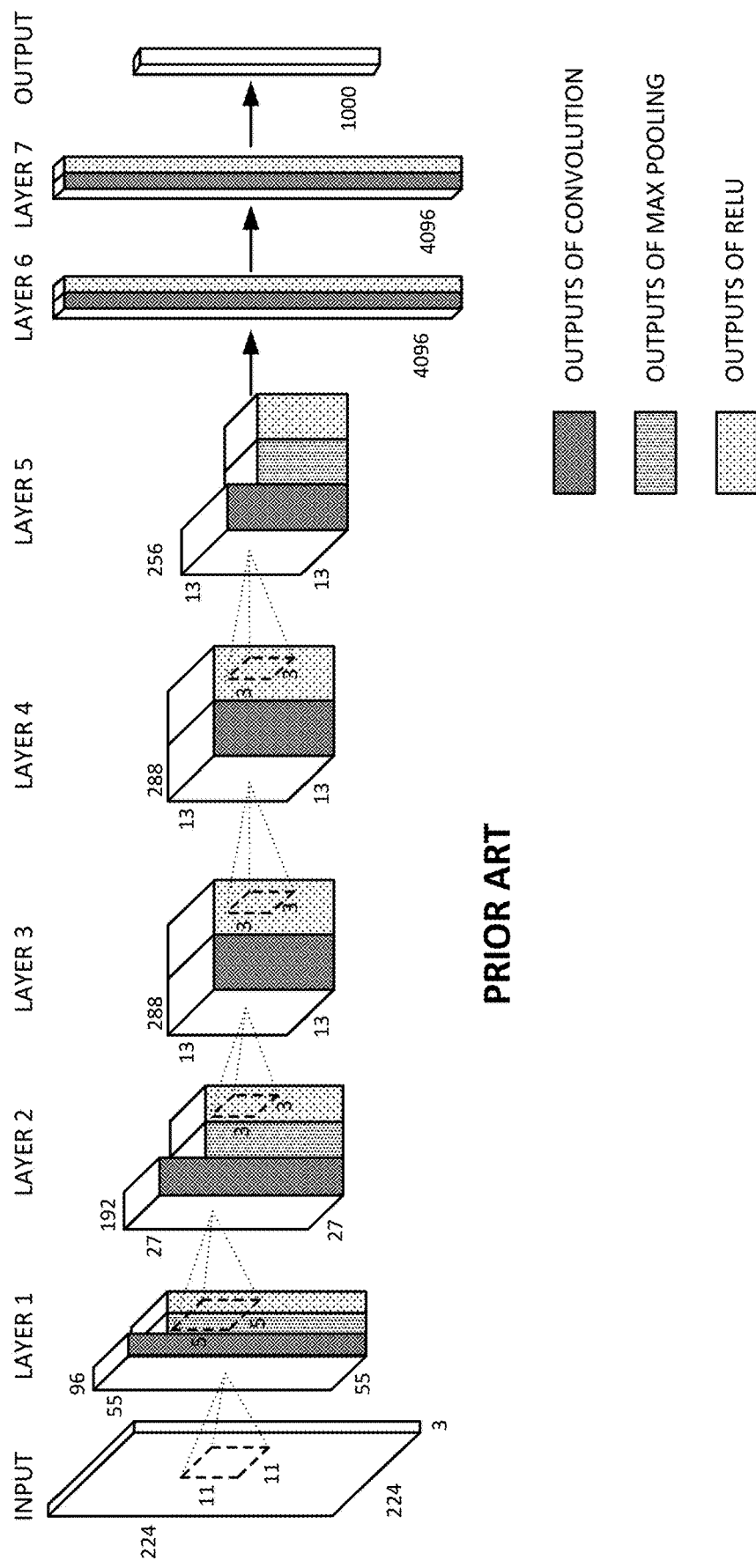
FIG. 2 shows an exemplary prior art convolutional neural network.

The product recognition technologies detailed below are variously described with reference to two illustrative types of implementation. The first concerns fixed or hand-held check-out scanners associated with point of sale terminals, as are used to identify items for inclusion on a shopper's checkout tally. Such camera-based scanners are marketed by companies including Datalogic (e.g., its Magellan 9800i product) and Zebra Technologies (e.g., its MP6000 product). The second involve smartphones and other mobile devices, as may be used by shoppers for in-store self-checkout, or to discover product-related information, such as nutrition facts, recipes, etc., either in-store or at home. While particular aspects of the technology may be described by reference to one form of implementation or the other, it should be understood that the detailed technologies are applicable to both.

(Many scanners associated with point of sale terminals employ monochrome image sensors, with the items being commonly illuminated with red LEDs. The mobile device implementations typically work with color imagery, illuminated with ambient light.)

Accuracy of product identification in supermarkets can be impaired by two different types of errors. The first may be termed an item-confusion error. This is the error introduced earlier and illustrated by reference to FIG. 1, in which one item that the system is trained to recognize is presented for identification, and the system identifies it as a second, different item that it has been trained to recognize. The second type of error may be termed a "false positive" error, and arises when something that the system has not been trained to recognize, is mis-identified as one of the items that the system has been trained to recognize. (This mis-identified something can be the shopper's child, another shopper, a view of random imagery from the store, e.g., depicting floor tiles, overhead lighting, etc. This mis-identified something can alternatively be a retail item that the system hasn't been trained to recognize.)

This latter type of error is relatively rare in some types of image recognition systems—such as "SIFT"-based systems. However, such false positive errors can arise in many neural network image recognition systems.

Neural network image recognition systems typically have multiple output "neurons"—one for each class of item that may be identified (e.g., one neuron may indicate "dog," another neuron may indicate "cat," etc., for each of 1000 different neurons/classes). Each neuron produces an output signal indicating a relative probability that the input image depicts its respective class of item. The sum of all the neurons' output signals typically sum to 1.0. If a neuron produces an output signal greater than a threshold value, e.g., 0.8, or 0.9, or 0.97, its answer is taken as trustworthy, and serves as a positive identification of the item depicted in the image. If no neuron has an output signal greater than the threshold, then the result is indeterminate.

If an image is presented to a neural network recognition system, depicting an item the network has not been trained to recognize, the output neurons will generally produce random values—again summing to 1.0. One neuron will naturally produce an output signal higher than the others. Usually, this largest output signal is lower than the threshold, but—as is typical for random systems—unusual things are bound to happen eventually, and in such cases the largest output signal can be above the threshold. In this case, a false-positive identification results.

Neural networks have been the focus of intense study in recent years, with major efforts by leading companies and leading universities. Each year a competition is conducted, the ImageNet Large Scale Visual Recognition Challenge, which tests researchers' latest efforts. This challenge involves training each team's neural network with sample images in each of 1000 different classes (e.g., bison, armadillo, warthog, baboon, Siamese cat, etc.), and then testing the trained network with other images for each of the 1000 different classes. Winning efforts now have classification error rates on the order of a single percent.

But these errors are in the nature of item-confusion errors. The challenge does not evaluate false-positive performance, and this criterion is overlooked in many other studies.

For supermarket applications, such as item check-out, it is critical that all errors—including false-positive errors—be minimized. In such applications, it is generally better for a system to fail to recognize 100 images depicting supermarket items, than to identify an image as depicting a particular supermarket item, when it does not. The prior art does not seem to have prioritized performance metrics in this way.

Neural networks have various forms, and go by various names. Those that are particularly popular now are convolutional neural networks (CNNs)—sometimes termed deep convolutional networks (DCNNs), or deep learning systems, to emphasize their use of a large number of hidden (intermediate) layers. Exemplary writings in the field are attached as part of incorporated-by-reference application 62/404,721 and include:

Babenko, et al, Neural codes for image retrieval, arXiv preprint arXiv:1404.1777 (2014).
Donahue, et al, DeCAF: A Deep Convolutional Activation Feature for Generic Visual Recognition, Proc. 31$^{st}$ Int'l Conference on Machine Learning, 2014, pp. 647-655.
Girshick, et al, Rich feature hierarchies for accurate object detection and semantic segmentation, Proc. IEEE Conference on Computer Vision and Pattern Recognition, 2014, p. 580-587.
He, Kaiming, et al, Deep residual learning for image recognition, arXiv preprint arXiv:1512.03385 (2015).
Held, et al, Deep learning for single-view instance recognition, arXiv preprint arXiv:1507.08286 (2015).
Jia, et al, Caffe: Convolutional architecture for fast feature embedding, Proceedings of the 22nd ACM International Conference on Multimedia, 2014, pp. 675-678.
Krizhevsky, et al, Imagenet classification with deep convolutional neural networks, Advances in Neural Information Processing Systems 2012, pp. 1097-1105.
Deep Learning for Object Recognition: DSP and Specialized Processor Optimizations, Whitepaper of the Embedded Vision Alliance, 2016.

Wikipedia articles for Machine Learning, Support Vector Machine, Convolutional Neural Network, and Gradient Descent are part of the specification of application 62/371,601, filed Aug. 5, 2016, which is incorporated herein by reference.

FIG. 2 (based on the cited Babenko paper) shows an illustrative prior art neural network comprised of different stages, including convolutional stages, max pooling stages, and ReLU stages. Such networks, and their operation (including training, e.g., by reverse gradient descent), are familiar to artisans in the machine learning field, so associated details are not belabored here. The incorporated-by-reference documents provide additional information.

The following discussion includes topical headings. These headings are for quick reference only. The headed sections include disclosure beyond that indicated by the heading text.

Training Images

Neural networks usually require training, using one or more images depicting each class of objects that the network is to recognize.

Training images can be gathered by placing an item on a turntable and capturing images, from a viewpoint pointing towards the turntable axis and half-way up the height of the item, at five-degree increments as the turntable turns. Similar images are captured from vantage points above the product looking down towards it, e.g., with the camera pointed 20, 40, 60 and 80 degrees down below the horizon. Similar images are captured from vantage points below the product and looking up towards it—to the extent the turntable-camera geometry permits. Robotic systems can be employed to speed the data collection. Hundreds of images result.

The number of training images can be further increased by capturing multiple images from each camera-item pose position, with different lighting levels, e.g., one underexposed, one correctly-exposed, and one over-exposed. Different forms of illumination can be used, too, including diffuse lighting, and spot lighting from different locations (sometimes casting shadows on one or more depicted item surfaces). Images may also be captured under different illumination spectra, e.g., tungsten, fluorescent, LED, etc.

Commercial services that provides multi-view images of supermarket items, e.g., captured from a turntable stage, include ItemMaster, LLC of Skokie, Ill., and Gladson, LLC of Lisle, Ill.

The earlier-cited Krizhevsky paper (attached to incorporated-by-reference application 62/404,721) notes that a set of training images can be enlarged ("augmented") by taking an original training image and excerpting different subparts. Krizhevsky worked with 256×256 pixel input images, from which he extracted five 224×224 image patches—located at the center and each of the corners. Each of these five patches was also horizontally-reflected, yielding 10 additional, variant images from each training image. Krizhevsky further modified the intensities of the RGB channels of his original image, yielding further variants. (Krishevsky's architecture is now commonly termed the "AlexNet" architecture.) Such techniques can likewise be used in implementations of the present technology.

Applicant has developed additional augmentation strategies. One is to depict an item in a group with other items of the same class. This is shown, e.g., by the second and third training images of FIG. 3. Such images may be real-world images—captured with other items of the same class. Or they can be synthesized from plural images.

Figure 3:
FIGS. 3 and 4 show exemplary training images illustrating aspects of the present technology.
Figure 4:
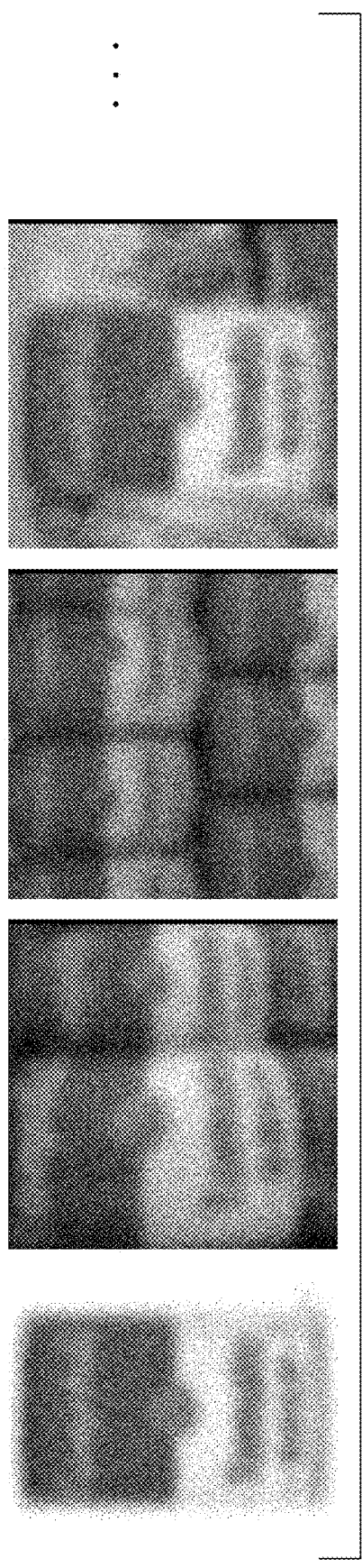
Figure 4A:
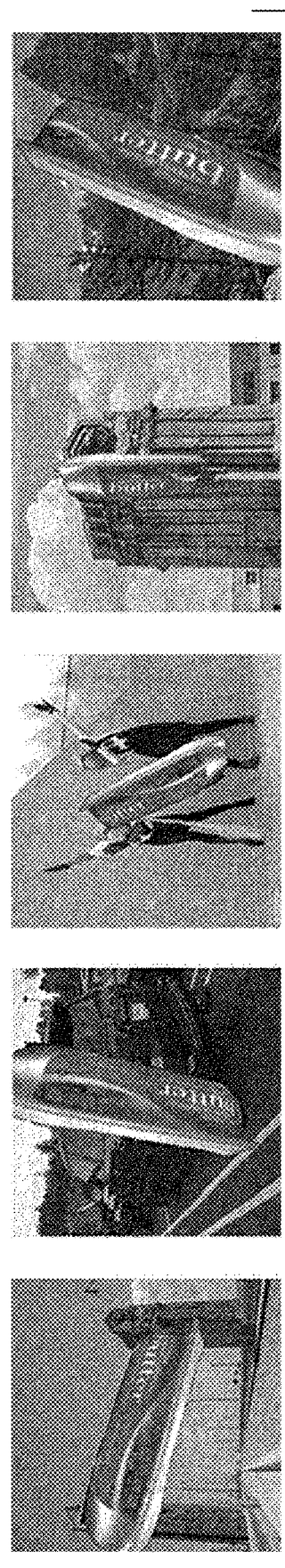
FIG. 4A shows a tub of butter overlaid on different background images, in accordance with aspects of the present technology.

Another augmentation technique is to segment the item depiction in the training image, rotate it, and to overlay it on a different background image to introduce background clutter. FIG. 4A shows five examples of this, variously showing a tub of butter that has been rotated and pasted over a bridge scene, a vehicle, two performers, a building, and a nature scene. Backgrounds depicting retail environments, e.g., showing shelving, floors, ceilings, refrigeration fixtures, checkout terminals, fruits and vegetables, etc., can also be employed. (The fourth training image of FIG. 3 also shows an augmentation of this type.) The public image collection on the Flickr service is a good source of images for such background use.

Alternatively, or additionally, training images may be rotated to augment the training set, brightness can be varied, and glare spots can be added. (Glare is a region of nearly specular reflection from a surface, causing incident light to be reflected onto pixels of the camera sensor at an intensity that saturates the photosensor, i.e., causing its output to go to the maximum possible value, such as 255 for an 8-bit greyscale sensor. The shape of a glare spot can mimic the shape of the light source, but more commonly is distorted by localized deformation of the reflecting surface, allowing glare spots to take countless different shapes.)

Still another augmentation method is to blur the training image (or any of the variants discussed above). The blur is not as severe as in FIG. 4 (discussed below)—typically involving a blur kernel of less than 10×10 pixels for a 640×640 pixel image (and, correspondingly, less than a 4×4 blur kernel for a 256×256 pixel image).

Yet another augmentation method involves shifting the colors of training images, e.g., to account for the different apparent color of certain objects in tungsten vs. fluorescent lighting.

One way to artificially introduce color distortions is to separate a training image into color planes (e.g., red/green/blue, cyan/magenta/yellow, or the two chroma channels of Lab color representations plus the luminance channel). Within a given image plane, all of the pixels are multiplied by a randomly-chosen constant scaling factor, e.g., in the range of 0.85 and 1.15 (i.e., all pixels within a single color plane are multiplied by the same factor). The thus-processed image planes are then re-combined to yield a color-distorted training image.

An illustrative training image may thus be processed by having its red/green/blue channel intensities changed by factors of 1.09/0.87/0.91, respectively. A different color distortion of this same training image may apply factors of 0.94/0.89/0.97, respectively. A third color distortion of this image may apply factors of 1.06/1.14/1.12. Etc. Dozens of color-distorted training images may thereby be derived from a single original training image. Multiple different original training images may be processed in this fashion to yield hundreds or more of different color-distorted images for training.

The just described arrangement maps the Red, Green and Blue colors of an input image, to Red', Green' and Blue' colors of a transformed image by the following equation:

$$[R\,|\,G\,|\,B] * \begin{bmatrix} \alpha_R & 0 & 0 \\ 0 & \beta_G & 0 \\ 0 & 0 & \gamma_B \end{bmatrix} = [R'\,|\,G'\,|\,B']$$

where $\alpha_R$, $\beta_G$, and $\gamma_B$ are the three factors (e.g., randomly selected from the range 0.85-1.15).

It is also possible to include a pseudo-random offset component for each color plane—in addition to the weighting factor. Such a transformed image [R'|G'|β'] can be expressed as a function of the original image [R|G|B] by the following equation:

$$[R\,|\,G\,|\,B\,|\,1] * \begin{bmatrix} \alpha_R & 0 & 0 \\ 0 & \beta_R & 0 \\ 0 & 0 & \gamma_G \\ l & m & n \end{bmatrix} = [R'\,|\,G'\,|\,B']$$

where l, m and n are the offset values for the three color channels. These values may each be randomly selected from the range, e.g., of −25 to 25 (for color channels represented with values of 0 to 255).

(In some embodiments is has been found desirable to have the three offsets sum to zero. For example, randomly-selected offsets for the red and green channel can be summed, negated, and used as the offset for the blue channel. Similarly for other combinations, i.e., red plus blue offsets=negative green offset, and green plus blue offsets=negative red offset. In a particular embodiment, offsets of X are applied to each of two channels, and an offset of −2× is applied to the third channel.)

In other embodiments, distortion of each channel is based on a linear combination of all three channels per random factors, in addition to the just-described offset values. In such case:

$$[R\,|\,G\,|\,B\,|\,1] * \begin{bmatrix} \alpha_R & \alpha_G & \alpha_B \\ \beta_R & \beta_G & \beta_B \\ \gamma_R & \gamma_G & \gamma_B \\ l & m & n \end{bmatrix} = [R'\,|\,G'\,|\,B']$$

In an exemplary embodiment, the new terms, $\beta_R$, $\gamma_R$, $\alpha_G$, $\gamma_G$, $\alpha_B$, and $\beta_B$ may be randomly selected from the range of −0.15 to 0.15.

By color-distorting training images in such fashions, a network can learn to essentially ignore certain color offsets, and certain color shifts, thereby yielding a network that is highly robust against color changes, e.g., due to different illumination, ink variations, etc. (Naturally, a simplified version of the foregoing can be employed for use with training a network with greyscale images—randomly modifying pixel values in a training image by a randomly-chosen weighting factor and/or offset value.)

Rather than training a network to be robust against different channel offsets, applicant has found it advantageous to instead design the network to disregard such offsets. In a preferred embodiment, this is done by employing convolution kernels, in the first layer, that each has a zero mean.

Consider a 3×3 convolution kernel applied to the red channel of an input image. (This kernel may be one of, e.g., 96 such convolutions applied to the red channel imagery.) Initial kernel coefficients are assigned (e.g., randomly). These nine values are summed and divided by nine to determine the average coefficient value. Each of the nine original values is then adjusted by subtraction of the average value. The result is a set of coefficients that now sum to zero.

Such a convolution kernel, when applied to a red plane of imagery, essentially ignores a signal component that is common to all the input red pixels, i.e., a constant red offset value. That common component is multiplied by each of the nine coefficients, and the results are summed. Since the sum of the coefficients equals zero, so does the sum of the coefficients multiplied by the constant.

The starting zero-mean character of the first layer convolution kernels would usually be lost during training, since the tweaks made to each of their nine coefficients in each training cycle—based on loss function-dependent gradient values—will not usually be zero-mean. However, such a set of nine tweaks, a 9-D vector, can be adjusted to force the tweaks to sum to zero. In particular, this vector can be projected onto a line representing the condition $k_1+k_2+k_3+k_4+k_5+k_6+k_7+k_8+k_9=0$, and the projected component can then be used for tweaking the nine coefficients. Zero-meaning may be implemented by simply determining the average of the nine gradient-indicated tweaks, and subtracting this average from each of the tweaks, to yield a revised set of adjustments, which are then applied to the kernel coefficients. This operation is performed for each set of tweaks applied to each convolution kernel in the first layer during training. While training is slightly prolonged by changing the tweaks from their nominal values in such fashion, the improved results typically more than compensate, in terms of the network's improved robustness to color variations.

The Network Size Impediment to Recognizing Supermarket Items

Neural networks have not previously been commercially used to recognize, and distinguish, items for sale in supermarkets—neither for checkout (e.g., with fixed camera systems to identify items being purchased), nor for consumer use (e.g., with smartphones for self-checkout, to obtain nutritional information, etc.). This is due, in part, to the size of network required. Supermarkets commonly have tens of thousands of different items. (The Food Marketing Institute reports an average of 42,214 different items, in 2014.) Such a large set of classes requires an inordinately complex network, e.g., with 40,000+ different output neurons.

While Moore's law, with time, is expected to mitigate the problem of network complexity (as can large investments, presently), a persistent critical issue is that of training. The inventory of most supermarkets changes frequently—with items being added and dropped on a near-daily basis. Retraining a complex network to accurately recognize a different set of 40,000+ classes each day is not practical.

Figure 5:
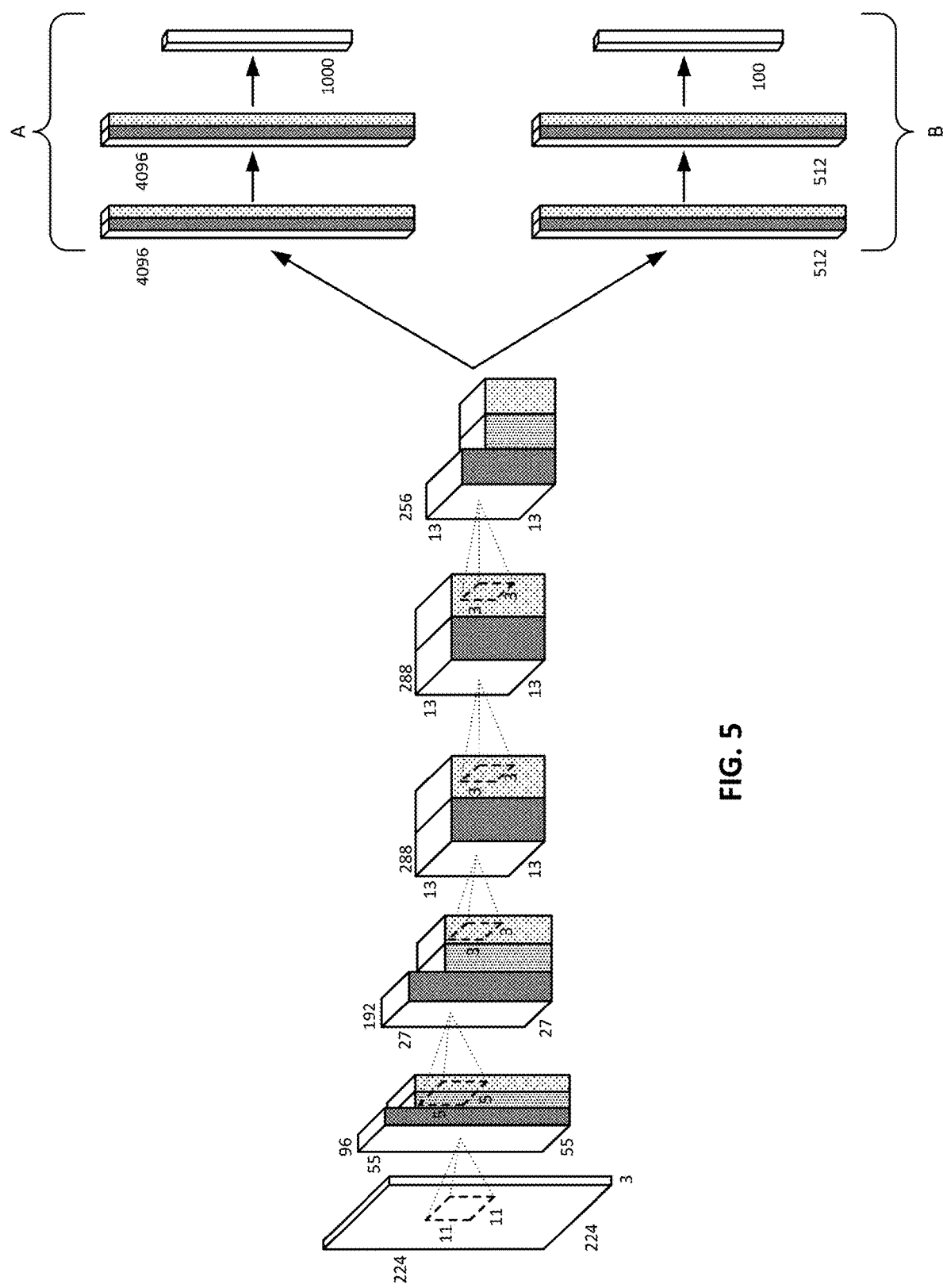
FIG. 5 shows a neural network according to another aspect of the present technology.

In accordance with a further aspect of the technology, this problem is addressed using an architecture such as is depicted in FIG. 5. In this arrangement, a multi-layer neural network is provided with two parallel output sections A and B, driven from a common previous stage. The two sections are of different sizes. Depicted section A has 1000 output neurons, while section B has only 100 output neurons. Their respective predecessor stages are also sized differently.

Division of the network in this fashion allows the different output sections to be trained at different intervals. For example, the larger section may be trained monthly, and the smaller section may be trained daily. The smaller section handles recognition of newer items, whereas the larger section handles recognition of legacy items (i.e., items that the store has sold for more than a month). After a month, the larger network is re-trained to recognize the full supermarket inventory—including items previously recognized by the smaller network. Items dropped from stock are omitted in the training. The smaller network is then available for additional new items as they are added.

When an input image is presented to the FIG. 5 network, one of the 1100 output neurons will produce a signal with a higher value than the 1109 other output neurons. That neuron with the greatest output datum—whether from output section A or output section B, identifies the class of the input image (provided it exceeds a confidence threshold, such as 0.97).

While one application of the FIG. 5 network is to cope with a universe of classes that changes over time, it can also be used to remedy, or patch, behavior of a network that is found deficient in recognizing certain classes of items.

For example, some different supermarket items have nearly-identical appearances. Consider raspberry preserves, and seedless raspberry preserves, as depicted in FIG. 1. Likewise, chicken stock, and a low-sodium version of chicken stock by the same vendor. Lemon and lime variants of a house brand soft drink, etc. If a recognition system is less accurate than desired in distinguishing such paired items (e.g., mis-identifying one as the other with a greater frequency than is acceptable), then an auxiliary smaller network can be trained to better discriminate between the two.

Taking the chicken stock example, a primary recognition system—such as the FIG. 5 network employing output section A, may have trouble reliably discriminating between the two. Without retraining that large network, the smaller output section B can be further trained on a set of products including this product pairing. Since it needs to discriminate a smaller number of classes, it can be expected to do a better job. That is, although both the top and bottom sections of the FIG. 5 arrangement are trained to recognize the variants of the chicken stock, the lower section is likely to produce output data of higher confidence values when these items are presented. So when the sodium-free chicken stock is presented, the corresponding output neuron of the lower output section is likely to produce a larger output datum than that produced by the neuron for that same product in the upper output section, and larger than that produced by the neurons for the standard chicken stock in the upper and lower output sections. Thus, even after certain products have been in inventory for an extended period (during which they would be expected to be identified by the larger, upper output section alone), they may still be among the corpus of classes that the smaller lower output section is trained to recognize—simply to enhance confidence of recognition.

Figure 6:
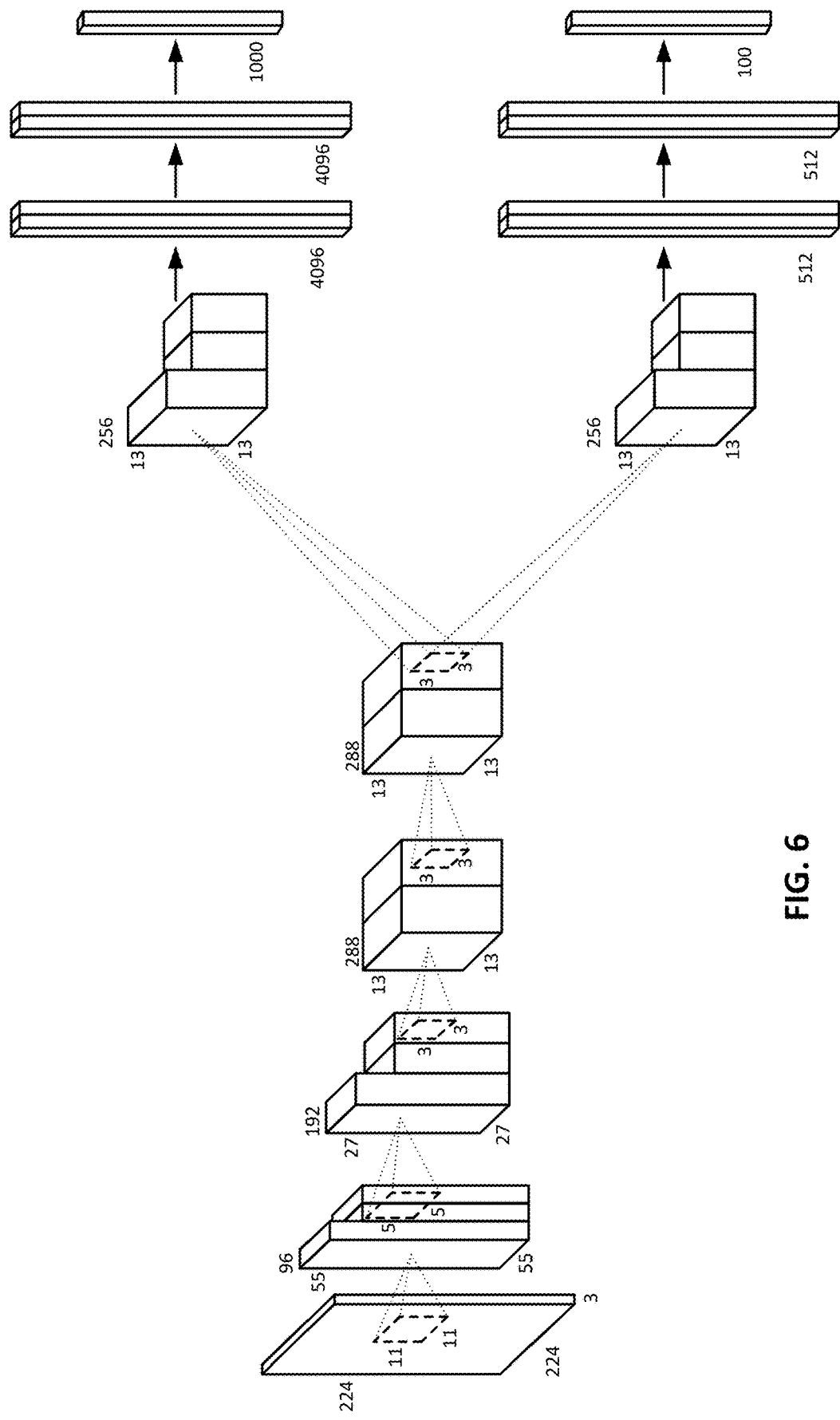
FIG. 6 shows a variant of the FIG. 5 arrangement.

FIG. 5 shows the parallel output sections comprising just the fully-connected layers. In another embodiment, one or more of the previous layers, e.g., including one or more convolution stages, is also replicated in parallel fashion, as shown in FIG. 6.

Figure 7:
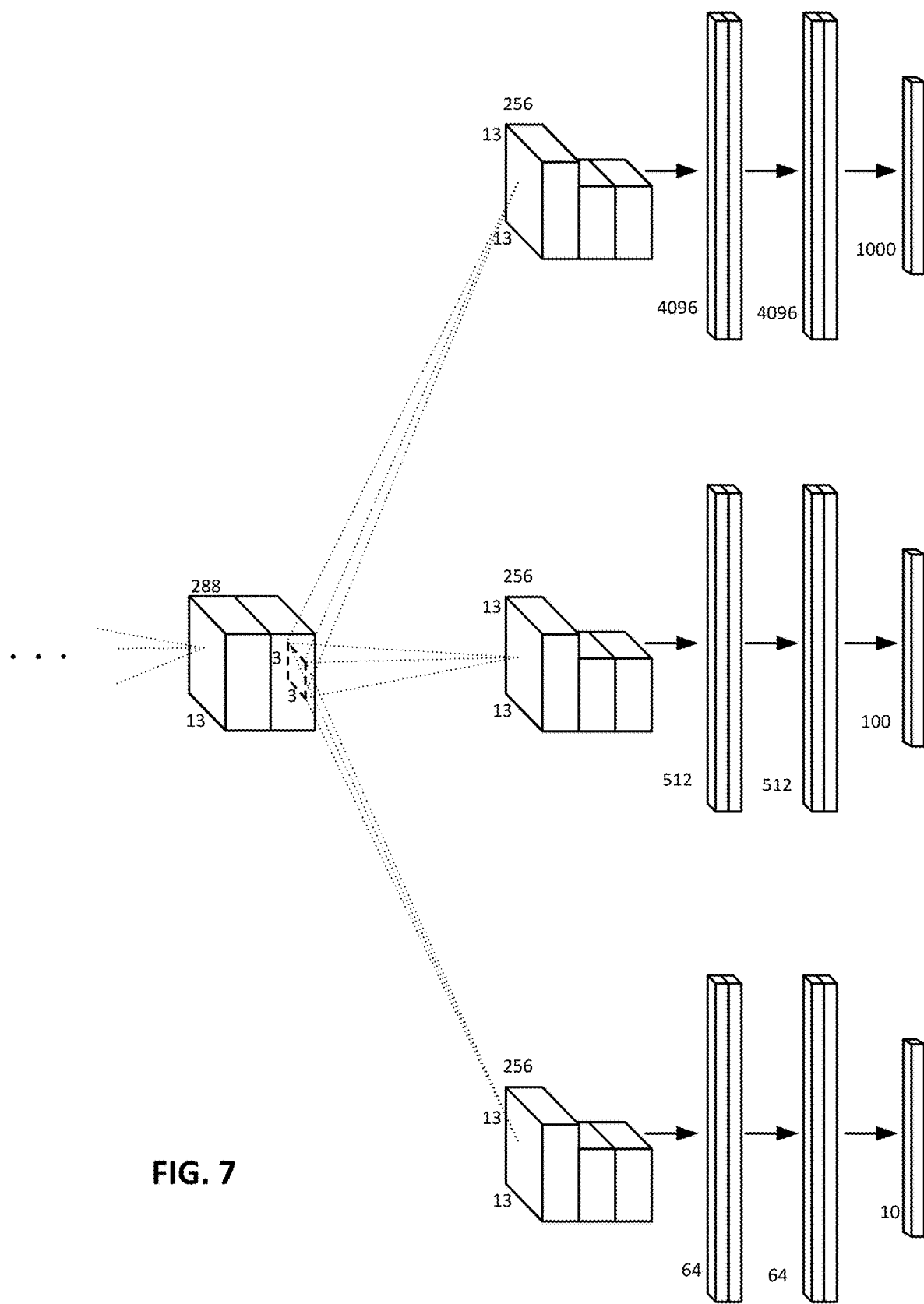
FIG. 7 shows a further variant of the FIG. 5 arrangement.

The same principles can be applied to more than two parallel output sections. FIG. 7, for example, shows that the FIG. 6 arrangement can be extended to three output sections. In such a network, the largest output section may be re-trained on an annual basis, to recognize the then-current supermarket stock. The intermediate output stage may be re-trained on a monthly basis, and the small output stage can be re-trained on a daily basis. As before, after a month, the items previously recognized by the small section are re-assigned for recognition to the next-larger (here, intermediate) section. After a year, the items previously recognized by the intermediate section are re-assigned for recognition by the large section.

Figure 7A:
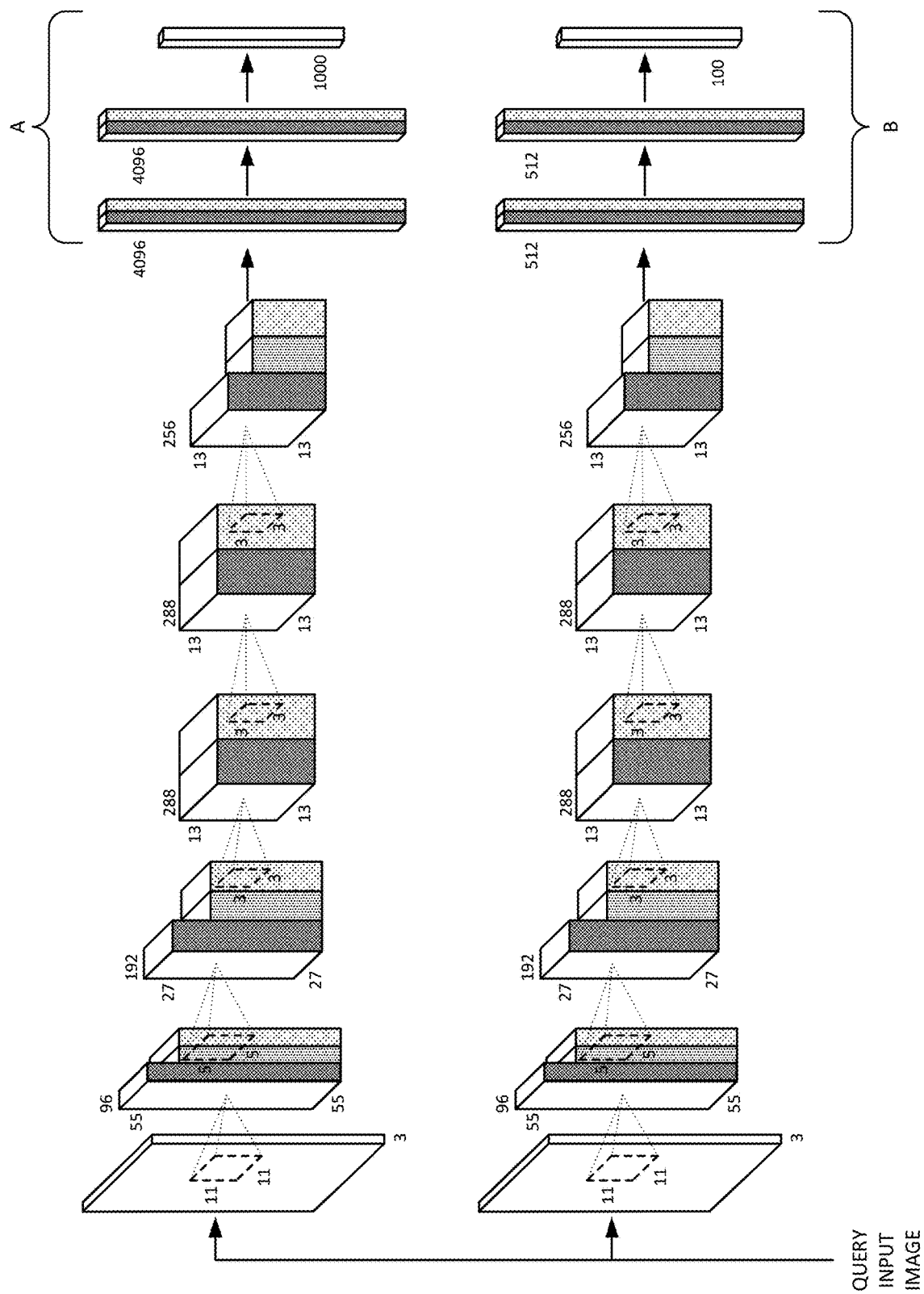
FIG. 7A shows a still further variant of the FIG. 5 arrangement.

In another variant, shown in FIG. 7A, a neural network is not forked to provide the multiple output stages. Instead, multiple neural networks are employed. The teachings detailed above in connection with FIGS. 5-7 are similarly applicable to such a parallel network arrangement (which can naturally be extended to three or more networks).

By such arrangements, the benefit of multi-layer neural networks can be employed to recognize the evolving stock of supermarkets, without the daunting challenge of retraining a complex network on a near-daily basis.

(FIGS. 5-7A depict output stages having 1000 and 100 (and sometimes 10) neurons. These numbers are for expository convenience, and can be scaled to meet the needs of the particular application. Moreover, the 10:1 ratio between adjacent output sections is illustrative only, and not a requirement. For example, ratios of 3:1, 100:1, etc., can alternatively be used.)

Figure 8:
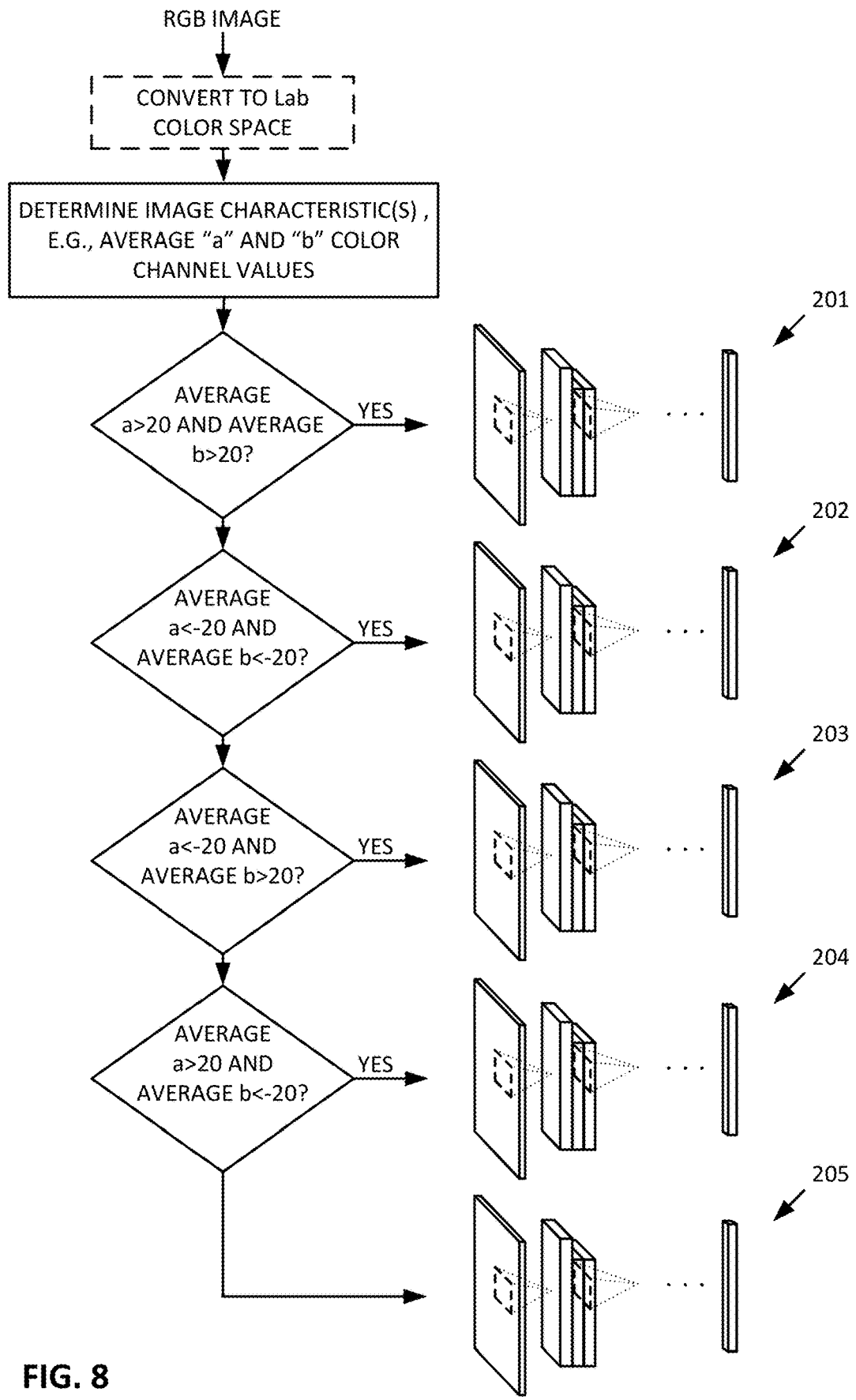
FIG. 8 shows a neural network according to another aspect of the present technology.

Another way of dealing with large networks is shown in FIG. 8. In this arrangement, multiple smaller networks are employed. An initial classification is made based, at least in part, on one or more image features, and the imagery is assigned to one of plural neural networks in response.

In a particular embodiment, input RGB imagery is first converted into Lab color space. This conversion separates image brightness from its chroma characteristics. Thus, whether an image is captured in bright or dim light matters less, as the chroma values ("a" and "b") are relatively constant; only the luma component ("L") changes. (YUV is another similar color space that may also be used.)

Next, the detailed system computes gross image characteristics. For example, it may average the "a" values of all of the pixels in the input imagery, and do likewise with the "b" values. (In an exemplary embodiment, the "L" parameter varies from 0 to 100, whereas the "a" and "b" parameters vary from −100 to +100.)

The image is then dispatched to one of five classifiers, depending on the average "a" and "b" values.

If both "a" and "b" have average values greater than 20, the imagery is routed to a first classifier 201. If both computed parameters have values less than −20, the imagery is routed to a second classifier 202.

If the average "a" value is less than −20, and the average "b" value is greater than 20, the imagery is routed to a third classifier 203. If the average "a" value is greater than 20, and the average "b" value is less than −20, the imagery is routed to a fourth classifier 204.

If none of the previously-stated conditions apply, the imagery is routed to a fifth classifier 205.

(Such embodiment can benefit by segmenting the foreground object from the background prior to classification— to avoid colored background features leading to the input image being misdirected to a classifier 201-205 that is inappropriate for the intended subject. Various foreground/background segmentation arrangements are known. Exemplary is Jain, Pixel Objectness, arXiv preprint arXiv: 1701.05349 (2017). If end-use of the network includes foreground/background segmentation, then the network should earlier be trained with training images that are similarly segmented. For example, if the FIG. 8 embodiment uses foreground/background segmentation, and heavily-blurs—or blacks-out, regions determined to be background, then training should likewise employ images in which the backgrounds have been heavily-blurred or blacked-out.)

Another gross image feature that can serve as a basis for routing imagery to different networks is the shape of the item at the center of the frame. Other known segmentation methods can be employed to at least roughly bound the central item (e.g., blob extraction and region growing methods). The system can then analyze imagery within the resulting boundary to find segments of ellipses, e.g., using curve fitting techniques, or using a Hough transform. See, e.g., Yuen, et al, Ellipse Detection Using the Hough Transform, Proc. of the Fourth Alvey Vision Conf., 1988.

If the image is found to depict a likely-cylindrical item, it is routed to one network that has been trained to recognize cylindrical objects within a supermarket's inventory. If the depicted item does not appear to be cylindrical in shape, the imagery is routed to a second network that handles non-cylindrical cases. (Many such shape classifications can be employed; the use of two classes is exemplary only.)

Again, data output from all of the output neurons—across all the different networks—can be examined to determine which neuron gives the strongest response. (Alternatively, only the neurons for the network to which the imagery was routed may be examined). If a neuron's output exceeds a threshold value (e.g., 0.97), such neuron is taken as indicating the identity of the depicted object.

Figure 9:
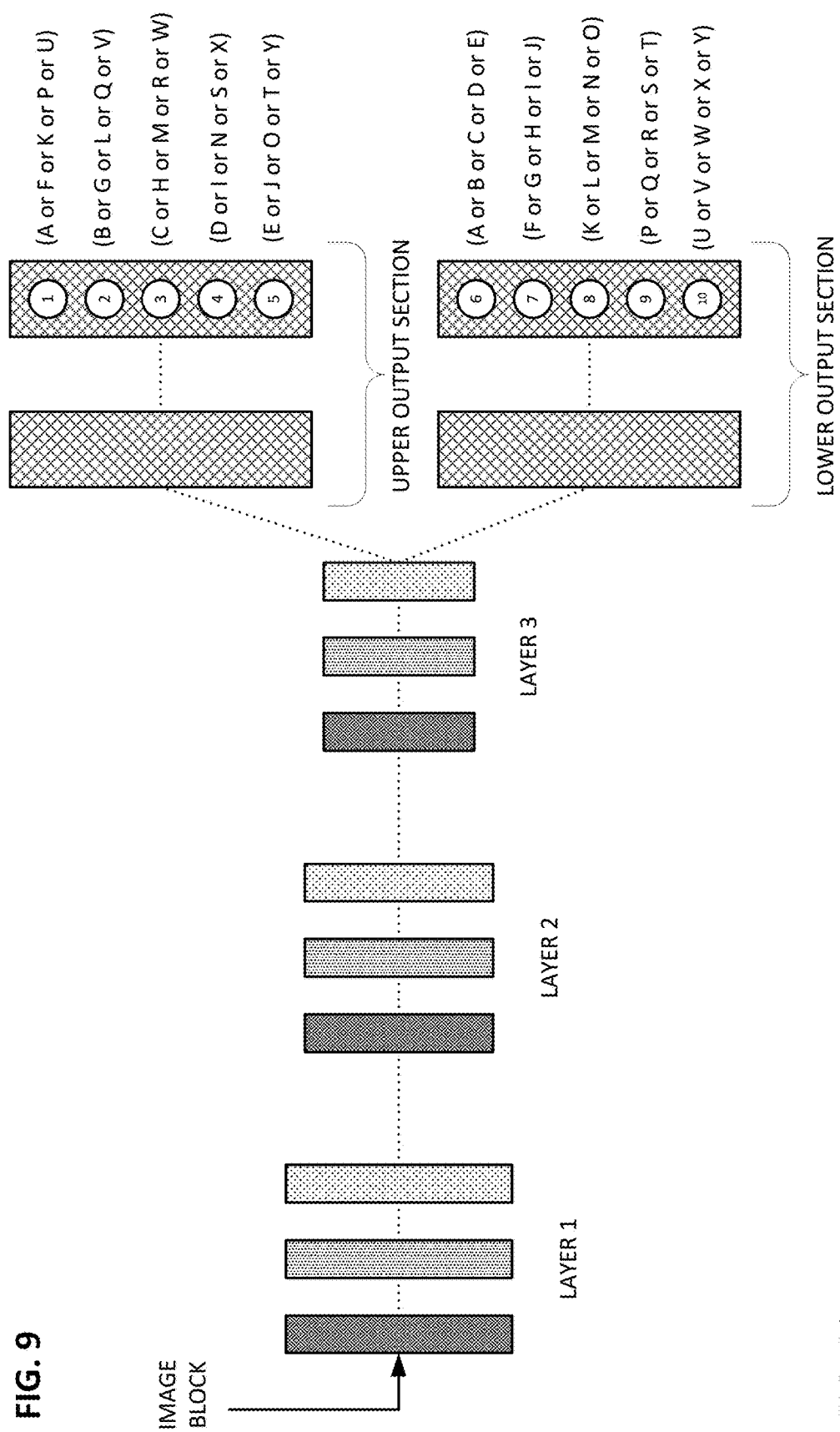
FIG. 9 shows a neural network according to another aspect of the present technology.

In accordance with another aspect of the technology, a large number of classes can be recognized by a different form of network, such as is depicted in FIG. 9.

The FIG. 9 network, like those just-discussed, involves multiple output sections (here, two). However, in the FIG. 9 arrangement, a given input class triggers an output in both of the output sections—rather than only one (as is often the case with the arrangements is FIGS. 5-7A). The combination of output neurons that are triggered defines the class of the input image.

FIG. 9 considers the case of recognizing 25 different classes of items. Alphabet symbols "A" through "Y" are exemplary, but they could be images of 25 different supermarket items, etc.

Figure 10:
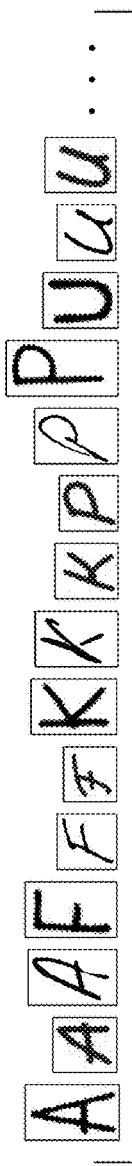
FIG. 10 shows some of the images that may be used in training the network of FIG. 9.

Each neuron in the upper output section in FIG. 9 is trained to trigger when any of five different classes is input to the network. For instance, neuron #1 is trained to trigger when the input image depicts the symbol "A," or depicts the symbol "F," or depicts the symbol "K," or depicts the symbol "P," or depicts the symbol "U." FIG. 10 shows some of the images that may be presented to the network for training (e.g., using stochastic gradient descent methods to tailor the coefficients of the upper output section so that neuron #1, alone, fires when any of these symbols is presented to the network input).

A different set of images is used to train neuron #2 of the upper output section; in this case configuring the coefficients in the upper output section so that neuron #2 fires when any of symbols "B," "G," "L, "Q" or "V" is presented.

Training continues in this fashion so that one (and only one) of neurons #1-#5 of the upper output section triggers whenever any of the symbols "A"-"Y" is presented to the network.

The lower output section is similar Again, presentation of any of the symbols "A"-"Y" causes one output neuron in the lower section to trigger. However, the groupings of symbols recognized by each neuron is different in the upper and lower output sections.

In the detailed arrangement, if two symbols are both recognized by a single neuron in the upper section, those same two symbols are not recognized by a single neuron in the lower section. By this arrangement, each paired-firing of one neuron in the upper section and one neuron in the lower section, uniquely identifies a single input symbol. Thus, for example, if an input image causes neuron #2 in the upper section to fire, and causes neuron #9 in the lower section to fire, the input image must depict the symbol "Q"—the only symbol to which both these neurons respond.

By such arrangement, a network with only ten output neurons (5+5) can be trained to recognize 25 different classes of input images (5*5). In similar fashion, a network with 450 output neurons (225+225) can be trained to recognize 50,625 (225*225) different classes of input images— more than sufficient to recognize the inventory of contemporary supermarkets. Yet networks of this latter complexity are readily implemented by current hardware.

Figure 11:
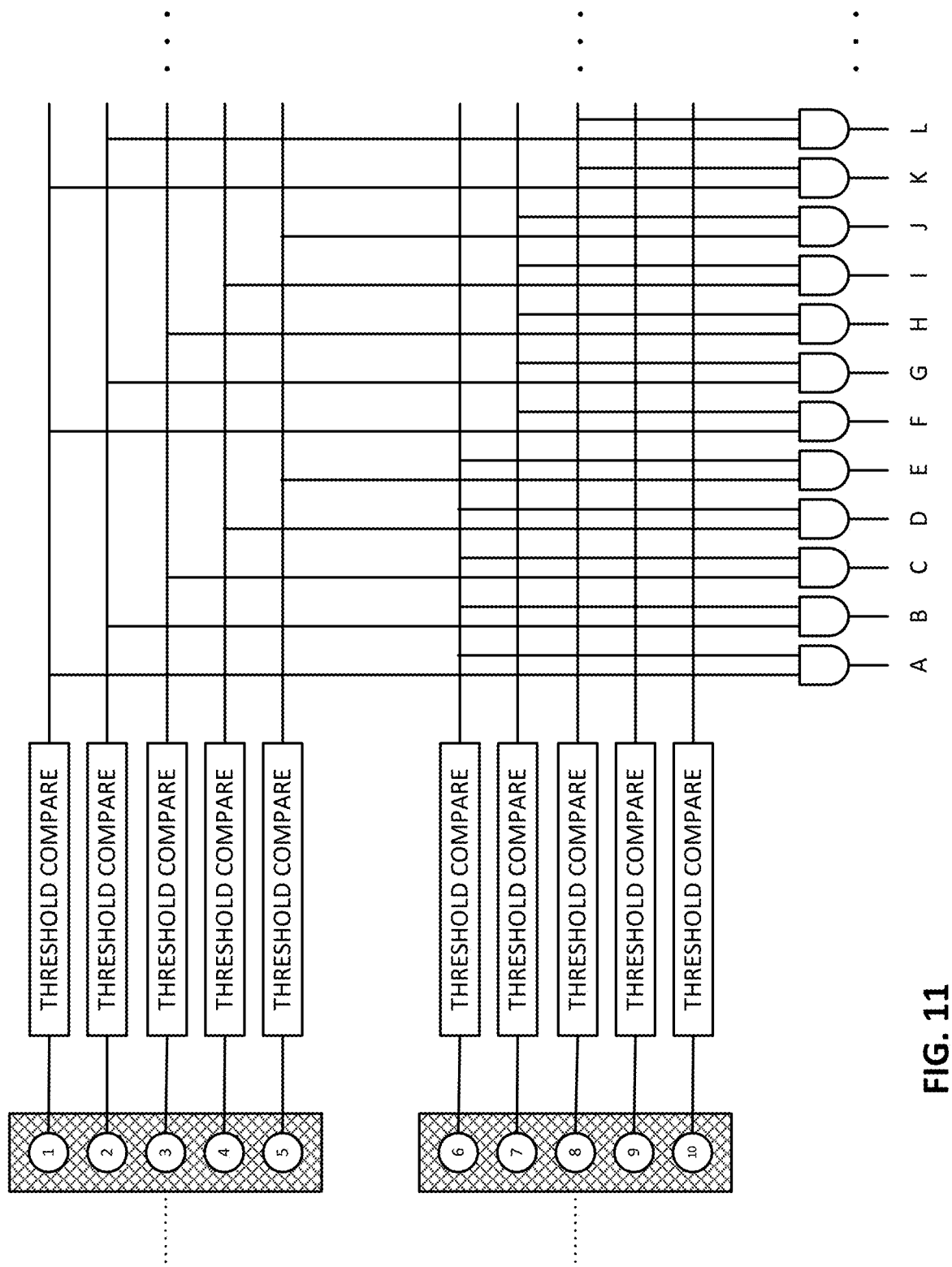
FIG. 11 shows a hardware arrangement to detect differently-paired activations of output neurons in the FIG. 9 arrangement.

Hardware to detect the differently-paired concurrences of triggered output neurons is straightforward. FIG. 11 shows such an arrangement employing AND logic gates. (The Threshold Compare logic can be a logic block that compares the data output by each neuron (e.g., a confidence value ranging from 0 to 1) with a threshold value (e.g., 0.97) and produces a logic "1" output signal if the threshold is exceeded; else a logic "0" is output.

FIG. 12 shows such a different arrangement employing a look-up table (the contents of which are detailed in FIG. 13).

The split point in the FIG. 9 network, i.e., the point at which the two paralleled output sections begin, can be determined empirically, based on implementation and training constraints. In one particular embodiment, the split occurs at the point where the fully-connected layers of the network start. In another embodiment, the split occurs earlier, e.g., so that one layer including a convolutional stage is replicated—one for each of the upper and lower output sections. In another embodiment, the split occurs later, e.g., after an initial fully-connected layer. Etc.

The use of two output sections (upper and lower in FIG. 9) is exemplary but not limiting. Three or more output sections can be used with still further effect.

Figure 14:
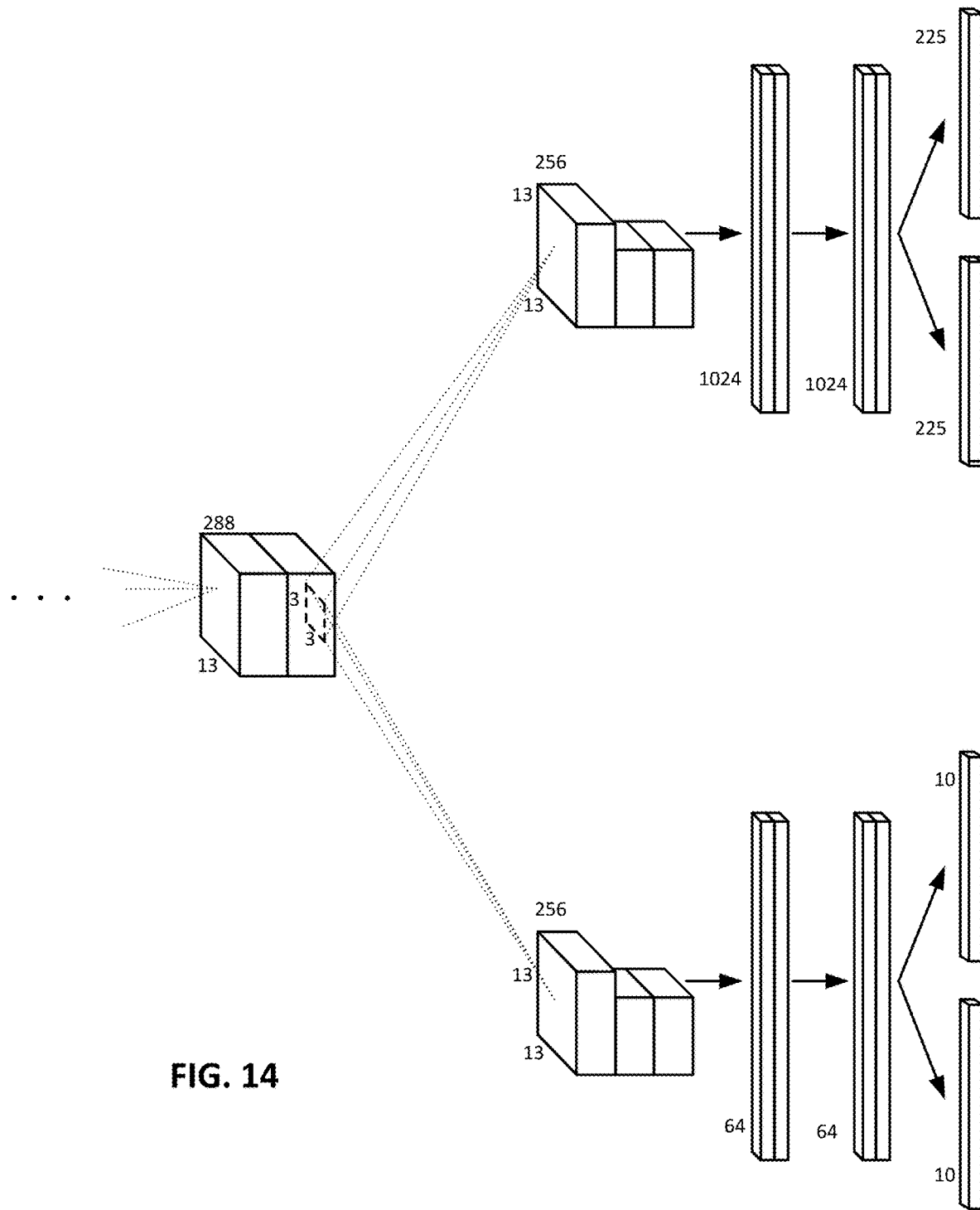
FIG. 14 shows a neural network according to another aspect of the present technology.

The arrangement of FIG. 9 can be used in conjunction with the FIG. 5 arrangement, in which output sections of different sizes are employed. FIG. 14 shows an exemplary implementation. The top part of the FIG. 14 diagram has two output stages with 225 neurons each, allowing recognition—in paired combination—of 50,625 classes of items. This top section can be trained infrequently, e.g., monthly or annually. The bottom part of the FIG. 14 diagram has two output stages with 10 neurons each, allowing recognition of 100 classes of items. This bottom section can be trained frequently, e.g., daily. (Again, the three points in the network where the split occurs can be determined empirically. Although the rightmost splits are both shown as occurring immediately before the final fully-connected stages, they can be elsewhere—including at different locations in the top and bottom portions.)

Class 0(s) and False Positives

Normally, it is expected that images presented to a multi-layer neural network will be drawn from the classes that the network was trained to recognize. If a network was trained to recognize and distinguish ten different breeds of dogs, and an image of an 11$^{th}$ breed is presented (or an image of a cat is presented), the network output should indicate that it is none of the trained classes. Such output is commonly signaled by each of the output neurons producing an output datum that doesn't express a high confidence level (e.g., random output levels, all less than 0.97 on a scale of 0 to 1). This "none of the above" output may be termed the "Class 0" case.

More positive rejection of input images, as belonging to a class for which the network was not intended, can be enhanced by actually training the network to recognize certain images as unintended. The noted network, trained to recognize ten breeds of dogs, may further be trained with images of cats, horses, cows, etc., to activate a Class 0 output neuron. That is, a single further class is defined, comprising possibly-encountered images that are not the intended classes. A corresponding output neuron may be included in the final stage (at least for training purposes; it may be omitted when the trained network is thereafter used), and the network is trained to trigger this neuron (i.e., outputting a signal above a confidence threshold) when an image akin to the unintended training images is presented.

In accordance with a further aspect of the present technology, one or more depictions of an item (or items) that a neural network is intended to recognize are distorted, and are presented as Class 0 training images. That is, if the network is intended to recognize item classes 1 through N, an image used in training one of these classes is distorted, and also used in training Class 0.

One suitable form of distortion is by applying an image filter, e.g., taking an input image, and applying a filtering kernel—such as a Gaussian blur kernel—to produce an output image of different appearance (which may be of different pixel dimensions). Each pixel in the output image may be a weighted-average value of a 10×10 (or 15×15, etc.) neighborhood of nearby pixels in the input image. (These figures correspond to a 640×640 image; for a 256×256 image, the neighborhoods may be 4×4 or 6×6.) Such method forces the network to learn to rely on finer details of the image in distinguishing classes, rather than considering gross image characteristics that persist through such blurring.

(Applicant trained a network to recognize many classes of objects. One was a white box of an Apple Mini computer. Another was a dark Star Wars poster. Applicant discovered that test images that included a large white region were sometimes mis-identified as depicting the Apple box, and test images that included a large dark region were sometimes mis-identified as depicting the Star Wars poster. The noted training of a class 0 with blurred images redressed this deficiency.)

In a first exemplary implementation, the Class 0 training set includes distorted counterparts to the training images used for several (in some instances, all) of the classes 1, 2, 3, . . . N that the network is trained to recognize. For example, if the network is to recognize 100 different classes of items, and a different set of 500 images is used to train each class, then three images can be randomly selected from each set of 500, distorted, and used as 300 of the training images for Class 0. (200 other images, not depicting intended items, can be obtained from other sources, so that the Class 0 training set numbers 500 images—the same size as the training set for the other classes.)

In a second exemplary implementation, there is not one Class 0, but several. In an extreme case, there may be one or more Class 0 counterparts to each intended class. Thus, for example, Class 0-A can be trained with the set of images used to train Class 1, but distorted. Class 0-B can be trained with the set of images used to train Class 2, but distorted. Class 0-C can be trained with the set of images used to train Class 3, but distorted. Etc. (The training sets for each of these different Class 0s may additionally comprise other imagery, not depicting any of the intended classes.)

If a network is to recognize 1000 different supermarket items (i.e., 1000 image classes), the network can be trained on 2000 classes: the original 1000 items, and 1000 distorted counterparts. Each class may be trained using sample images. Class1 may be Campbell's tomato soup, for which 500 exemplary different images are presented during training. Class2 may be distorted Campbell's tomato soup—for which the same 500 different images, but blurred, are presented during training. (A few such exemplary images are shown in FIGS. 3 and 4.) Classes 3 and 4 may be, respectively, Campbell's mushroom soup, and blurred counterparts. Etc. (The blurred versions may all be blurred by the same amount, or different blur factors can be applied to different exemplary images.)

If, in subsequent use of the network, a neuron that was trained to trigger upon presentation of a blurred item image, produces the largest output datum of all the output neurons, then the input image is identified as corresponding to none of the 1000 intended supermarket item classes.

(Although the arrangement just-detailed is described in the context of a conventional architecture, i.e., in which each class has one corresponding output neuron, the same principles are likewise applicable to arrangements in which the number of output neurons is less than the number of classes, e.g., as detailed in connection with the FIG. 9 arrangement.)

In a related embodiment, there are multiple Class 0s, but not as many as there are intended classes. For example, if the intended universe of classes numbers 50,000 (i.e., classes 1-50,000), there may be 2000 different Class 0s. These classes may be organized around brands. For example, Class 0-A may be associated with the Smucker's band, and can be trained with distorted counterparts of the training images used for the several different Smucker's items in the intended classifier universe. Class 0-B may be associated with the Swanson's brand, and images of different Swanson's products can be distorted to train this Class 0. Class 0-C may be for Heinz products. Class 0-D may be for Pepperidge Farms products, etc. (Brandmate product pose extra likelihood of confusion due to commonalities of certain of the product artwork, e.g., common logos.)

Each time a Class 0 is trained using a distorted counterpart to an image of an intended class, classification accuracy for that intended class improves. (Objects that have a superficial similarity to such an intended class are less-likely to be mis-classified into that class, as the training may now lead to classification of such object into the/a corresponding Class 0.)

It is well-understood that neural networks can be fooled. For example, a network may identify an image frame of TV static, with high probability, as depicting a motorcycle, etc.

Such fooling images can be generated in various ways. One way is by evolutionary algorithms. A given image is presented to the network, resulting in one of the many output neurons indicating a probability higher than the other output neurons. The image is then slightly altered (typically randomly) and is re-submitted to the network, to determine if the image alternation increased or decreased the probability indicated by the output neuron. If the alternation increased the probability, such modification is maintained, else it is discarded. Such random permutations are successively applied to the image and evaluated until the image morphs into a state where the output neuron reports a recognition probability greater than the triggering threshold (e.g., 0.97). The perturbed image is then classified as a motorcycle (or whatever other object is indicated by that neuron). Yet the image looks—to humans—nothing like a motorcycle.

Another way to generate a fooling image is by following an opposite gradient direction in training (i.e., follow the gradient of the class that is to be fooled, with respect to the network input).

Re-training the network with such "fooling images" as negative examples can serve to change the network behavior so that those particular images no longer result in a false positive identification of, e.g., a motorcycle. But studies suggest that such re-training simply shifts the problem. It's Whack-a-Mole: the re-trained network is still susceptible to fooling images—just different ones.

Such behaviors of neural networks have been the topic of numerous papers, e.g., Nguyen, et al, Deep neural networks are easily fooled: High confidence predictions for unrecognizable images, arXiv preprint arXiv:1412.1897, 2014 (attached to incorporated-by-reference application 62/414, 368).

Applicant has discovered that the Whack-A-Mole problem does not seem to arise, or is much less severe than reported with such designed "fool" images, in the case of real-world false positive images.

In particular, applicant presented thousands of real-world images from Flickr to a convolutional neural network that had been trained to recognize various supermarket products. In the process, certain random Flickr images were found to be identified by the network as one of the supermarket products with a probability above a 0.97 threshold. FIGS. 15A and 15B show two such "fool" images—together with a representative image of the object that each was found to match (taken from the training set for that object class). (Similarity of each "fool" image to its training counterpart is more apparent in color.) These Flickr images are "false positives" for the network.

(The exemplary network works on square images. The captured images are rectangular, and are re-sampled to become square. This does not pose an obstacle to recognition because the images with which the network was trained were similarly captured as rectangles, and were similarly re-sampled to become squares.)

To improve the false positive behavior of the network, each of the Flickr test images presented to the network is assigned a score, corresponding to the output signal produced by the neuron giving the highest value. The Flickr test images are then sorted by high score, and the top-scoring Flickr images are used in training a Class 0 for the network.

False-positive behavior of the network is improved by this process. Not just the Flickr images that originally fooled the network, but images that are similar to such images, will now activate the class 0 neuron, instead of one of the intended item class neurons.

After such re-training, the process can be repeated. A different set of real-world images harvested from Flickr is presented to the network. Again, each is ranked by its top-neuron score. The top-ranked images are used to again re-train the network—either defining an entirely new Class 0 training set, or replacing respective ones of those earlier Class 0 training images having lower scores. This process can repeat for several cycles. Again, network accuracy—particularly false positive behavior—is further improved.

In a variant arrangement, there is not one Class 0, but several. In an extreme case, there may be as many Class 0s as there are intended classes. Flickr images are analyzed and, for each intended-class neuron, the Flickr images triggering the highest output values are assembled into a training set for a corresponding Class 0. The network is then retrained, e.g., with a set of training images for each of N intended classes, and the Flickr-harvested training images for each of N corresponding Class 0s.

As before, this process can repeat, with a new, second set of Flickr test images analyzed by the network, and new Flickr images identified for each of the counterpart Class 0s. In particular, new Flickr images that produce an output signal, at an intended neuron, greater than one of the Flickr images previously-assigned to the counterpart Class 0 for that intended neuron, replace the earlier-used Flickr image in the corresponding Class 0 training set. After this second set of Flickr test images has been so-processed, the network is retrained. Again, the process can continue for several cycles.

In another particular embodiment, there are multiple Class 0s, but not one for every intended class. As before, a large set of Flickr test images is applied to a trained network. A revised neuron output threshold is established that is typically lower than the one usually employed for object identification (e.g., 0.4, 0.6, 0.8, 0.9, or 0.95, instead of 0.97). If the network assigns any of the Flickr test images to one of its trained classes, with a probability greater than this revised threshold, that Flickr image is regarded as a fool image for that class, and is added to a set of such fool images for that class. If the network was originally trained to distinguish 1000 classes of objects, and tens of thousands of Flickr images are analyzed, it may be found that 100-200 of these 1000 classes have fool images among the Flickr test images.

The network is then redefined to include a larger number of classes, including a complementary fool class for each of the original classes for which one or more fool images was discovered in the Flickr test images. The redefined network is then trained. The original 1000 classes may be trained using the test images originally used for this purpose. The new complementary fool classes (e.g., 150 new classes) may be trained using the fool images discovered for such classes.

Each class is desirably trained with roughly the same number of training images. If there are 500 training images for each of original classes 1-1000, then there desirably should be about 500 training images for each of the new fool classes, 1001-1150. There are commonly fewer than 500 fool images for each new fool class. To provide balance among the number of training examples, each fool image may be used multiple times for training. Additionally, or alternatively, the fool images may be augmented in different fashions to form derivative images, e.g., by changing rotation, scale, luminance, background, etc. Also, images used to train the counterpart original class (e.g., images correctly depicting products) may be significantly blurred, as noted above, and added to the set of training image for the complementary fool class.

A further, different, batch, of real-world Flickr images can then be presented to the redefined, re-trained network. Each of the original classes that was originally-susceptible to fooling has been now made much more discriminative, by the existence of a complementary fool class—which has been trained to recognize images that were originally similar to product images, but should not have been so-classified. However, the new batch of Flickr images will uncover others of the original classes that are still susceptible to fooling. And a few of the original classes for which a complementary fool class was earlier created, may still be found susceptible to fooling.

Perhaps 22 original classes are newly found, in this second round of testing, to be susceptible to fooling. Corresponding fool images are aggregated in 22 new training sets for 22 new complementary classes. And the few newly-discovered fool images for classes where complimentary fool classes were earlier-created, are added to the existing training sets for those complementary fool classes.

Again, the network is redefined—this time with 1000+150+22=1172 classes (output neurons). Again, the redefined network is trained—this time with the training data used earlier, plus the newly-discovered fool images, and associated derivatives, as training examples for the respective new fool classes.

The process repeats. More new Flickr test images are applied to the 1172-class network. Fool images are discovered for a few more of the original classes for which no fool images were previously known. Perhaps a few more fool images, corresponding to classes for which complementary fool classes already exist, are discovered, and are added to the training sets for such classes.

The process continues in this cyclical fashion: (a) testing with new real-world Flickr images, (b) re-defining the network to include complementary classes for any original classes newly-discovered to be susceptible to fooling, and (c) re-training the redefined network with training data including the newly-discovered fool images, until the false-positive behavior is down below some target limit. (The cycling can continue through one or more cycles after no more new complementary classes have been added, if fool images are newly-discovered for classes for which complementary fool classes already exist.)

If any new complementary class is added, the training desirably should encompass not just the final fully-connected neuron layer, but also one or more previous network layers. If no new complementary class is added—just new exemplars of fool images—then less-extensive training can be undertaken—in some instances just training the final fully-connected layer.

Figure 16:
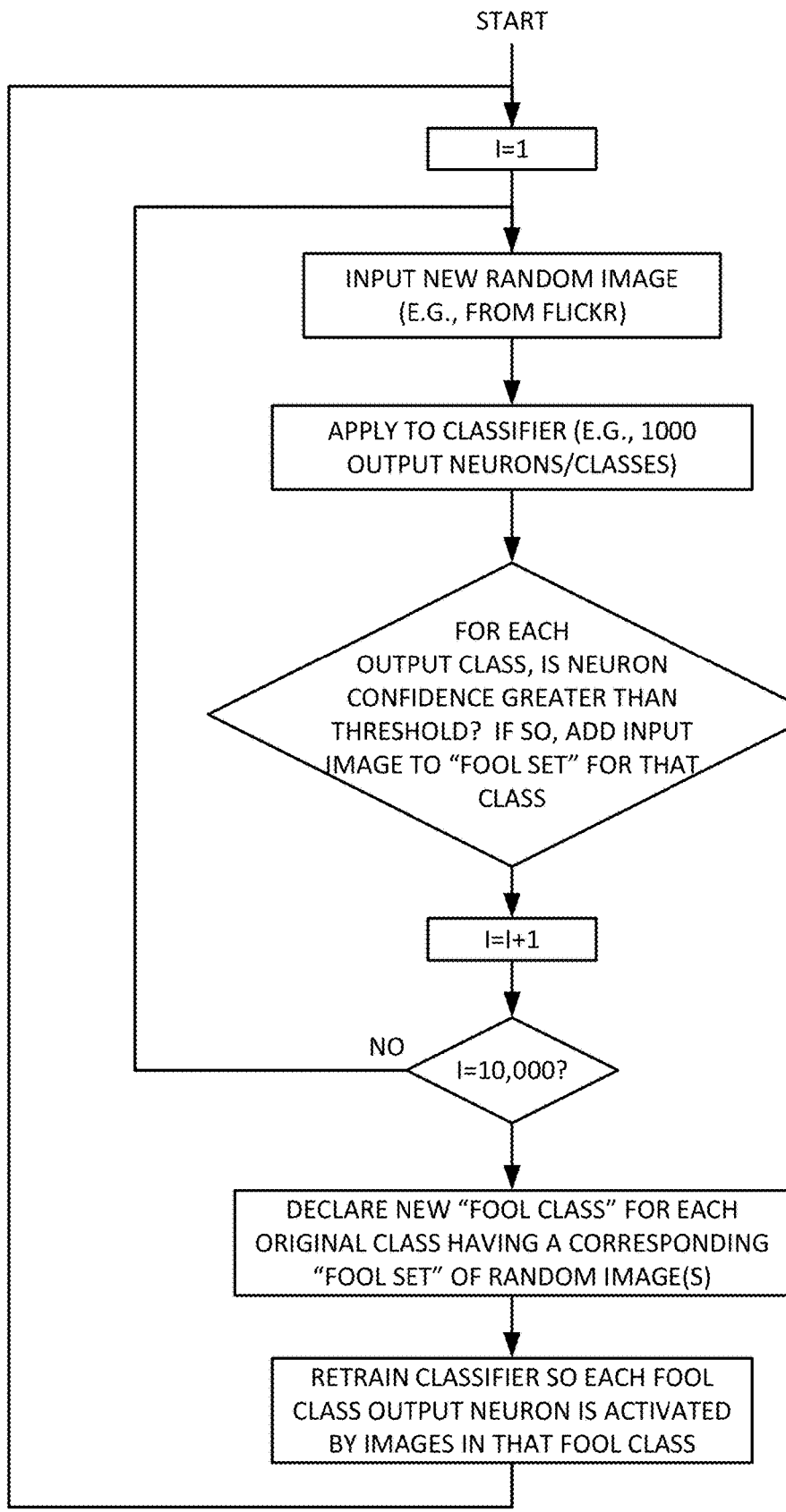
FIGS. 16, 17 and 17A detail methods to improve false positive behavior.
Figure 17:
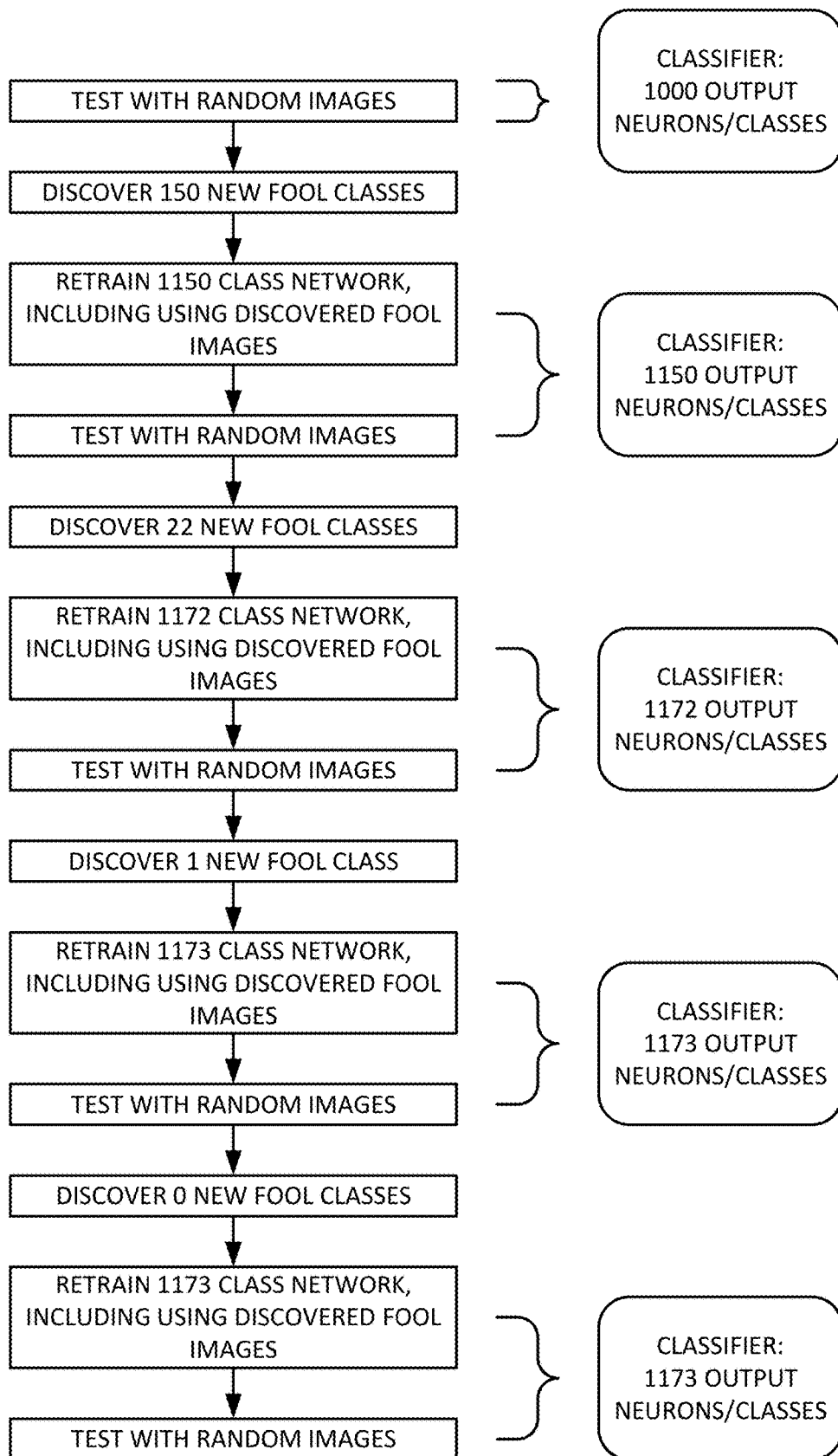

Examples of the just-reviewed arrangements are shown in FIGS. 16 and 17. These are based on a network intended to recognize 1000 product classes. Naturally, to train a larger network, more real-world Flickr training images can be employed. (In some implementations, each new training exercise can include 100,000, 1,000,000, or more, Flickr images.)

Image Data Management and More re Class0

Using the Caffe framework, all of the training data—sample images and associated labels—for classes 1-N are typically placed into a single pool (e.g., computer directory), and are randomly selected from the pool to train the network. In such arrangement, a similar number of sample images (with labels) are desirably included in the common pool to represent each of the N classes.

In an alternative arrangement, sample images for each class are separately pooled. Each pool is assigned a weighting. During training, sample images are drawn from each pool in accordance with its weighting. This facilitates use of training classes with radically skewed numbers of sample images. For example, if a class has a small pool of training images, each image may be drawn from the pool several times. (Such arrangement also facilitates use of multiple threads, e.g., to load sample images into a training batch and to apply any desired on-the-fly augmentations to the images.)

Applicant has found that this weighted pool approach is well suited for use in adversarial training to reduce false positive errors. Consider training a network to recognize 100 desired classes of items, which also includes a Class0. Each of the 100 desired classes of items may be represented by 500 different training images. Class0, in contrast, may comprise 30,000 different training images (e.g., drawn from Flickr). If the pools are equally weighted, then during the course of each training cycle, Flickr images may be selected from the Class0 pool about one time each. In contrast, training images from the Class1, Class2, etc., pools may be selected about 60 times each.

In testing of a network trained in this fashion (i.e., with 30,000 Flickr sample images in a Class0 pool, versus 500 sample images in each of the other class pools), the network was found to achieve a worst-class false positive rate of about 1 in 2500. That is, one out of about every 2500 Flickr images was falsely identified as belonging to one of the 100 classes that the network was trained to identified (i.e., with a confidence score over 0.97). (Flickr images were mis-identified as belonging to the other 99 classes still less often.)

Figure 17A:
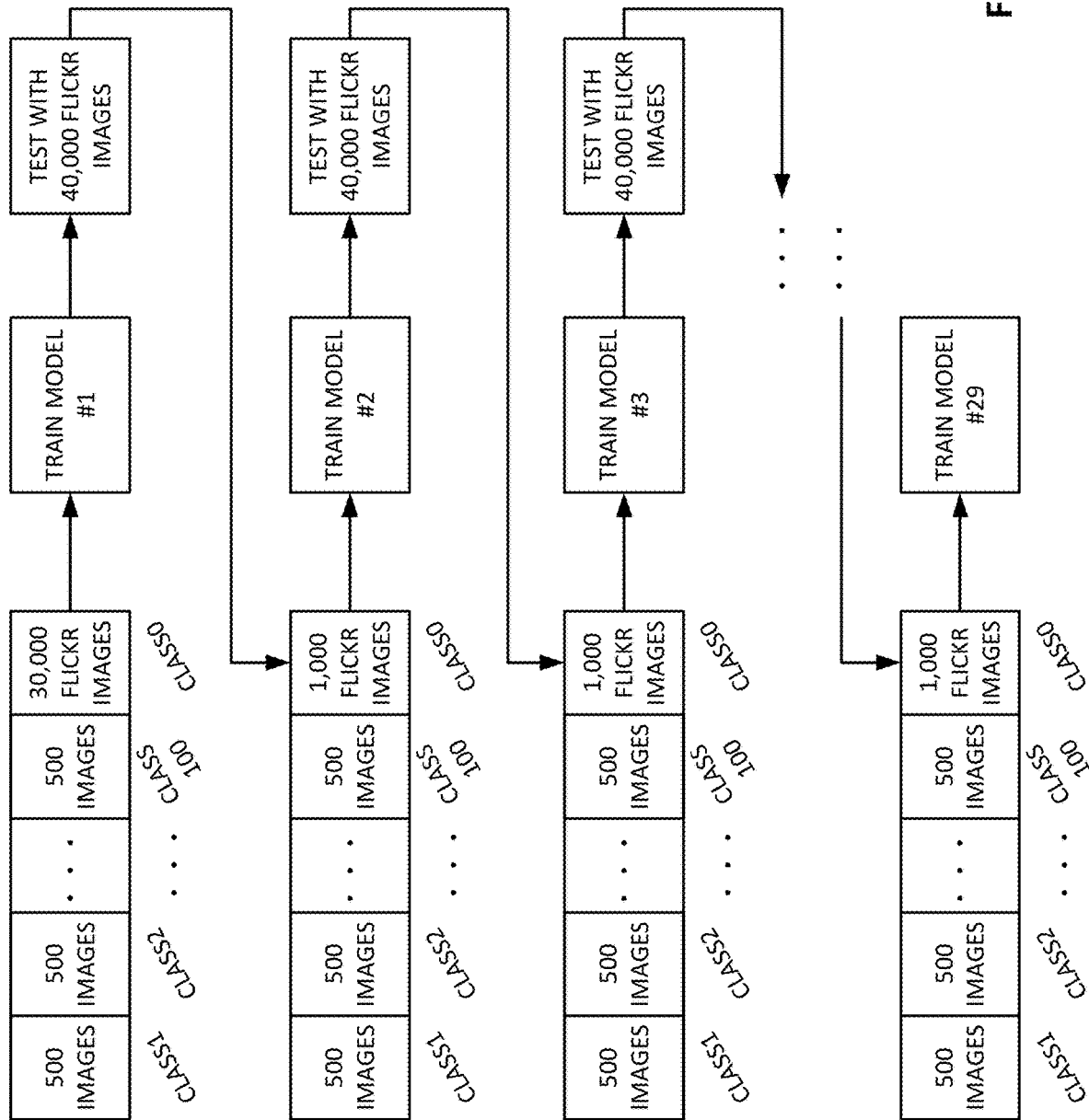

Applicant confirmed that this false positive behavior can be greatly enhanced by an iterative training and testing procedure, as shown in FIG. 17A. A network was trained, as described above, to recognize 100 different classes of supermarket items. 500 sample images of each class, Class1, Class2 . . . Class100, were separately-pooled and used to train the network. Additionally, 30,000 random Flickr images were separately-pooled and used to initially train a Class0.

The resulting model (#1) was then tested for false-positive behavior, using 40,000 random Flickr images. 1,000 of these 40,000 Flickr test images were identified as producing the highest neuron output signals among the intended 100 classes. (About 250 of these 1,000 produced output signals above the 0.97 threshold.) A second round of training was then performed, using the same pools of training images for classes 1-100, but using the just-identified highest-scoring 1,000 Flickr images as the pool of training images for Class0.

The resulting model (#2) was then tested for false-positive behavior, using 40,000 new, different random Flickr images. Again, the top-scoring 1,000 of these Flickr images were substituted into the pool for Class0, and a third round of training was performed.

As shown in FIG. 17A, this cycle was repeated over and over again—29 times in all. After this iterative training and testing procedure, the network was found to have a worst-class false positive rate of about 1 in 33,000. That is, one of the 100 classes was falsely identified as corresponding to a random Flickr test image (with a confidence score over 0.97), for every 33,000 or so input Flickr test images. (The other 99 classes were falsely-identified by a Flickr test image still less often.)

A trade-off in training a Class0 is that it can diminish the output signal produced by the other neurons, in response to an image depicting one of the trained classes. That is, overall recognition diminishes. Some of the trained classes suffer more than others in this respect.

In a network trained to recognize 100 classes (trained using 500 sample images per class), without a Class0, the five worse-performing classes were recognized an average of 35% of the time, whereas the best-performing 50 classes were recognized 99.6% of the time (when presented with test images depicting items in those classes). By adding a Class0, and training it with 30,000 Flickr images as described above, recognition of the five worse-performing classes dropped to an average of average of 25%, whereas the best-performing 50 classes were still recognized 99.4% of the time.

Applicant has found that the recognition statistics for the lower-ranked classes can be improved by enlarging the training image sets for the lower-ranked classes.

Figure 18C:
FIGS. 18A, 18B, and 18C illustrate three different grocery item brandmates that are easily confused.
Figure 18B:
Figure 18A:
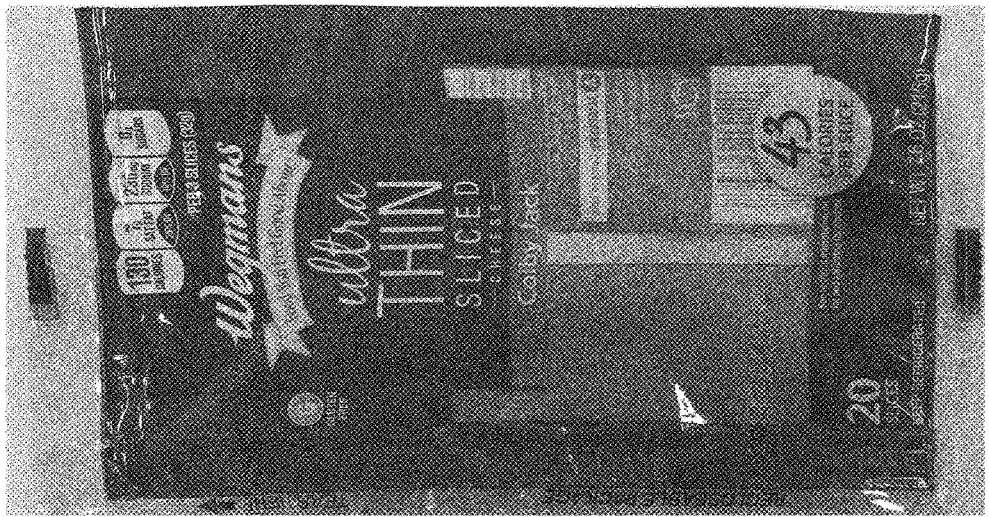
Figure 18C:
Figure 18B:

FIGS. 18A, 18B and 18C show three classes of items that are often among those with lowest recognition percentages. As can be seen, they are brandmates—all of them cheeses in nearly-identical packages, distinguished only by a very few details. Thus, the second- and third-nearest matches yield confidence scores much higher than the usual case—depressing the confidence score of the correct match—often below the 0.97 threshold.

To improve the recognition statistics for these items, Applicant enlarged the training sets for these three classes from 500 images each, to 2500. In a particular embodiment, the product depictions in the 500 training images for each class were each segmented from their respective backgrounds, and augmented with different backgrounds—four different backgrounds for each segmented depiction, yielding 2000 additional training images per class. (Naturally, additional training images can be produced otherwise, such as by additional image captures, or the other techniques detailed herein.)

Increasing the number of different training images in the three sample pools for these three classes lifted their recognition statistics. In a network iteratively-trained and -tested, as above, using Flickr images, the least-frequently recognized of the cheese packages went from being recognized 64% of the time that such a package was presented, to 94% of the time, by increasing the training set for each of these three cheese classes to 2500 images. (The other two cheese packages had higher initial recognition rates, and these rates were also improved by enlarging the training set.)

The just-noted results were achieved with equal weightings of all of the image pools. In other arrangements, the pools for certain classes can be given larger weightings (e.g., 1.1, 1.4 or 2, instead of 1), to cause samples from such pools to be presented more frequently than samples from other pools during training. This strategy is discussed further in the next section.

Improving Recognition Rate

The preceding sections addressed, in part, strategies for reducing false-positive errors (i.e., a query image that depicts none of the trained items, being mistakenly identified as depicting one of the trained items). Such strategies greatly aid the purpose of reducing false-positive identifications, but in so doing they can also reduce true-positive identifications (aka detection rate). There is no free lunch.

For example, in FIG. 17A, if the network is trained to recognize 100 classes, and a confidence threshold in excess of 0.9 indicates a confident identification of an item, then—in testing Model #1 with item depictions—the item with the worst detection rate is found to be recognized 69% of the time. The overall incidence of false positives is 1.4%.

After the depicted 28 further iterations, which optimize the composition of the set of images used to train class 0, the overall false positive rate drops to 0.03%. But the detection rate of the worst-performing class drops from 69% to 48%.

One way to address this impairment in recognition is to vary the weighting of the trained classes, in proportion to the difficulty in recognizing each class.

To set the weighting of different classes for training, the overall recognition rate for each class is determined in a testing phase (e.g., in the testing of Model #1 in FIG. 17A). Most classes are recognized with average confidence scores of 0.90 or higher, but a few classes are much lower (e.g., 0.48 in the worst-case example cited above). For each class, a corresponding "mis-recognition rate" is computed, as the difference between 1.0 and the recognition rate. Thus, a class having a recognition rate of 0.96 has a mis-recognition rate of 0.04, and a class having a recognition rate of 0.48 has a mis-recognition rate of 0.52. The mis-recognition rates for all the classes are then normalized by dividing each by the mis-recognition rate of the best-performing class (i.e., 0.04 in the example just-mentioned), to yield raw training weights for each of the classes. The class with the best recognition thereby is given a weight of 1.0, and all other classes are given higher weights. The network is then re-trained, with training images sampled from corresponding class image pools in accordance with these weights.

This will be made clearer by the following Table I, which gives data on the first five classes of an illustrative system, in which the recognition rate for the worst class is 0.48, and the recognition rate for the best class is 0.96:

TABLE I

| Class | Recognition Rate | Mis-Recognition Rate | Raw Weight |
| --- | --- | --- | --- |
| 1 | 0.9 | 0.1 | 2.5 |
| 2 | 0.96 | 0.04 | 1 |
| 3 | 0.48 | 0.52 | 13 |

TABLE I-continued

| Class | Recognition Rate | Mis-Recognition Rate | Raw Weight |
|---|---|---|---|
| 4 | 0.8 | 0.2 | 5 |
| 5 | 0.85 | 0.15 | 3.75 |

The class weights establish the ratios by which training samples are selected from the respective class pools in the next-retraining. The training images themselves, and their number, may be unchanged (e.g., 500 per class pool), but they are used with different frequencies in training. In the example just-given, four labeled images are sampled from the Class 4 pool for each image sampled from the Class 2 pool. Thirteen images are sampled from the Class 3 pool for every one from the Class 2 pool. Etc. The network is trained most intensively in the classes where it is weakest.

Some classes may have very high recognition rates, corresponding to very low mis-recognition rates. Since the smallest mis-recognition rate is used as a divisor for computing the class weights, some very large raw class weights can result. (E.g., if a class has a recognition rate of 99.5%, the mis-recognition rate is 0.5%. If mis-recognition of the worst-performing is 50%, then the weight for that class is 50/0.5, or 100.) Applicant has found that large weights can be disadvantageous because they can result in inadequate training for some of the most common image presentations (e.g., a front view at about 100% scale, which lacks perspective distortion and rotation). Accordingly, applicant has found it desirable to scale the raw weights computed above down to a lower value, e.g., with a maximum of 1.5, 2 or 3.

To scale raw weights down to a maximum of 1.5, a value of 1 is subtracted from the raw weight; the result is multiplied by the reciprocal of (twice the maximum raw weight minus 2), and a value of 1 is then added to that result. Thus, the raw weights given in the Table I above correspond to scaled weights as shown in Table II:

TABLE II

| Class | Raw Weight | Scaled (Final) Weight |
|---|---|---|
| 1 | 2.5 | 1.0625 |
| 2 | 1 | 1 |
| 3 | 13 | 1.5 |
| 4 | 5 | 1.1667 |
| 5 | 3.75 | 1.1146 |

A later section discusses how multiple synthetic training images can be generated for items. Briefly, a digital file that is used to print product packaging for an item can be texture-mapped onto a shape primitive (e.g., cuboid) corresponding to the shape of the item being modeled. A virtual camera is then modeled at a particular viewpoint relative to the modeled item, and a depiction of the product as it would appear to such a camera is generated. The resulting image can be overlaid over another background image (e.g., randomly sampled from the Flickr image archive). This technique may be used to generate images for both training and testing.

An advantage of synthetic image generation is that all of the image parameters are known in advance (they are used in defining the image). Thus, for example, the perspective angle from which the product is viewed by a virtual camera, together with the product's rotational presentation relative to the camera, and the product's depicted scale (which changes as the inverse of the modeled product-camera distance), are all known.

Synthetic testing images can thus be sorted, or generated, into like sub-classes, based on similarity of one or more such parameters. A simple example might sub-classify a collection of test images for a particular item class based on their scale ranges. A three sub-class grouping can comprise (A) synthesized images depicting a particular modeled item at scales between 40% and 74%; (B) images depicting the item at scales between 74% and 136%; and (C) images depicting the item at scales between 135% and 250%. In testing, an average item recognition rate is then determined for each of these sub-classes. Mis-recognition rates, and the weights derived therefrom, are computed as above. The network is then re-trained, sampling from sub-pools of similarly-scaled training images for these three sub-classes, in accordance with the computed weights. Again, the network is trained most intensively in the sub-classes where it is weakest.

As indicated, images may be grouped based on criteria different than just scale, such as perspective angles, and rotation angle. (Perspective angle can be defined as the angle between the lens axis, and a surface-normal extending out from the center of the front face of the modeled product. In some implementations, two perspective angles can be defined: one indicating the viewing angle in the horizontal direction—with positive being to the item's left; and one indicating the viewing angle in the vertical direction—with positive being up.)

Item sub-classes can be based on combinations of such criteria, leading to potentially large numbers of different item sub-classes. For example, the rotation of the modeled item relative to the virtual camera may sub-classed into one of three different parameter ranges, such as rotation angles between:
    −90° and −30°
    −30° and 30°
    30° and 90°
(It will be recognized that these ranges progress linearly—each spanning a 60 degree range.)

The scale of the modeled item, as depicted by the virtual camera, may be sub-classed into one of four parameter ranges, e.g.:
    40%-63%
    63%-100%
    100%-158%
    158%-250%
(It will be recognized that these ranges progress logarithmically—the top of each range being 158% of the bottom.)

The horizontal perspective of the modeled item, as depicted by the virtual camera, may be sub-classed into seven parameter ranges, e.g.:
    −70° to −60°
    −60° to −45°
    −45° to −20°
    −20° to 20°
    20° to 45°
    45° to 60°
    60° to 70°
(It will be recognized that these ranges are unequal, progressing neither linearly nor logarithmically, but are symmetrical around zero degrees.)

The vertical perspective of the modeled item, as depicted by the virtual camera, may be classed into more or less sub-classes than the horizontal perspective. In a particular example, five sub-classes are used, e.g.:
    −70° to −50°
    −50° to −20°
    −20° to 20°
    20° to 50°

50° to 70°

In this example, images of an item may thus be synthesized to fall into any of 3×4×7×5=420 different sub-classes.

Plural testing images may be synthesized for each sub-class, and average recognition rates for each sub-class are determined by testing the neural network with these images. The resulting recognition rates are then used to generate 420 different weights, as described above.

A round of training then follows, using a different collection of training images that are synthesized for each sub-class (e.g., 10 per sub-class), which are sampled from corresponding class sub-pools based on the just-determined weight values. As before, the sub-classes for which the network exhibited the poorest recognition statistics are used most frequently in the training.

(The same technique can be utilized with testing and training images other than synthetic images. However, the process of labeling each of the images as to its viewpoint parameters is more difficult, e.g., involving human assessment, such as by Amazon Mechanical Turk service.)

Figure 19:
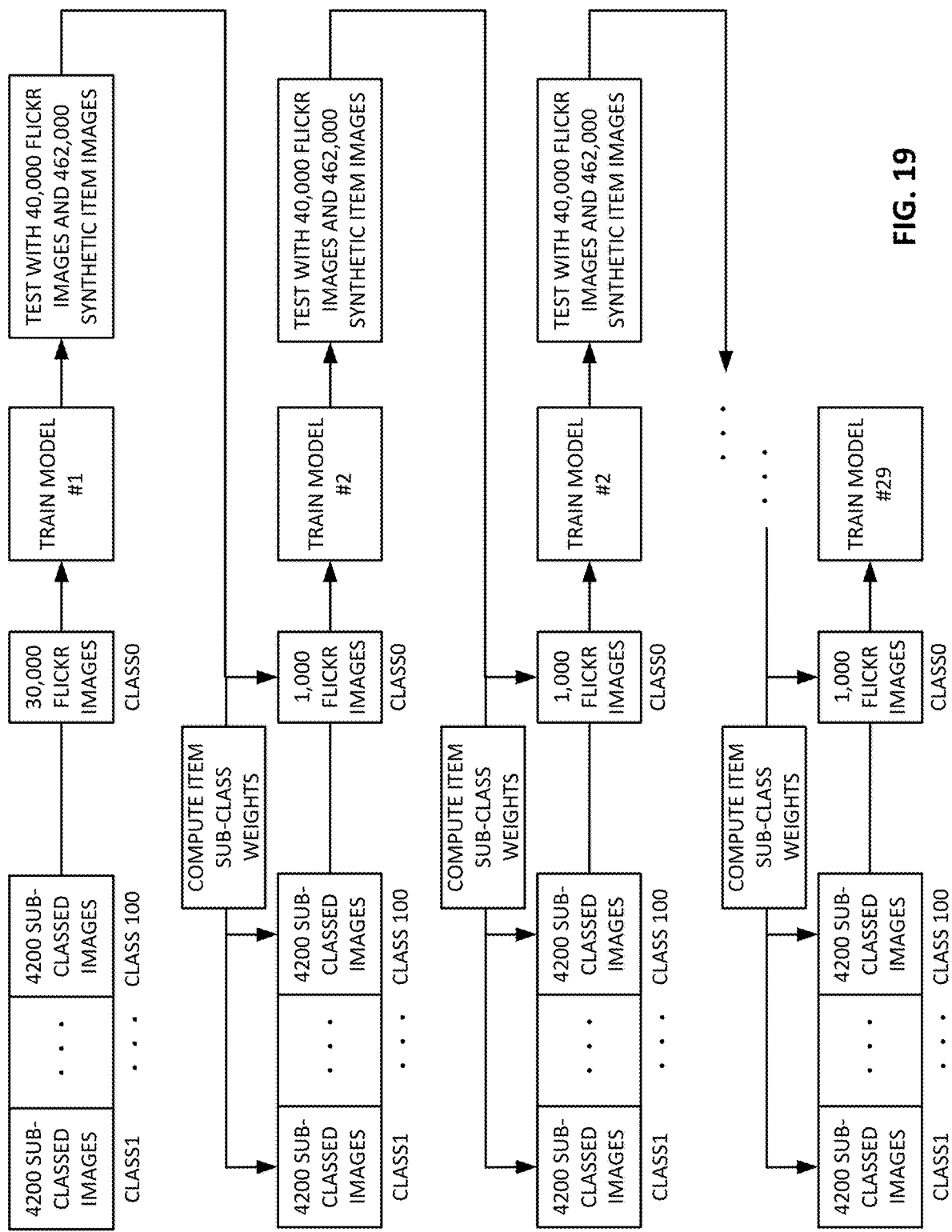
FIG. 19 details a method to improve both item recognition and false positive behavior.

The FIG. 17A procedure for improving network false positive performance can be modified to improve network recognition performance. As shown in FIG. 19, image pools for 100 different items are provided, from which samples are drawn to train the network. Each item may have 420 sub-classes based on viewpoint parameters, as described above. If ten training images are generated for each sub-class, then the aggregate pool for each item comprises 4200 images. As discussed in connection with FIG. 17A, a class 0 is also provided, which initially comprises a pool of 30,000 random Flickr images. The network is then initially trained, yielding Model #1.

The resulting Model #1 network is tested with 40,000 new Flickr images, to identify Flickr images that are most readily confused with item classes. The 1000 Flickr images with the top recognition scores are pooled in a revised class 0 for a second round of training.

Additionally, the Model #1 network is tested with 462,000 synthetic item test images. These are generated in the same manner as the 4200 images per class synthesized for training, but are different images. 11 instances of each item sub-class can be used (yielding the 462,000 number, i.e., 11*420*100). Weights are then computed for each of the 420 sub-classes, as described above, for each of the 100 items. A second round of training then follows.

In this second round of training, the sub-class training image pools for each class are sampled in accordance with the just-computed weights, with the sub-classes that earlier showed the lowest recognition rates being sampled the most. Samples from the pool of 1000 just-determined Flickr images are used to train class 0. A Model #2 network is thereby defined.

Model #2 is then tested as before, with 40,000 Flickr images and 420,000 synthetic item images. The 40,000 Flickr images are desirably new (i.e., not previously used in training or testing), and the 420,000 synthetic item images can be new too.

The class 0 image pool is updated to comprise the 1000 highest-scoring Flickr images discovered to date. Also, new sampling weights are determined for each of the 420 sub-classes for each of the 100 items.

This process repeats again, yielding a Model #3. Alternate training and testing can continue in this fashion for a dozen or more cycles (28 in the depicted arrangement). At the end of the process, the network false positive and item recognition performance statistics have improved considerably.

The just-described process is subject to multiple variations. In one, the item recognition optimization technique can be utilized without any optimization of false positive performance (e.g., no class 0 needs to be trained). Pools of images in different item sub-classes can be generated and used for training and testing—weighting the sampling used in training with the mis-recognition rates discovered in testing.

In another variant, optimization of the network for both false positive performance and item recognition performance does not occur in each of the cycles. Instead, some cycles are devoted just to optimizing false positive performance, and other cycles are devoted just to optimizing item recognition performance.

In the former cycles, the composition of the 1000 image Flickr pool is adjusted preparatory to the next round of training. In the latter cycles, the weights by which item sub-class pools are sampled are re-determined preparatory to the next round of training.

These two types of cycles can alternate, or other patterns can be used. For example, there may be 2-4 successive cycles of false positive optimization, and then one cycle of item recognition optimization. Or vice versa. Or there may be 28 cycles of false positive optimization (e.g., as per FIG. 17A), followed by one or more cycles of item recognition optimization. Etc.

While the different sub-classes discussed above were defined simply by viewpoint variations, the same techniques can be employed to improve item recognition in the presence of other image degradations that can be modeled by image synthesis, such as color distortion, blur, glare, etc.

In a preferred embodiment, the synthesized images are not generated offline in a batch process. Rather, they are generated on the fly as needed—both training images and testing images.

In particular, software randomly picks viewpoint parameters within a range associated with a desired viewpoint sub-class, and renders the digital artwork for a desired item as it would appear when viewed from that random viewpoint. Other software employs a Yahoo API to fetch an image from Flickr (licensed for all uses). Still other software instructions generate a composite image in which the rendered item artwork is superimposed on the background of the fetched Flickr image. The resulting image is not stored; it is used for training (or for testing) and is then overwritten in memory when the next-such image is synthesized.

Methods akin to the foregoing can be used to discern which sub-areas of item imagery are most critical to the network's identification of that item. One way this can be done is by obscuring areas of test images with grey patches, to determine how recognition rates suffer.

Figure 20:
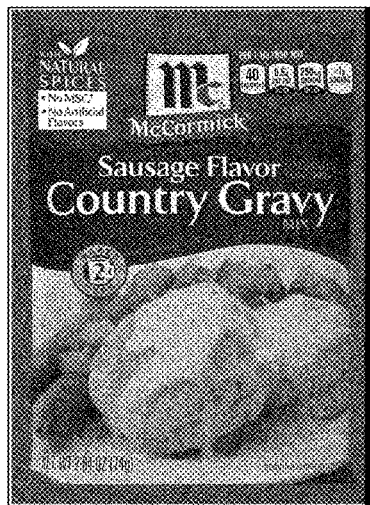
FIG. 20 shows artwork for a packet of gravy.
Figure 21A:
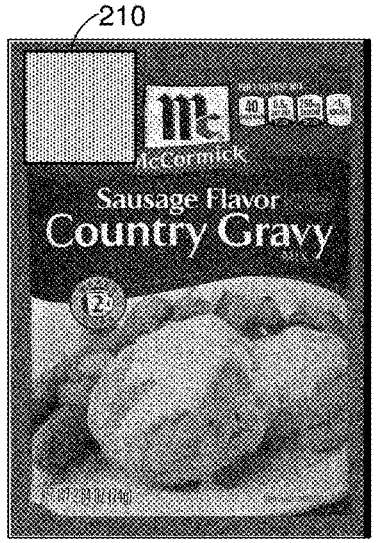
FIGS. 21A-21E show the artwork of FIG. 20 with different regions obscured, e.g., to discover locations of hot-spots and cold-spots.
Figure 21B:
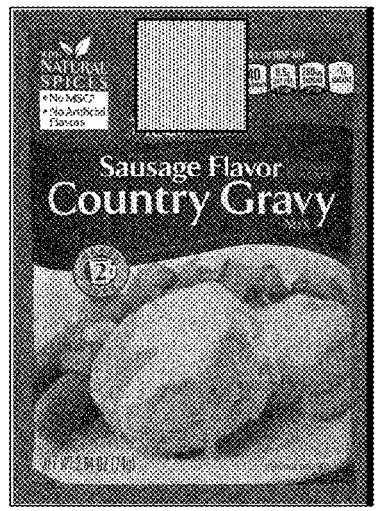
Figure 21C:
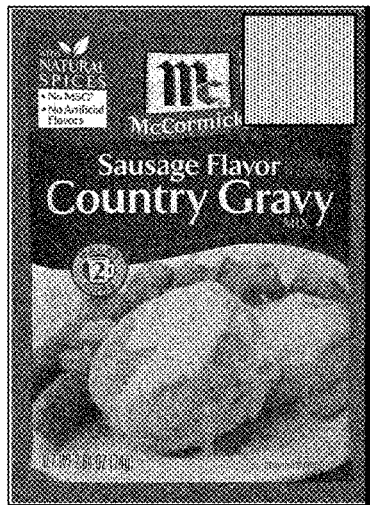
Figure 21D:
Figure 21E:
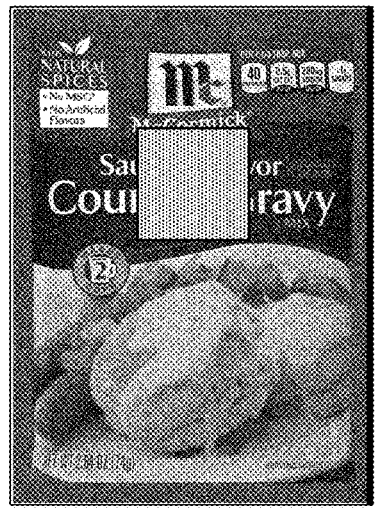

Consider the image of a gravy packet shown in FIG. 20. A network may be trained to recognize this image, and may produce a confidence value of 0.991 on a corresponding output node. Different variations of this image are then also tested—each with a different region obscured with a grey patch 210, as shown in FIGS. 21A-21E. (The depicted square shape of the patch is illustrative only; the patch can be rectangular, rounded, etc., and/or may be feathered at its edge with increasing transparency to better blend into the host image.) Testing produces an item recognition (confidence) score for each altered image, e.g., ranging from 0.990 down to, say, 0.847. The alterations that lead to the greatest decreases in confidence values are those that obscure features that are most essential to recognition of the item. A "map" of essentiality can be produced by stepping the patch across and down the image in small increments, and plotting the complement of the resulting confidence score as a function of the location of the center of the patch. A "heat-map" can thereby be generated for an item, identifying the "hot-spots" that are most critical to recognition of the item.

Knowing which regions of item artwork are most critical to network recognition of the item gives an important insight into possible recognition-failures. In particular, if a critical region of the item is outside of the captured image frame, or if depiction of such a hot-spot region is impaired by glare or an intervening obstacle, then recognition performance will drop. To make recognition robust against such failure modes, the network can be further trained to learn to recognize the item without reliance on such hot-spot region(s), e.g., with such region(s) obscured.

The arrangement of FIG. 19 can be used for discovery of hot-spots, and remedial training. Instead of devoting the multiple sub-classes for each image to different classes of item viewpoints, the multiple sub-classes can be defined by commonalities in obscured areas. Sub-class 1 can comprise images in which a quarter-inch square region in the top left of the artwork is obscured. Sub-class 2 can comprise images in which such a quarter-inch square region, now positioned a tenth of an inch to the right, is obscured. And so forth across, and down, the image artwork. Additional sub-classes can be similar but with larger patches obscured, or with combinations of patches obscured. (In an exemplary implementation, regions ranging from 2% to 50% are obscured. In a 256×256 image, this corresponds to image patches varying in size from 5×5 pixels, to 128×128 pixels.)

An initial round of training can sample uniformly from each of these sub-classes. After such initial round of training, a testing phase (employing similarly-obscured images) reveals which image degradations led to the greatest degradations in recognition. The sub-classes that fared the worst in recognition are then weighted more heavily in sampling from the sub-class image pools in the next round of training, using a weighting procedure as described above. The process can continue as in FIG. 19, for several iterations—training the network not to rely so heavily on isolated regions of the artwork, but instead forcing the network to learn to judge item images more holistically.

Once hot-spot regions for an item are determined, another approach to reduce network reliance on these regions is to generate images based on these excerpts, and to add such images to a class 0 image pool used in training. For example, the extent of the hot-spot can be assessed by obscuring progressively larger regions centered at the discovered hotspot location, and noting the dimension at which further increases in area yield diminishing reductions in recognition score. The hot-spot image patch determined by such process is copied into a new image, where it can be overlaid on a Flickr background image. Multiple such images can be produced—presenting the copied pixels at different locations, over different Flickr background images. Training the network to recognize such images as belonging to class 0 will have the effect of reducing the importance of the copied imagery in identifying the depicted item from which they originated.

When a hot-spot in an image of an item is obscured, the recognition score for the item goes down. There are also "cold-spots"—regions that can be obscured without significantly degrading an item's recognition score. (A "significant" degradation in recognition may be regarded as dropping the average recognition score more than 0.01, e.g., changing from 0.97 to 0.955.)

Counter-intuitively, applicant has found that obscuring some cold-spots can actually improve the item's recognition. On further investigation, this phenomenon is found to be based not on some increased similarity between the cold-spot-obscured testing image, and training images for that item. But rather it is based on decreased similarity between the cold-spot-obscured testing image, and training images for other items. This decreased similarity to other items depresses their respective scores, causing the confidence score for the correct item to increase relative to its competitors. (The confidence score for the correct item may increase per se, or it may simply diminish less than the confidence score for the item having the next-best score. In either event, recognition accuracy increases.)

Consider, as a simple example, a marking that may appear on multiple supermarket items: "12 oz." A region with such a marking, in imagery depicting an item, may be found to be a "cold-spot"—one whose occlusion doesn't significantly degrade recognition of the item. And occluding such region actually reduces similarity of the image to depictions of different items that may happen to have the same text.—pushing down the recognition score for such other items.

Thus, in a further aspect of the present technology, cold-spot locations are determined by the same process as hot-spot locations (e.g., stepping occlusions around an item depiction, and noting changes in recognition scores). Optionally, the extent of the cold-spots can be determined similarly (e.g., by growing the obscuring region until the difference in confidence score between the correct item and its closest-scoring competitor—or its rate of increase—begins to diminish). Images of the item with the thus-determined cold spots obscured are richer in information useful to the network in distinguishing the item from its competitors. Adding such cold-spot-obscured images to the training pool for that item thus serves to help the network learn to distinguish depictions of the item from depictions of its competitors.

Just as training/testing images depicting items from different viewpoints can be generated on-the-fly, images depicting items with different obscured regions can also be synthesized on-the-fly.

While FIGS. 21A-21E comprise front, plan views of an item, the same obscured images can be warped to model their appearance from different 6D viewpoint perspectives, as discussed elsewhere. Collections of such images can then be used to test the network, to discover hot-spots and cold-spots, when viewed from different viewpoints. (For example, when viewed obliquely from the upper left, the McCormick logo at the top center may be found to be critical to recognition; when viewed obliquely from the lower right, the McCormick logo may be much less critical, and detail in the central biscuit may increase in importance, etc.) Information thereby discovered can then be used to generate training images, for class 0 (for hot-spots) or for the intended item class (for cold-spots), as discussed above.

Improving Performance by Training Multiple Output Nodes for Ambiguous Cases

Applicant prefers that a depicted item not be recognized at all, rather than be mis-recognized (i.e., an item confusion error). Similarly-packaged brandmates, such as those of FIGS. 18A-18C pose a high risk of mis-recognition.

To reduce the chance that an item might be mis-recognized as its brandmate, Applicant has found it advantageous to sometimes train two output neurons of a network to both fire. A first is the neuron corresponding to the correct product identification. And a second is a Class0 neuron.

Normally, training serves to configure a network (e.g., with 100 output neurons, corresponding to 100 classes) to maximize the output of a single neuron, corresponding to the class of the item depicted in the input image. Said another way, the network is normally trained to depress the output signal of each of the 99 classes that do not correspond to the input image (which has the effect of commensurately raising the output signal of the neuron of the single class to which the input image belongs). The network is thus trained to maximize the percentage of time that the network correctly recognizes an item.

In accordance with an aspect of the present technology, a classifier that includes a Class0 neuron is trained with excerpts of item depictions that are at risk of being confused with brandmates. This training again causes the output signal from each of the 99 neurons for other item classes to depressed, but here causes the output signals to rise for both the neuron of the single class to which the input image correctly belongs, and the neuron for Class0. (These two signals may rise equally, or in a desired ratio, such as 0.7 and 0.3.) Such a network is trained not to maximize correct recognitions, but to minimize incorrect recognitions. (These two aims are not equivalent, because sometimes the network gives no output—when it can't confidently decide.)

Assume that the three cheeses of FIGS. 18A, 18B and 18C correspond to Class1, Class2 and Class3 (Colby, Cheddar and Provolone) in a 100 item classifier. An excerpt is taken from the FIG. 18A image, as shown in FIG. 18AA. As can be seen, this excerpt is essentially identical to a corresponding excerpt that might be taken from FIG. 18B, and is nearly identical to a such an excerpt from FIG. 18C.

The network is trained to respond to this FIG. 18AA training image by activations of the Class1 and Class0 neurons. Similarly with other training images showing excerpts of the Colby cheese package of Class1.

The network is likewise trained to activate both the Class2 neuron and the Class0 neuron, when an excerpt from FIG. 18B—as is shown in FIG. 18BB—is presented. (Similarly with other training images showing excerpts of the Cheddar cheese package of Class2.) Finally, the network is trained to activate both the Class3 neuron and the Class0 neuron, when excerpted depictions of the Provolone package of FIG. 18C are presented—as in FIG. 18CC.

In one particular embodiment, the network is trained to respond to each such excerpt by outputting a signal of 0.5 from the neuron of the correct item class, and 0.5 from the neuron of Class0.

In a variant embodiment, the network is trained to respond to a sample image by outputting a signal, on the neuron of the correct item class, equal to the fraction of the item depicted by the training image. If FIG. 18AA depicts 48% of the Colby cheese package, the neuron for Class1 is trained to output a signal of 0.48 in response. The Class0 neuron is trained to output the complement: 0.52. (Such training drives the output signals produced by the 99 other neurons towards 0.)

In this variant embodiment, if FIG. 18BB depicts 35% of the Cheddar cheese package, the neuron for Class2 is trained to output a signal of 0.35, whereas the neuron for Class0 is trained to output a signal of 0.65.

If FIG. 18CC depicts 40% of the Provolone cheese package, the neuron for Class3 is trained to output a signal of 0.4, whereas the neuron for Class0 is trained to output a signal of 0.60.

For complete training images, the network is trained as before. For example, the network is trained to activate the Class1 neuron when the complete image of FIG. 18A is input. Likewise with the Class2 and Class3 neurons, when the images of FIGS. 18B and 18C are respectively input.

Figure 18D:
FIG. 18DD shows an ambiguous query image, which may have been captured from any of the three different packages depicted in FIGS. 18A, 18B and 18C.
Figure 18A:

Imagine, now, that the trained network is presented with a query image like FIG. 18DD. How to respond?

In its training, the network saw a similar excerpt when FIG. 18AA was presented, in response to which it was taught to activate the neurons of Class1 and Class0. It also saw a similar excerpt when the training image of FIG. 18BB was presented, to which it was taught to respond by activating the neurons of Class2 and Class0 (with a slightly greater output signal indicating Class0). It also saw a similar excerpt when the training image of FIG. 18CC was presented, to which it was trained to respond by activating the neurons of Class3 and Class0 (again, favoring Class0). All three of these training experiences indicated the Class0 neuron should be activated, whereas the Class1, Class2 and Class3 neurons were activated only one time each.

This technique has the effect of reducing the chance that a neuron for a brandmate will erroneously have the largest output signal when an ambiguous image is presented, since some of the network energy is trained to be diverted to the Class0 neuron. The more brandmates there are, the lower the probability that one of the wrong items will be identified, because the probabilities sum to favor a Class0 output instead. (This also has the effect that the correct item will also not be identified from the ambiguous image—in favor of a Class0 output instead, but, as noted, it is preferable to not identify an item at all rather than identify a wrong item.)

Given such training, the network may respond to the query image of FIG. 18DD by producing output signals of, for instance, 0.59 from the Class0 neuron, 0.16 from the Class1 neuron, 0.13 from the Class2 neuron, and 0.12 from the Class3 neuron. No neuron produces an output signal greater than a threshold value of 0.97, so the final result is that the classifier makes no identification.

Over many trials, random processes will introduce variations in these results. Occasionally one neuron may output a signal greater than 0.97. But any such threshold-crossing output signal is much more likely to be output from the Class0 neuron than any of the others.

This training thus satisfies the design goal of having the network either classify an item properly, or not at all.

(The noted training of the network with images that fully-depict a product, like the image of FIG. 18A, to activate a single corresponding output neuron, will generally cause the network to correctly identify each of different brandmate products—as long as their depiction in the query image is substantially complete.)

The training of a classifier to respond to certain stimulus by activating two (or more) of plural output neurons, with desired weightings (e.g., 0.35, 0.65) is known in the art, as detailed by writings such as Bishop, Pattern Recognition and Machine Learning, Springer, 2007 (ISBN 0387310738). A relevant excerpt, from section 4.3.4 of the Bishop book, entitled Multiclass Logistic Regression, is attached to incorporated-by-reference application 62/426,148.

As is familiar, network training seeks to minimize an error between predicted and actual class labels (probabilities). In a SoftMax classifier, one such error metric is based on "negative log-loss"—the negative of a sum of correct class probabilities over the set of training samples.

In the Bishop excerpt, a target vector, t, can be a vector of values, such as (0.5, 0.5, 0, 0, . . . ), respectively indicating the probability that the input stimulus may belong to the first two classes with equal probabilities. The training criterion to be minimized is set forth in Bishop's equation 4.108:

$$E(w_1, \ldots, w_k) = -\sum_{n=1}^{N}\sum_{k=1}^{K} t_{nk} \ln y_{nk}$$

where an N×K matrix of variables is comprised of elements $t_{nk}$; $y_{nk}=y_k(\Phi_N)$, where $\Phi$ is a feature vector; and w are weights for each of K classes. This equation is known as the cross-entropy error function for multiclass classification.

When the training vector t=(1, 0, 0, 0 . . . ), only the probability of the first class to be minimized during training is considered. When the training vector t=(0.5, 0.5, 0, 0 . . . ), the probability of the first two classes to be minimized are considered. (Other weightings, such as (0.35, 0, 0, . . . , 0.65) can naturally be used.)

In one particular embodiment, classes containing brandmates that risk visual confusion are first identified. (This can be accomplished during a testing phase, in which brandmates may have lower recognition rates, or higher item-confusion rates, than most other item classes.) Training images for each such class are produced, e.g., as detailed earlier, and pooled in training pools for the respective classes. Copies of some or all of these training images are then edited (automatically or manually) to depict partial objects.

For example, the image of the Colby cheese package in FIG. 18A may be clipped to omit the bottom 10%, forming one edited image. The FIG. 18A image may clipped to omit the bottom 20%, forming a second edited image. And so forth until the bottom 90% is removed, forming a ninth edited image. The process can then be repeated down from the top, first removing the top 10% of the image, and then the top 20%, etc. Nine more images are thereby produced. Similar processes can proceed from the two sides. By this particular process, 36 edited images of the Colby cheese package are produced from a single training image. All are put in the Class0 image pool.

The process is repeated for FIG. 18B (Cheddar cheese), and again for FIG. 18C (Provolone cheese).

In training, when one of the edited Colby cheese images is selected from the Class0 pool, the network coefficients are iteratively adjusted to drive the Class1 output neuron to produce a signal indicating—in one implementation 0.5, or—in another implementation, the fraction of the Colby cheese item depicted in the edited image (e.g., 0.1 to 0.9), and to have the Class0 output neuron produce a complementary signal (i.e., 1—(Class1 output)). Similarly when one of the edited Cheddar or Provolone cheese images is selected from the Class0 training pool.

In one such embodiment, the training procedure picks images from the different class pools in equal numbers (e.g., 1000 from each). In another arrangement, the pools for Class1, Class2 and Class3 are given higher weightings than for certain other classes, causing images from their respective pools to be used more often in training. Alternatively or additionally, the pool for Class0 may be given a higher weighting than for certain other classes, causing images from this pool to be used more often in training.

(In still a further variant, the network is trained to respond to fractional depictions of confusingly-similar brandmates not by activating two output neurons, but by activating only the Class0 neuron, if the depicted fraction is less than a threshold amount. For example, the threshold may be 0.7. If the FIG. 18A image is clipped to retain only 60% of the original image, then the network is trained to activate only the Class0 neuron, with a full activation signal of 1.0. In contrast, if the FIG. 18A image is clipped to retain 80% of the original image, then the network is trained to activate only the Class1 neuron (again with a full activation signal of 1.0). The first of these two clipped images may be stored in the Class0 sample image pool; the second may be stored in the Class1 sample image pool.)

A network as described in this section may additionally be trained to recognize other items that are not brandmates that risk confusion. For these items, the network can be trained to respond to partial depictions by activating only a single output neuron—the neuron corresponding to the item class. One partial item depiction may thus be used to train the network to activate two output neurons, and another partial item depiction may be used to train the network to activate only one output neuron.

While the arrangement detailed above contemplated training a single class 0, in other arrangements, multiple class 0 output nodes can be utilized, e.g., one for each of the items evidencing an elevated risk of item-confusion.

Twisted Networks

Returning to the illustrative network of FIG. 2, data passes from left to right—both between stages within a layer, and between successive layers. Each stage receives one data structure as input, and provides another data structure as output. In image processing networks, each of these data structures commonly is a 2D array of elements (originally corresponding to rows and pixels of the block of input data). Each data structure may thus be conceptualized as having top, bottom, and side edges. (The implementation of these data structures in physical memory may be arranged otherwise, e.g., as a 1D array of values.) Each of these output data structures is conveyed by an interconnect (most commonly a logical link, rather than a physical coupling) to a next stage, where it serves as the input data structure.

Figure 22A:
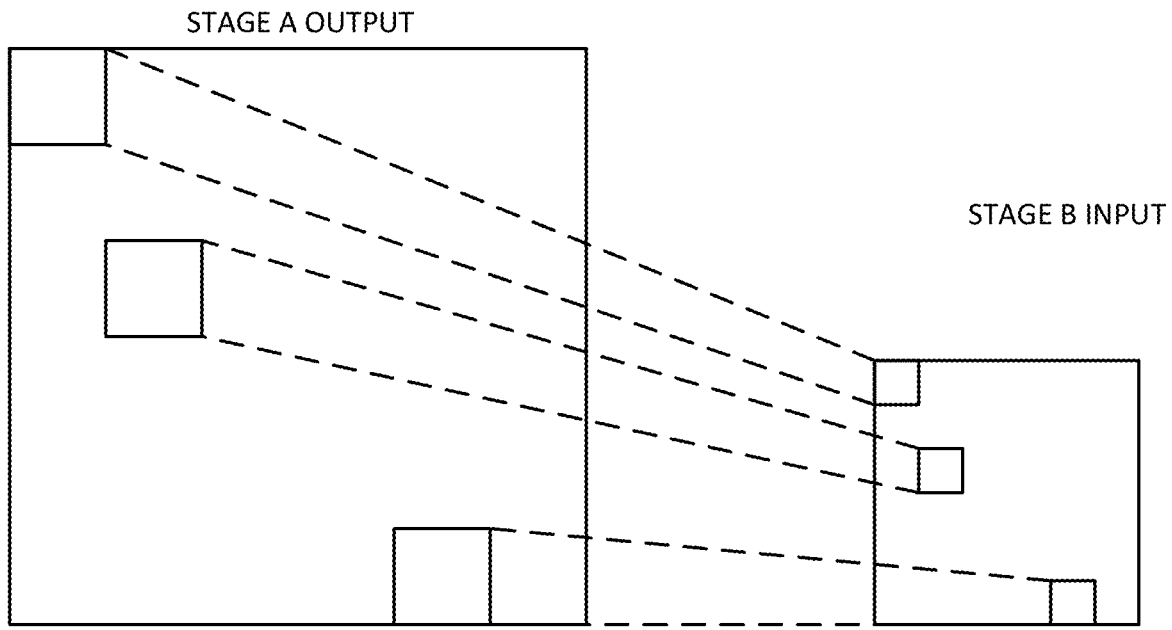
FIG. 22A illustrates behavior of a prior art interconnect between network stages.

Normally, as shown in FIG. 22A, these interconnects may be said to maintain uprightness. That is, elements along the top edge of one stage's output data structure are provided as the data elements along the top edge of the next stage's input data structure. Similarly with the sides and bottom. (What starts on top stays on top, etc.)

In accordance with a further aspect of the present technology, one or more interconnections—between stages or between layers—is arranged not to maintain uprightness. Instead, such interconnect is arranged to spatially transpose a data structure output by one stage prior to its provision as input to the next stage.

Figure 22B:
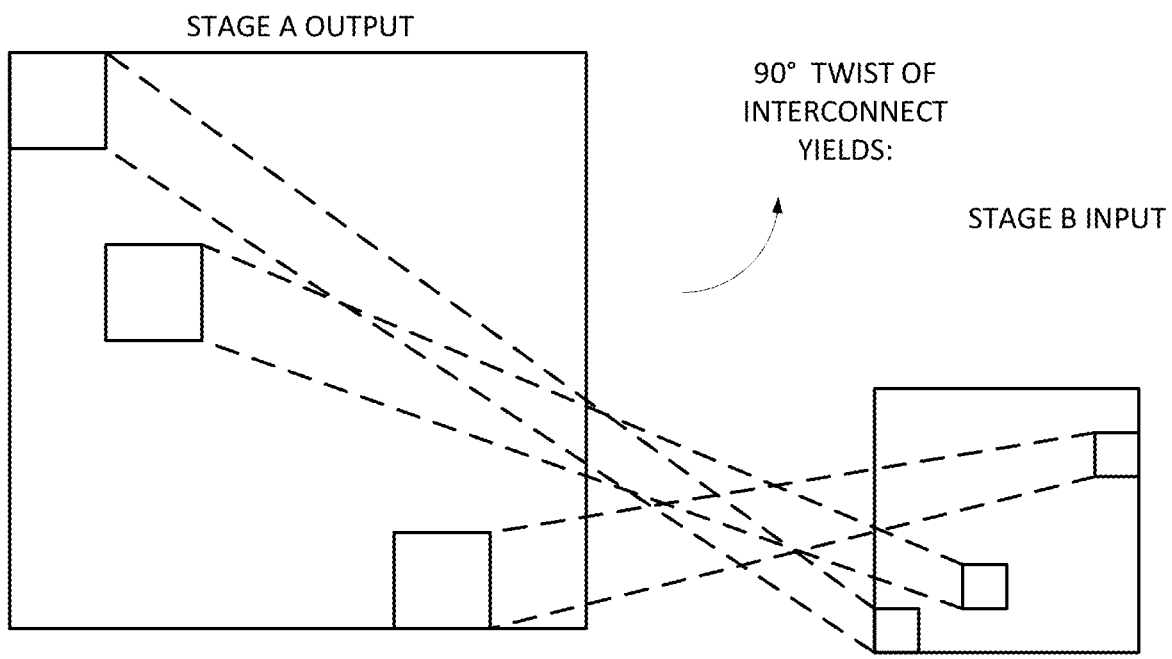
FIG. 22B illustrates behavior of a twisted interconnect, according to one aspect of the present technology.

FIG. 22B shows one particular such variant interconnect. In the FIG. 22B interconnect, the data element in the upper left corner of a data structure output by one stage, is transposed by the interconnect to serve as the data element at the lower left corner of the data structure input to the next stage. All the other elements in the data structure output by stage A are similarly spatially transposed by 90 degrees when provided as the data structure input to stage B. The FIG. 22B arrangement may be termed a twisted coupling interconnect, and more particularly a 90 degree twisted coupling interconnect.

An advantage of such an arrangement is that it allows the network to be trained to recognize objects at orientations other than a single, default, orientation. For example, a network trained with images of a can of Pepsi soda resting on its flat base may not be able to recognize a can of Pepsi soda if depicted resting on its side. The detailed arrangement, in contrast, can be trained with depictions of the upright can, and can then recognize the can resting on its side—without additional training.

Figure 23:
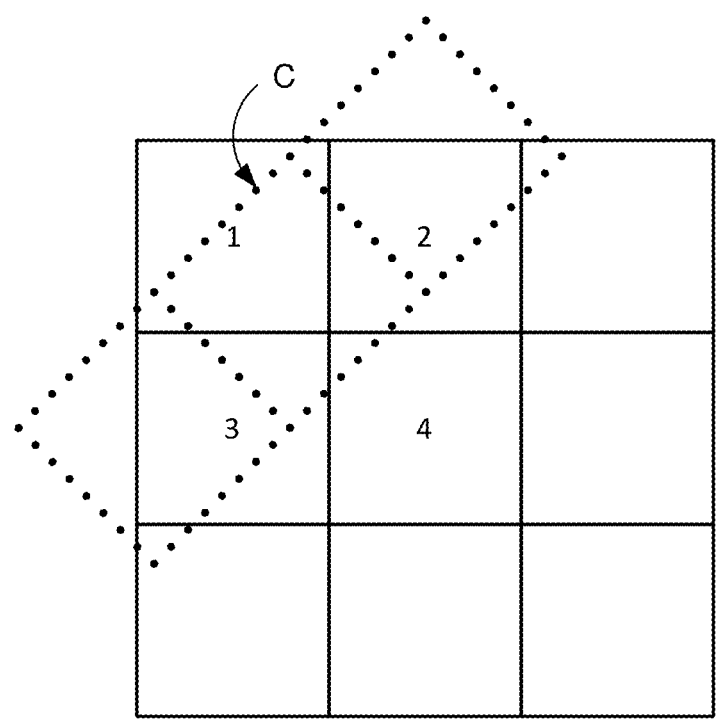
FIG. 23 illustrates how twisted interconnect, of an arbitrary angle, can be realized.

While twists in increments of 90° are simplest, other angular twists can also be achieved. FIG. 23 depicts a twisted relationship between an output data structure of one stage (in solid lines) and an input data structure of a next stage (in dotted lines). The value of the center dotted input datum "C" is the weighted sum of the four solid line output data, weighted in proportion to their respective area overlaps (e.g., 54% the value of output datum 1, plus 21% the value of output datum 2, plus 21% the value of output datum 3, plus 4% the value of output datum 4).

To increase the reliability of object recognition at different orientation, several paths through the network, traversing several different twisted coupling interconnects in parallel with a standard interconnect (which maintains uprightness) may be used.

Figure 24:
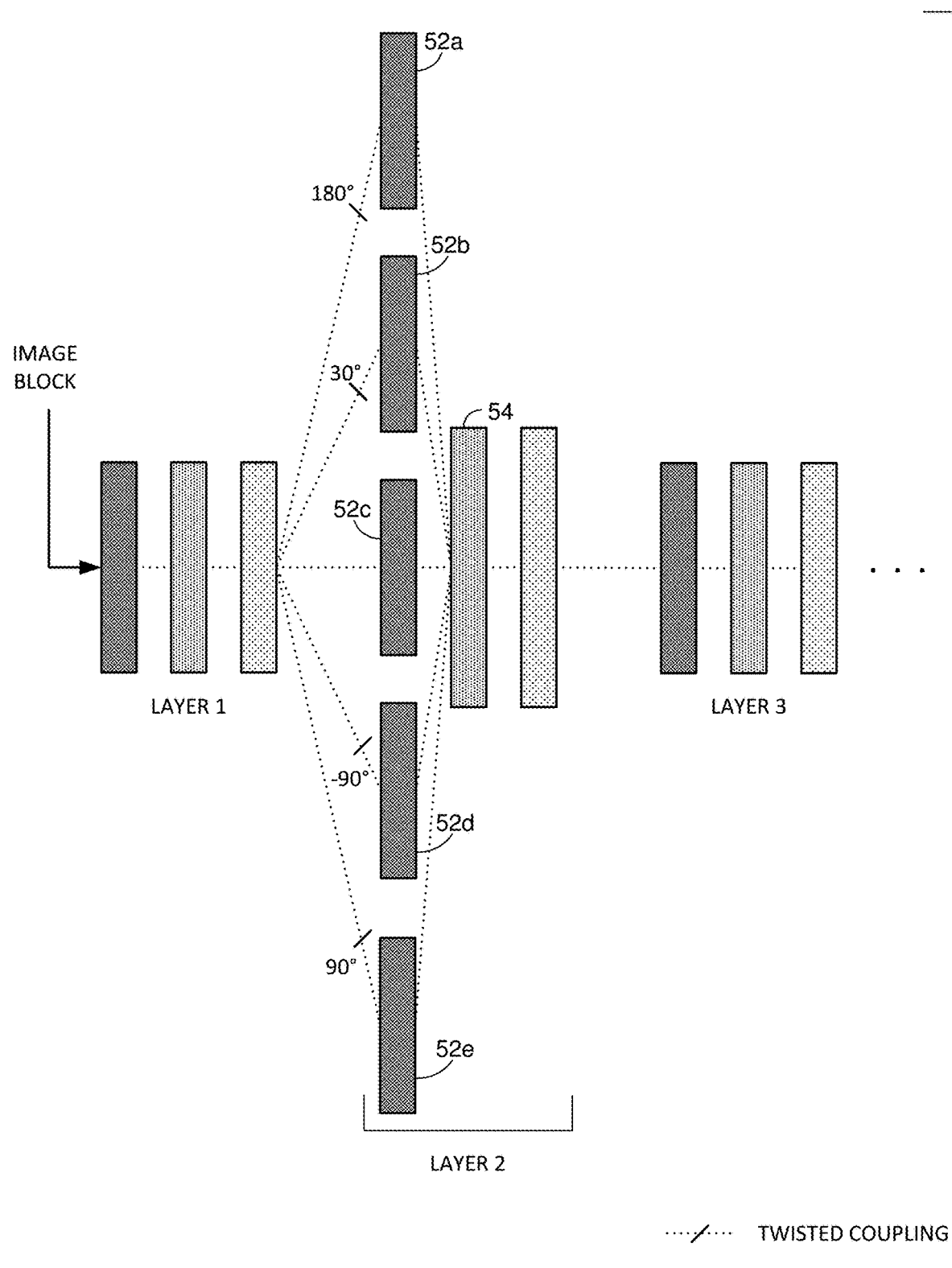
FIG. 24 shows show a neural network can employ multiple different twisted interconnects.

FIG. 24 shows one such an arrangement, in which the output stage of layer 1 feeds five interconnects to five subsequent stages 52a-52e. One interconnect is standard (maintaining uprightness), and the others are twisted couplings with twists, respectively, of 180°, 30°, −90° and 90°. Of course, an arbitrary number of such interconnects and stages can be used.

Figure 25:
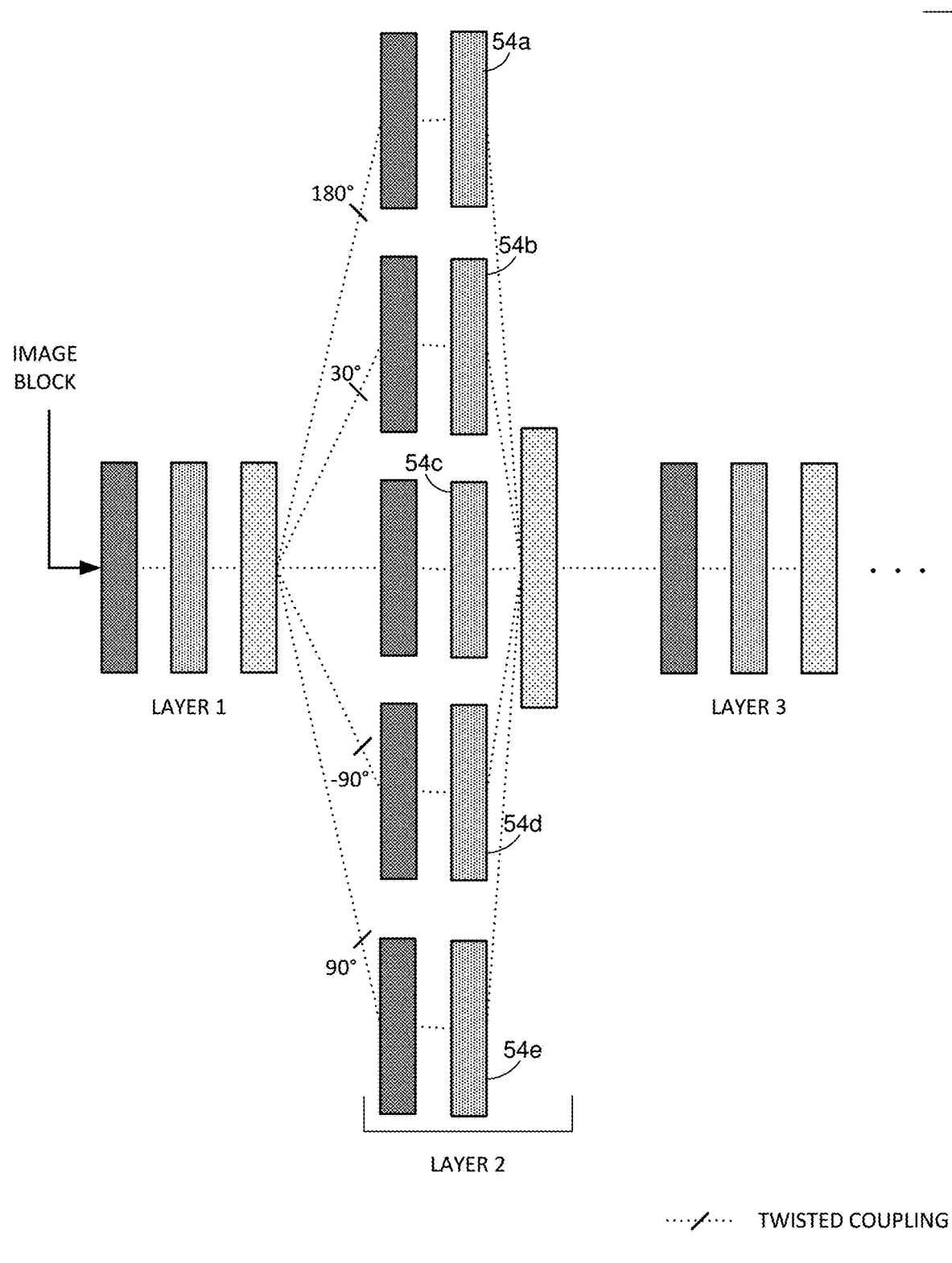
FIG. 25 shows a variant of the FIG. 22 arrangement.

In the FIG. 24 arrangement, the multiple stages 52a-52e fed with differently-twisted inputs feed into a common subsequent stage 54, which is larger on account of the larger number of elements provided as input (i.e., the output data structures provided by stages 52a-52e). In other embodiment, the multiple stage architecture can be maintained for one or more stages, or layers, further through the network, e.g., as shown in FIG. 25.

Distributed Systems

Figure 26A:
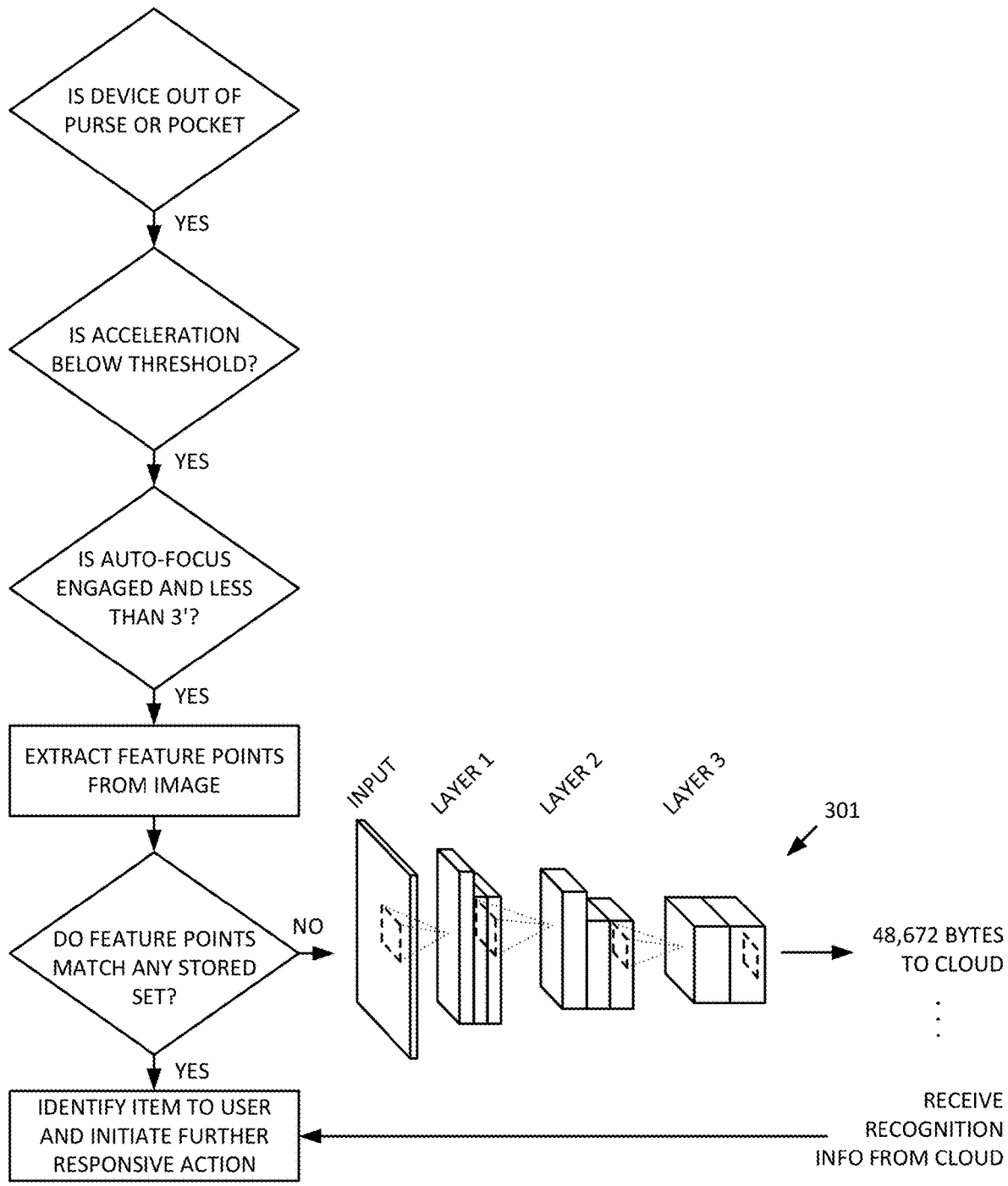
FIG. 26A shows a smartphone-side of a distributed recognition system according to an aspect of the present technology.
Figure 26B:
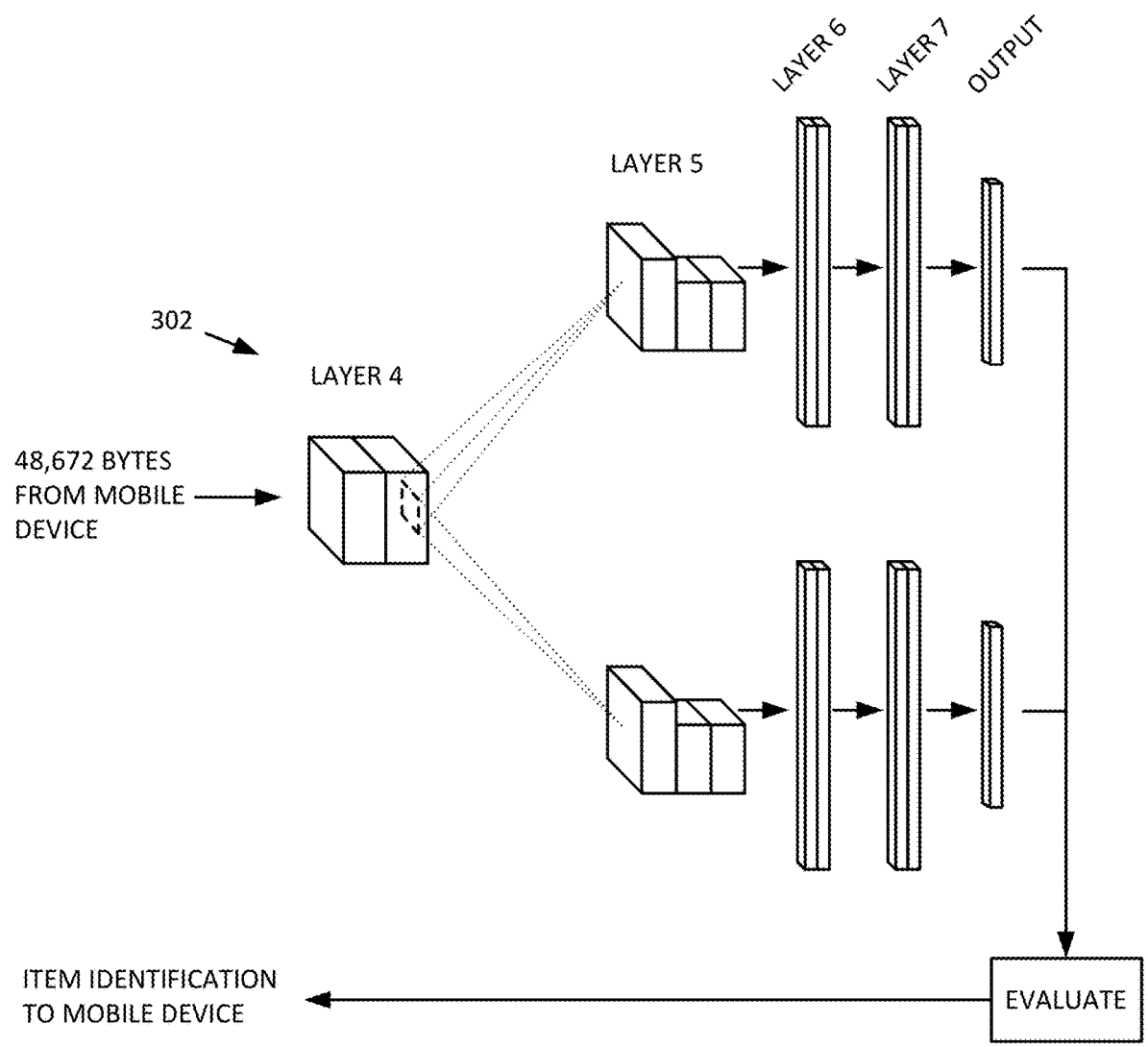
FIG. 26B shows a remote server-side of the distributed recognition system of FIG. 26A.

FIGS. 26A and 26B detail yet other aspects of the present technology. The depicted system includes two parts—a first part (FIG. 26A) that executes on a mobile device (e.g., a smartphone), and a second part (FIG. 26B) that executes on a remote server (e.g., an Amazon AWS or Microsoft Azure cloud service).

The first part begins by checking context to determine whether image processing is worthwhile. Although a variety of contextual checks can be made, the illustrative system first checks whether the device is out of the user's purse or pocket. Such a check can be made, e.g., by examining a camera-captured frame of imagery to determine if it is dark or without discernable edges. Next, a check is made to see if the phone is accelerating more than a threshold amount. (A smartphone, carried while a user is running, is unlikely to be capturing imagery for identification.) A further check examines the auto-focus state of the camera—is auto-focus active, and does it indicate a focal distance below a threshold value (e.g., three feet)? If the context tests are passed, a frame of imagery is processed to extract and express distinctive image features such as corner points. Familiar techniques such as SIFT, SURF or ORB may be used.

The distinctive feature points extracted from the captured imagery are compared against a library of reference features stored in a local memory. This memory may store reference feature points for a few dozen, or few hundred, different items. These may be, e.g., the items that are expected to be most commonly-encountered by the user. These sets of reference feature points may be provided to the user device by wireless periodically, such as daily or weekly, or whenever a corresponding app on the user's smartphone is launched.

If a match of sufficient confidence is found, between the feature points extracted from captured imagery, and a set of locally-stored reference feature points, the depicted item is thereby identified, and such identification is indicated to the user on a screen of the mobile device. Further action corresponding to the identified item can also be undertaken by the mobile device. (E.g., if the item is a foodstuff, the action can include accessing a remote server having nutritional information for the item, and presenting such information to the user. Such an arrangement is detailed, e.g., in applicant's patent application 62/400,083, filed Sep. 26, 2016.)

If a feature point match is not found by the mobile device, data is sent to the remote server to try and identify the depicted item. This data may comprise the feature point data earlier extracted. At the remote server, such data can be compared against a much larger set of reference data—allowing the depicted item to be matched to a much larger universe of candidate items.

Alternatively, or additionally, image data can be sent to a remote neural network for classification. In one embodiment, the captured image data itself is sent (or counterpart image data that has been compressed in accordance with a model of the human visual system, to maintain just the visual features of the image that are most important to human perception, e.g., by JPEG compression). A neural network at the cloud server, following the teachings of the prior art—or of any of the arrangements described herein—can process such input imagery and determine whether it depicts an item that the network has been trained to recognize. If so, data identifying the recognized item is returned to the user's mobile device. Such information can be presented to the user—and further action(s) launched—as detailed above.

Rather than send the captured imagery, or a counterpart that has been processed based on the needs of the human visual system (e.g., JPEG-compressed), applicant prefers to send data that has been processed by one or more initial layers of a neural network. The remote server then provides the processing of the subsequent layers of a neural network. That is, a neural network is distributed between the local and remote systems—with one or more layers 301 (FIG. 26A) of it on the mobile device, and one or more layers 302 (FIG. 26B) on the remote server, with intermediate data sent from the former to the latter.

This intermediate data is generally smaller than the originally-input image data, although this is not required. (In one example, 48,672 bytes of uncompressed data are sent from the mobile device.) So there is often a bandwidth economy by sending the data in this partially-processed state.

This intermediate data has also been processed by the initial layers of the network with the sole aim of identifying the item depicted in the image. No regard has been paid to considerations of the human visual system. The data sent from the mobile device to the remote server is essentially optimized for the task of item recognition.

(The intermediate layer outputs can be compressed by 1-, 2 or 3-bit quantization and run-length compression, since the output of a ReLU unit is either a positive number of zero (for all negative inputs); there are thus usually many zeroes in the output data.)

The stages 301 of the network on the mobile device may be regarded as performing a compression operation, and the stages 302 on the remote server may be regarded as performing a decompression operation.

In one particular embodiment, the coefficients that govern operation of the neural network layers 301 on the mobile device (e.g., the convolution kernel weighting, stage strides, etc.) are not stored in RAM memory, where they can be easily changed. Rather, a more persistent form of memory is employed, because such coefficients will usually never be changed. Even if the distributed network is updated to recognize additional classes of items, applicant prefers to keep the initial stages static in their configuration. Only the stages at the remote server are re-trained as the recognition needs of the network change (e.g., by items being added to or dropped from a supermarket's inventor). Thus, in one illustrative implementation, the coefficients that govern operation of these initial stages are burned into ROM memory, or otherwise hardwired.

FIG. 26B shows the part of the network on the remote server. As noted, the network can have any topology; the particular choice will be application dependent. The depicted arrangement is drawn from the earlier discussion of FIG. 6.

The intermediate data from the mobile device is received by the remote server and input to the next layer of the distributed network. It processes the data through one or more layers until an output layer is reached. Evaluation logic then examines the output neurons to determine if the network has classified the input data with requisite confidence (e.g., a single output neuron with a value of 0.97 or above). If so, data identifying the indicated classification is returned to the mobile device. If not, data is sent to the mobile device indicating no classification has been made.

In the latter case, the mobile device may capture another frame of imagery, and the above-described process repeats. In such fashion, the system continues to grab and analyze imagery until a depicted item is identified.

In some arrangements, a mobile device may apply several different recognition operations to frames of captured imagery. Such systems are detailed in patent application 62/451,487, and in others of the patent documents referenced herein. For example, one frame may be analyzed for a barcode (or several barcodes, having different locations/parameters), a next frame may be analyzed for a digital watermark, and a following frame may be analyzed for item recognition. The recognition technologies detailed in the present specification, including the arrangement of FIGS. 26A/26B, can be employed in such systems.

In a particular implementation, the parameters and data used in the mobile device part 301 of the distributed network can be represented in more abbreviated fashion than the parameters and data used in the remote server part 302 of the network. For example, on the mobile device, parameters may be represented as 8- or 4- or even one-bit integers. The data being processed may be similarly represented. In contrast, at the remote server, its parameters and data may take the form of larger integers, or floating point numbers.

Multi-Frame Identification

In an alternative arrangement, instead of processing data from a single frame of imagery, a system—such as the distributed system of FIGS. 26A/26B—can process a multi-frame image set collected by the mobile device. For example, the mobile device can collect five successive frames from a video sequence captured at 30 frames per second. Or it can collect five uniformly spaced-apart frames of such a sequence—perhaps spanning 0.5 or 1.5 seconds. Or it can collect a single frame, and then collect a next frame when the imagery has changed by a threshold amount, such as by the user moving the device. (The degree of change may be established by a correlation operation, comparing the first collected frame with subsequent captured frames.) The mobile device may continue collecting additional frames in this fashion, gathering a sequence of e.g., 2-5 different image frames. The resulting sequence is submitted to the initial stages 301 of the neural network, with the intermediate data transferred as before.

In such case, it will be understood that the neural network has been trained to operate using a multi-frame sequence of input data, rather than just a single frame.

In a variant embodiment, data from multiple such frames are composited into a single frame, for item identification. (Such arrangements are detailed, e.g., in applicant's patent documents 20030002707, 20120275642 and U.S. Pat. No. 7,346,184.

In another embodiment, a single frame of imagery is submitted for recognition by a neural network. If it yields an identification with a confidence greater than 0.97, the process ends with this identification. If the top candidate identification has a confidence score less than 0.97, but the second-to-top identification has a score that is markedly less (e.g., less than 0.3), then a second frame of imagery (e.g., taken from a video sequence captured by a user) is submitted for recognition. If it yields the same item identification, even if the score is less than 0.97, this is some additional evidence that such item identification is correct. This process can continue to build sufficient confidence in the repeated identifications that it is taken as correct—even if none exceeds a 0.97 confidence score.

The number of images processed in this manner depends on the scores. If two images each yield the same recognition result, and each has a confidence above 0.95, this may be taken as a positive identification. If the first two images don't both have confidence scores over 0.95, the process can continue to examine third and successive images. If images agree on the item identification, and each has a confidence score in excess of 0.9, then three images may suffice. If not, then four images having confidence scores in excess of 0.85, or five images having confidence scores in excess of 0.8, or ten images having confidence scores in excess of 0.75—all agreeing on the same identification—may be taken as the correct result.

Logging/Retraining

In accordance with a further aspect of the present technology, intermediate data from a neural network is logged and used in subsequent retraining of the network.

In the arrangement just detailed, for example, a user may capture an image of a Campbell's tomato soup can, and the network may correctly identify it as such. However, the output neuron corresponding to Campbell's tomato soup may have only produced an output signal of 0.975, instead of, e.g., 0.99.

Intermediate data produced by the network in response to such image data (e.g., data output by Layer 3) is stored, in association with the final classification and classification score. Over time, such data for hundreds or thousands or more input images is gathered. At some point, the network is retrained. Normally, network retraining is based on images. But the stored intermediate data can also be re-introduced into the network for training (that is, for re-training of stages subsequent to the point from which such data was gathered). Re-training can thus proceed based on intermediate data alone, or a combination of intermediate data and training images.

Desirably, the intermediate point from which such data is stored is sufficiently deep into the network as to be privacy-preserving. That is, it is best that any face that is inadvertently included in processed imagery not be human-recognizable from the intermediate data. (Such face would likely not be machine-recognizable either, as the layers leading up to the data extraction point discern features that are optimized for recognition of consumer packaged goods—not faces.)

In some implementations, a double-check can be made that the can of tomato soup identified—with a confidence of 0.975—is actually correctly identified. In the distributed arrangement of FIGS. 26A and 26B, this may be accomplished by an on-screen prompt asking the user to press a user interface button if it seems the item has been incorrectly identified. In such case, the remote server can be instructed by the mobile device to flag the intermediate data as suspect, so that it is omitted when re-training the network. (In other arrangements, the input imagery—together with the network-provided classification—are provided to a remote human evaluator, such as using the Amazon Mechanical Turk service, who enters data indicating whether the identification appears to be correct or incorrect.)

Accuracy by Obscurity

Sometimes training of a network is aided by removing, or obscuring, certain portions from the training images. For example, clear jars may reveal the foodstuffs within, in a manner that is more likely to confuse—rather than aid—item identification. Consider jars of pickles, or peanuts, by competing brands. While such visible container contents may help distinguish such items from cans of soup, they may be a net negative in achieving a low false positive recognition rate—a key criterion in many of applicant's intended applications (e.g., supermarket checkout). For such applications, it is much better that an item not be recognized at all, than be recognized incorrectly.

Glass containers may be recognized by specular reflections (glare) from their surface. Such objects are usually characterized as being comprised of vertical sections (rings) of generally circular cross-section. A turntable-based photographic studio may include one or more point sources (e.g., LEDs) positioned to produce one or more reflections from the glass onto the camera lens. By the generally consistent position of such glare points, even as the item rotates through an angle, the reflecting surface may be inferred to be glass. The captured imagery can then be automatically (or manually) post-processed to remove or obscure at least certain of the glass portions from the image frame. For example, image regions discerned to depict glass may be blurred so that chromaticity is maintained, but fine image features are lost. Or image regions discerned to depict glass may be blacked-out. Desirably, both the images used for training, and query images submitted for end-use item identification are both processed similarly in this regard.

Similarly, supermarket objects that include are transparent or translucent—allowing light and shapes from behind the object to be perceived (collectively termed "transparent" for convenience) can be confounding for machine-recognition, due to the myriad different appearances such regions can take—depending on viewing angle, lighting, and objects behind. A clear container of blue window cleaner is an example.

In accordance with a further aspect of the present technology, such regions are detected and dealt with specially, to mitigate recognition difficulties.

Depiction of such a region can be identified in a training image, and can be masked or replaced with imagery depicting background clutter, such as was described in the earlier discussion of augmentation strategies. So-doing forces the network to learn features of the object depiction other than from the transparent portion, e.g., from a label on the window cleaner container. (Multiple such different augmented images are typically produced from each training image, so the network isn't trained to recognize any particular clutter depiction.)

Identification of such regions in training images may be performed with human assistance, e.g., by marking off boundaries of the transparent portion, or my simply identifying (clicking) one point within the transparent portion and employing a region-growing (or blob detection) algorithm to determine its likely extent. Alternatively, a second convolutional network may be trained with depictions of transparent and non-transparent objects, to learn to detect and locate such regions (e.g., using a region-based convolutional network, R-CNN, or one of its variants). Such a network can then be used to identify transparent excerpts in the training images. Such areas can then be obscured as described above.

Additionally or alternatively, if such a second convolutional network is available, it can be used as part of a front-end to an object-recognition network. For example, a region it identifies as transparent can be deleted from a query image, and the edited query image can then passed to the object recognition network.

Further Increasing Accuracy Through Homography

To further reduce the chance of identifying an item incorrectly, certain embodiments of the present technology perform a verification check after an initial identification has been made.

Figure 27:
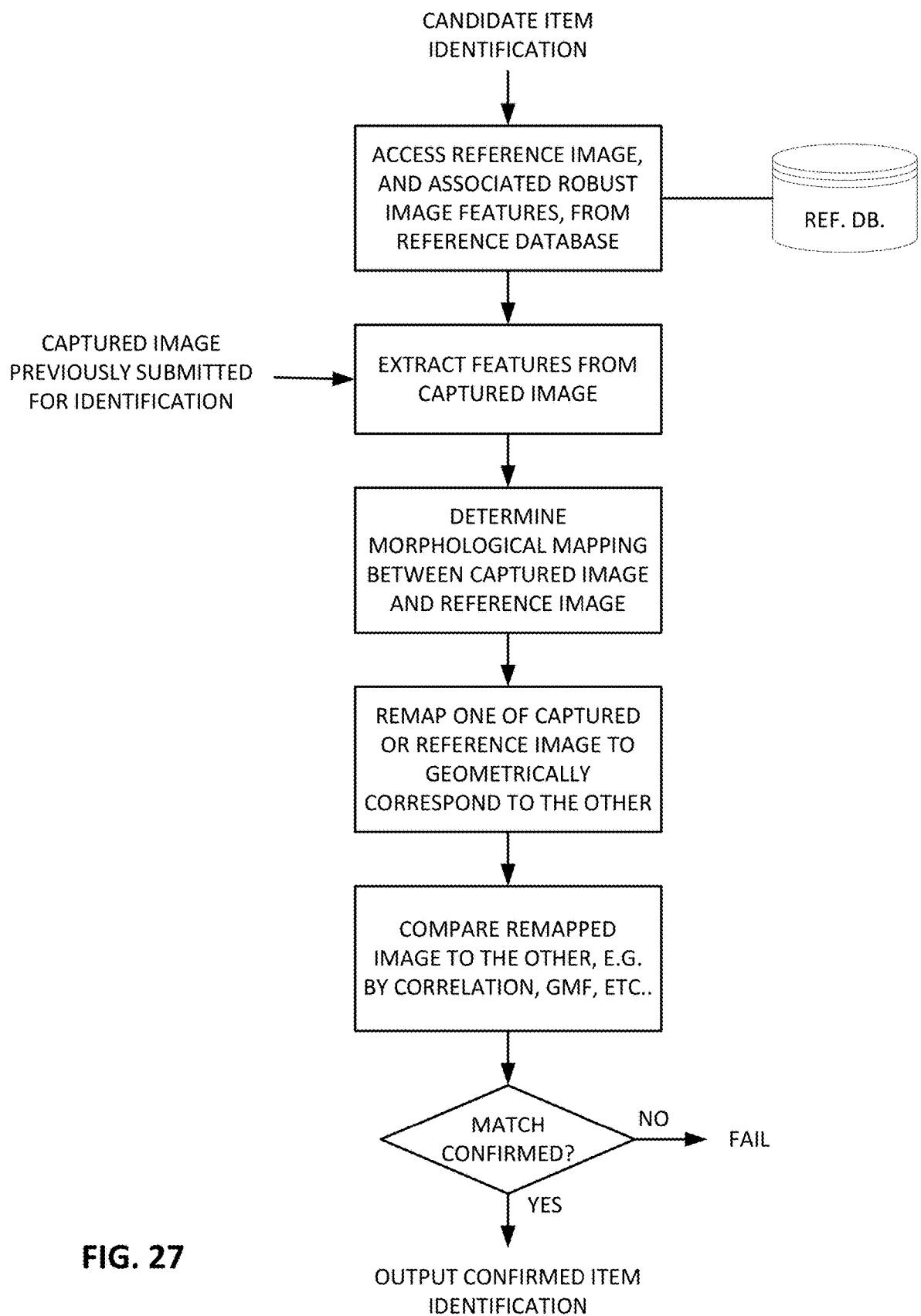
FIG. 27 details another aspect of the present technology.

One such arrangement is depicted in FIG. 27. In this embodiment, an item depicted in smartphone-captured imagery has been identified, e.g., by neural network, as a can of Campbell's tomato soup. The system includes a database containing reference images for all the possibly-identified item classes, together with SIFT or other feature point descriptors associated with each. A reference image for a can of Campbell's tomato soup, and associated feature point descriptors, are recalled from the database, based on the candidate item identification.

If not earlier performed, feature points are extracted from the query image on which the candidate identification was based, e.g., the smartphone-captured image. These feature points should correspond to the feature points for the reference image—recalled from the database.

The reference image may depict portions of the item that are not shown in the query image. Similarly, the query image may depict portions of the item that are not shown in the reference image. The portion that both images depict in common is determined by which feature points match. Often, a quadrilateral can be defined, in both the reference and query images, identifying this region that is depicted in common.

The two sets of feature points within this common region, from the reference image and from the query image, are related by a homography. A simple such homography is an affine transform. Parameters for such transform are derived from the two sets of points, so that when the common region in image is transformed by such parameters, it spatially corresponds (e.g., in scale, orientation, and translation) to the common region in other image.

The common region in one image is transformed by such parameters, and the transformed region is then compared with the other. (The query image portion may be transformed, and compared against the reference image portion, or vice-versa.) The comparison may take various forms. One is correlation—deriving a numeric metric indicating the degree of pixel-to-pixel correspondence between the original and remapped images. Another relies on a generalized matching filter operation.

In an alternative embodiment, no use is made of SIFT-like points to determine homographic coefficients that geometrically relate the reference and query item depictions. Instead, the images themselves are simply examined for correspondence in their original states, by an algorithm like that described in Barnes, et al, The generalized patchmatch correspondence algorithm, European Conference on Computer Vision, 2010, pp. 29-43, or Zabih et al, Non-parametric local transforms for computing visual correspondence, European Conference on Computer Vision, 1994.

If the query and reference images are found to correspond, to within a specified degree, the original identification of the image as containing the item (e.g., the can of Campbell's tomato soup) is confirmed. If not, the candidate identification is declared invalid.

More on Distributed Systems

In another illustrative system, a handset performs a first recognition operation on captured imagery, to determine whether the imagery depicts one of, e.g., 50 popular objects. These 50 popular objects may be updated from time to time based, e.g., on the user's context, and on recognition operations performed by other users of the system. If the object is recognized, the smartphone undertakes a responsive action.

If the first recognition operation on the handset fails to identify a subject in the captured imagery, the image or data derived therefrom is sent to a remote server. The remote server performs a more exhaustive search for candidate matches to the captured (query) imagery, e.g., using feature matching with a catalog of reference images in a database. Several candidate matching reference images may be identified, each with a match score. Additionally, the remote server may identify what portion of the captured image matches with the reference image(s), together with associated homography parameters (detailing a projective transformation that maps the pose of the captured image to that of a candidate reference image).

Instead of the remote server simply providing the top-scoring candidate match back to the handset as the final answer, certain embodiments of the technology undertake a further quality-assurance recognition operation—seeking to confirm or refute the candidate matches. In one particular arrangement, a color histogram is computed on the portion of the captured image identified as corresponding to the candidate reference image, and this histogram is compared against corresponding histogram data for the candidate reference image. (U.S. Pat. No. 9,405,991 details exemplary color histogram technology.) In another particular arrangement, the homography parameters are employed to warp the identified portion of the captured imagery so that it geometrically corresponds to the candidate reference image. A further comparison of the captured and candidate image is then performed, such as by cross correlation, etc., such as was detailed above. Based on such review, the candidate match reported to be top-scoring by the remote server may be disqualified, or pushed down from the top spot—with a different candidate match taking its place. The smartphone then takes a responsive action based on the revised data.

In another particular arrangement, a different type of further recognition/quality assurance operation is employed: the results generated by the remote server are reviewed by use of deep learning techniques. However, instead of deep learning's conventional use to recognize images, it is here used to recognize errors in recognition results output by the remote server. That is, results from the remote server are input to a classifier that has been trained to identify mistakes of the sort the remote server has previously made. If the remote server has previously identified lime soda (or lime-scented dish soap) as the top-ranked match, when the captured image actually depicted lemon soda (or lemon-scented dish soap), such a classifier will be alert to this issue and flag likely re-occurrences. When the classifier flags a recognition as being of the sort that the remote server has previously performed inaccurately, responsive action can be taken—such as invoking additional tests of the captured and candidate reference images for correspondence.

One way such a deep learning system can be trained to recognize deficiencies in image recognition performed by the remote server, is to post captured images and corresponding top-ranked candidate matches to a service such as the Amazon Mechanical Turk. The service presents each pair of images to a human reviewer for comparison, to obtain an independent match assessment. To avoid suggestive bias, the query may be phrased as: "Do Photos A and B depict different objects?" (Each pair of images may be presented to multiple reviewers to assure consistency in answers.) The results returned from the service are periodically submitted as label data (ground truth) to the deep learning system, together with the result data output by the remote server (and possibly the captured image itself). A training procedure, such as a reverse gradient descent method, is applied to adjust the coefficient weights of the system, so that the resulting classifier comes to identify situations in which incorrect recognition results are more likely to be returned by the remote server.

In some embodiments, these further recognition operation(s) that may follow the remote server recognition operation are, themselves, performed on the remote server. In others, they are performed on the handset. But in many implementation, they are performed by a computer system distinct from both the handset and the remote server—interposed between the two in a network sense. (Much of the delay in having handset-captured imagery processed in the cloud derives from the transactional overhead of setting up a virtual communication channel from the handset. Due to battery constraints (and sometimes data charges), such channels are transitory, and established only as needed. In contrast, data channels between server computers that are powered from commercial power mains, and realized by fiber or copper data conductors, have much less latency. Once established, they may be maintained for longer periods. Additionally, the data links comprising the channels are themselves faster—commonly in the gigabit range, as opposed to the megabit-level service of the "last mile" to the phone handset.)

These and other aspects of applicant's technology are detailed in FIGS. 28-34.

Figure 28:
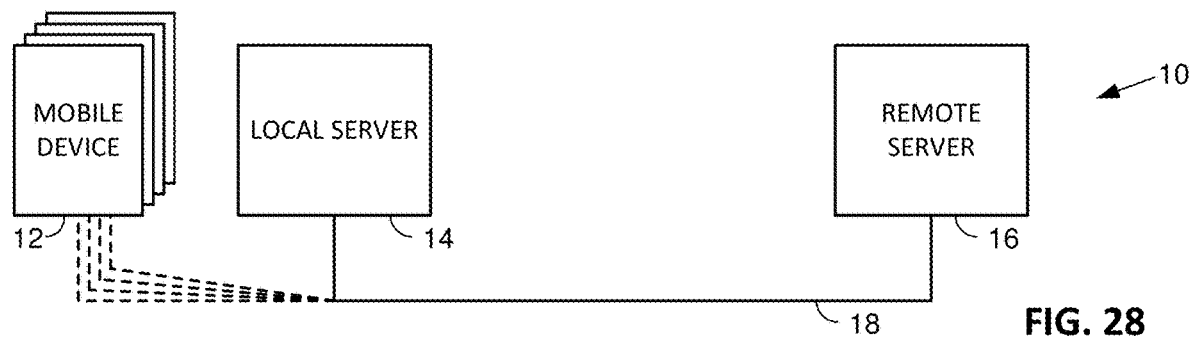
FIG. 28 shows elements of another illustrative system.

Referring to FIG. 28, a system 10 includes a mobile device 12, a local server 14, and a remote server 16. These components are linked by a data network 18.

The mobile device 12 may be a smartphone or similar mobile device (a "handset"). Relevant to the present arrangement, mobile device 12 includes a camera, a user interface, processor circuitry with associated memory, and a wireless interface to the network 18 (shown in dashed lines).

Local and remote servers 14, 16 are both familiar computers, with processing and networking capabilities, but are distinguished by their network proximity to the mobile device: server 14 is relatively closer, and server 16 is relatively further. That is, data sent by mobile device 12 to remote server 16 takes more network "hops" to successive internet routers, and takes more time, than data sent by mobile device 12 to local server 14. (In some embodiments, it may take twice as many hops to reach the remote server 16 as it takes to reach the local server. In other embodiments, it may take three-, five-, ten- or more times as many hops to reach the remote server as the local server.)

In a particular arrangement, local server 14 serves a multitude of mobile devices 12, with communication channels to such devices intermittently established and discontinued as recognition operations are invoked on the respective devices. In contrast, server 14 has a communication channel with remote server 16 that is relatively more continuous and long-lasting, e.g., persisting uninterrupted so long as image recognition is active on any of the mobile devices.

Figure 29:
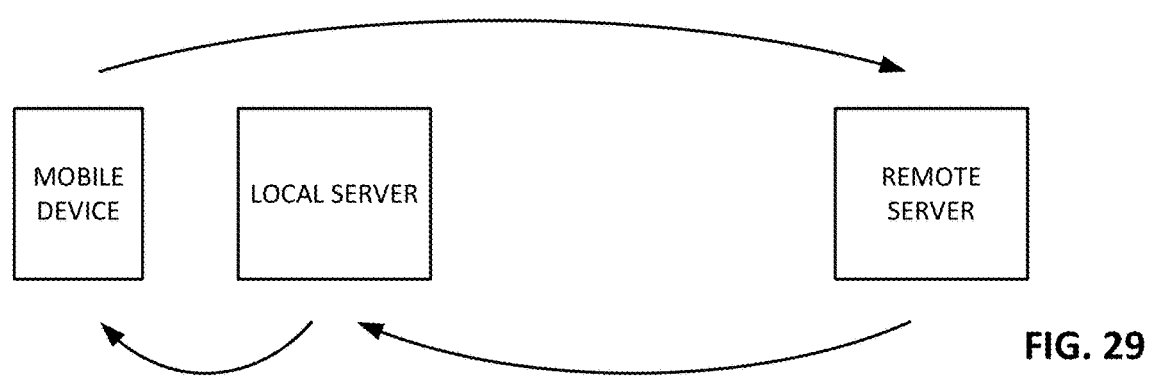
FIG. 29 shows an exemplary data flow among the elements of FIG. 28.
Figure 30:
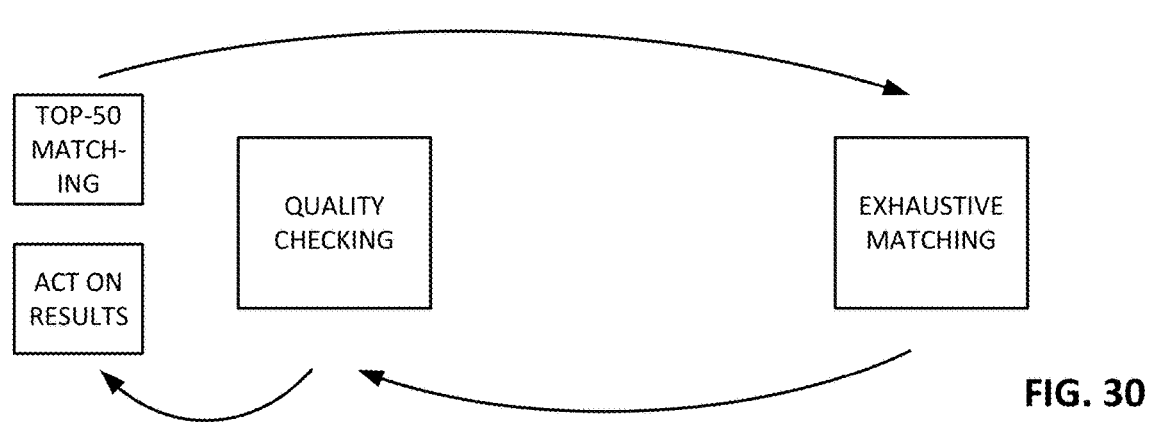
FIG. 30 is like FIG. 29, but shows certain of the functions performed by the respective system elements.

In one particular arrangement, illustrated by FIGS. 29 and 30, imagery captured by the camera mobile device 12 is first processed on the device itself, in an attempt to perform a quick recognition. To keep the operation quick, and thereby reduce battery burn, recognition is only attempted within a relatively small universe of N possible reference subjects. For example, is it a can of Coke? Is it a poster for the latest Star Wars movie? Etc. N is typically between 5 and 100 with current technology, but may extend up into the hundreds. (As Moore's Law progresses, the number of reference subjects that can be quickly identified on the mobile device will rise.)

One way to perform such recognition on the mobile device is to derive a set of local feature descriptors from the captured image, such as SIFT features, and determine whether that set of descriptors matches a stored descriptor set corresponding to any of the N reference subjects. (SIFT may not be optimum for use on mobile devices due to the large size of the descriptor set, but is referenced here due to its general familiarity.)

Sets of local descriptors for the N reference subjects are determined by another computer, and are periodically downloaded to the mobile device for use as reference data. In one particular arrangement, these reference sets of local features descriptors are downloaded from the local server 14 each time image recognition functionality on the mobile device is newly-launched.

Another way to perform fast recognition within a limited universe of N subjects is to use a neural network. The parameters that characterize operation of the network can be downloaded periodically from a remote source, e.g., a server computer that performs the necessary training operations.

If the depicted item is recognized on the handset, the remote server(s) need not be involved. However, if no matching set of image features is found, or no output neuron in the handset neural network triggers with a sufficiently large output value, then image data is sent to the remote server 16.

The remote server performs a more exhaustive item identification process, using one or more of feature point matching (aka "image fingerprinting"), or neural network classification. If it makes a candidate identification, resulting data is passed back to the local server 14. The result data may be forwarded-on to the handset the next time a session is established between the handset and the local server. Alternatively, the local server may first perform further quality checking—of the sort discussed above (e.g., in connection with FIG. 27) before the results are returned to the handset.

Figure 31:
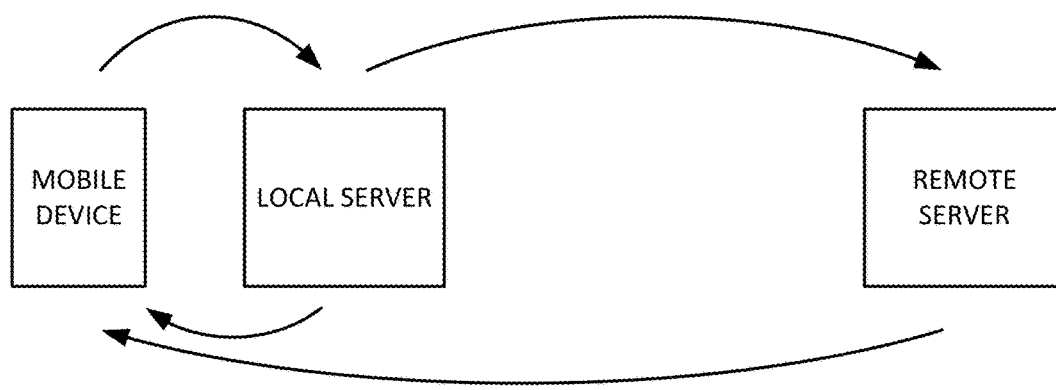
FIG. 31 shows another exemplary data flow among the elements of FIG. 28.
Figure 32:
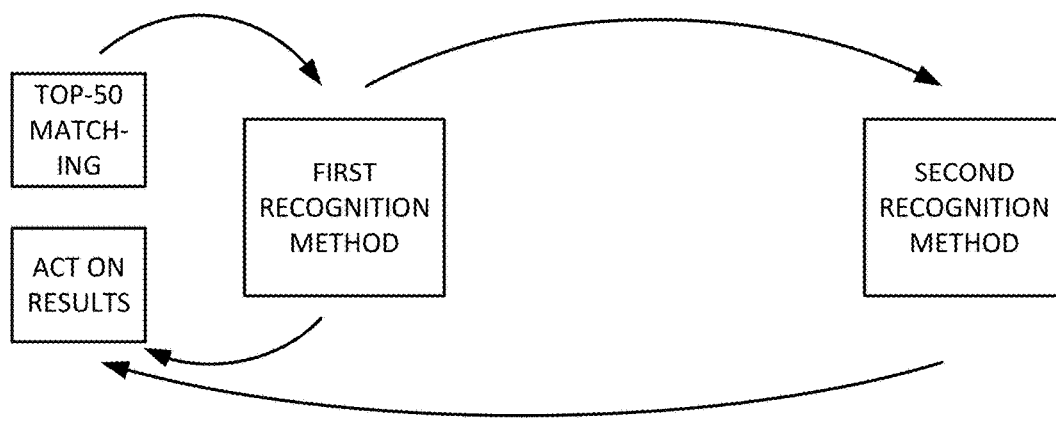
FIG. 32 is like FIG. 31, but shows certain of the functions performed by the respective system elements.

FIGS. 31 and 32 show an alternative data flow. Instead of the handset sending image data directly to the remote server for identification (assuming the handset has been unable to identify the depicted item), it sends the image data to the local server. (This image data may comprise the image, and may also, or alternatively, comprise derivative information such as feature point data extracted from the image by the handset.) This server tries identifying the image subject, e.g., by fingerprinting or neural network classification, and if successful, returns the results to the handset. However, the local server may not have an unabridged set of image fingerprints, and/or its neural network may not be loaded with the latest coefficients enabling it to identify a full universe of candidate items. So if the local server fails in identifying the item, it forwards data to the remote server for processing. (This forwarded data may be data other than, or in addition to, the image data. For example, it may include intermediate results output by layer 2, or layer 3, or layer 4, of its neural network, or feature point data, etc.)

The remote server may apply a recognition method different than that attempted by the local server. For example, it may apply a neural network, whereas the local server attempted image fingerprint matching, or vice versa, etc. If the remote server is successful in identifying the depicted object, corresponding data is returned to the handset for it to act on (as described earlier).

Figure 33:
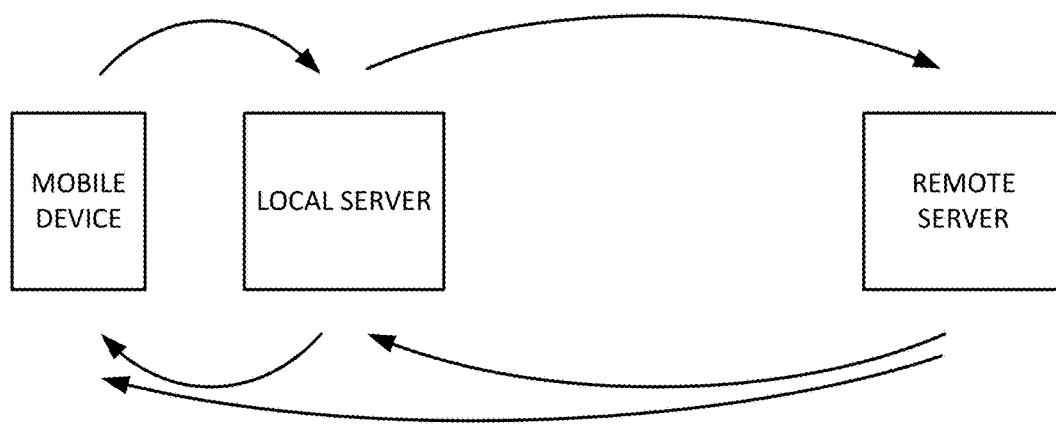
FIG. 33 shows another exemplary data flow among the elements of FIG. 28.
Figure 34:
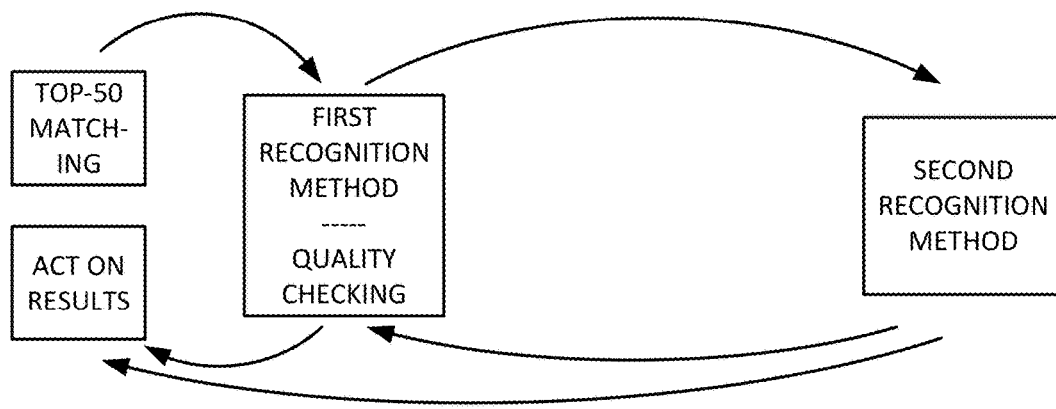
FIG. 34 is like FIG. 33, but shows certain of the functions performed by the respective system elements.

FIGS. 33 and 34 detail a variant data flow. If the remote server determines a candidate identity for the depicted object, it sends corresponding data to the intermediate server. The intermediate server then performs quality checking (e.g., of the sort described in connection with FIG. 27), and the intermediate server then informs the handset of the quality-checked results. (If the remote server is unable to identify the item, it can inform the handset directly.)

Logo Confusion

Accuracy of item identification can be significantly impaired by logos, which may be common across multiple items—increasing potential confusion. A familiar example is the distinctive white-on-red script of "Campbell's" on soup cans. Performing a further verification can help improve false positive behavior when such an item is recognized.

Another approach to this problem is to recognize particularly troublesome logos/brand markings, which appear across multiple different products, and to obscure such potentially confusing markings.

Figure 35:
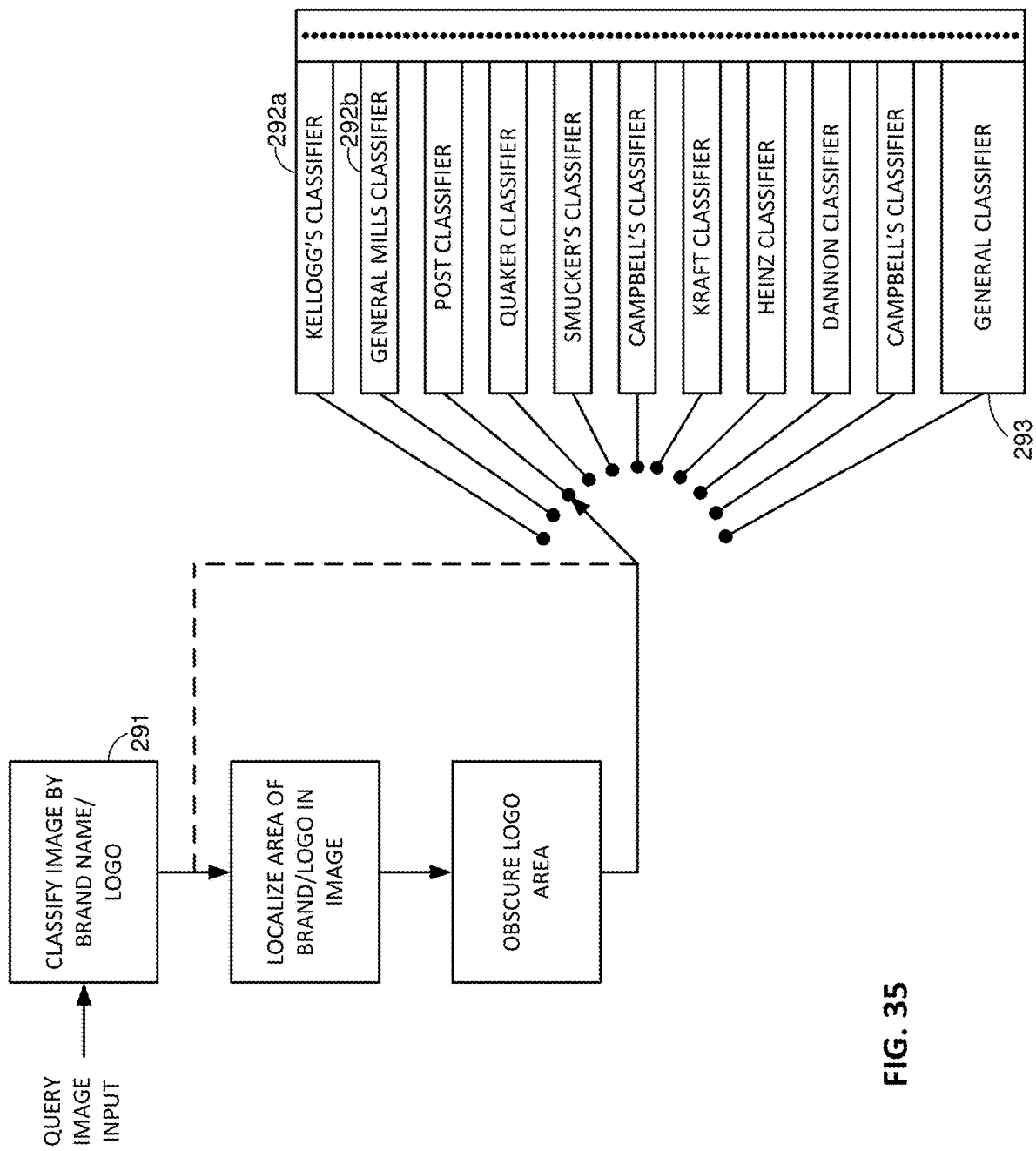
FIG. 35 shows an arrangement for mitigating brand confusion.

FIG. 35 details one such arrangement. An initial classifier 291 examines incoming imagery for the presence of one of several known, potentially-confusing markings. (The classifier can be a neural network, e.g., as detailed in this specification; or in landola, DeepLogo: Hitting Logo Recognition with the Deep Neural Network Hammer, arXiv preprint 1510.02131 (2015); or in Bianco, et al, Deep Learning for Logo Recognition, arXiv preprint 1701.02620 (2017). Alternatively, it can be an image recognizer based on recognition of constellations of reference feature points that are characteristically associated with certain brands/logos—sometimes employing "bag of words" techniques. Examples of such approaches include Boia, et al, Local description using multi-scale complete rank transform for improved logo recognition, 10th International IEEE Conference on Communications, 2014, and Zhu et al, Automatic document logo detection, Ninth International IEEE Conference on Document Analysis and Recognition, September 2007.)

If such a marking is found, its location is determined and indicated, e.g., by corner points of a bounding rectangle encompassing such a marking. (Localization is commonly performed with many object recognition systems. See, e.g., the Lowe writings detailed below; Sermanet, et al, Overfeat: Integrated recognition, localization and detection using convolutional networks, arXiv preprint arXiv:1312.6229, 2013 (attached to incorporated-by-reference application 62/414, 368); and Oquab, et al, Is object localization for free? Weakly-supervised learning with convolutional neural networks, Proceedings of the IEEE Conference on Computer Vision and Pattern Recognition, 2015, attached to incorporated-by-reference application 62/418,047.)

Further disclosure about logo confusion, and associated methods, are found in applicant's U.S. Pat. No. 9,129,277.

Once the potentially confusing markings have been located within the input imagery, they may be obscured. This can be done in various ways, such as by blurring (e.g., applying a blurring kernel of 10 pixels or more to the located region—for a 640×640 pixel image), replacing the located region with a solid color (e.g., black, white, or an average color of pixels originally within the located region), etc.

The obscured image is then processed by a further classifier, to recognize the depicted product within a particular product family. Since the system knows, by operation of the original classifier 291, the brand family that is depicted (if any), the image can be handled by a specialized classifier (292a, 292b, etc.) that has been trained on products in that brand family. In the FIG. 35 arrangement, for example, the classifier 292a has been trained to recognize products having the Kellogg's logo and/or other distinctive markings found on Kellogg's products. (This classifier is not trained to recognize products by, e.g., Dannon or Heinz, as images depicting those products are handled by different classifiers.)

The Kellog's classifier may have 100 or more output neurons, e.g., corresponding to different SKUs of its Special K, Frosted Mini-Wheats, Pop-Tarts, and Eggo products, etc. So do each of the other specialized classifiers. The output neuron that indicates the highest probability (over a threshold) serves to indicate which product within the brand family is depicted in the input image.

The different brand classifiers 292 need not be implemented by different hardware and software. Rather, more commonly, the same hardware/software system is used for classification across all brands, but the configuration of the system is dynamically updated based on the brand detected by the initial classifier 291, by loading specific parameters (e.g., convolution kernels, weights, etc.) corresponding to the particular family of products to be recognized.

Desirably, these brand-specific classifiers are trained using test images depicting the various different products within the brand family, in which the brand marking has been obscured in the same fashion that query images are obscured.

As shown in FIG. 35, there is a further classifier 293 that handles identification of products that are outside the brand families handled by the specific classifiers 292—those products for which confusingly-similar markings found on multiple different products are not such a problem. This classifier 293 may be implemented by different hardware/software than classifier 292, since the classification tasks performed by the former will commonly span a much larger number of products than those of the latter. (Such images that are outside the problematic brand families are not obscured prior to processing by the classifier 293.)

In a variant arrangement, after problematic logos are obscured from input images, a single, general classifier is employed to perform all of the classification—across all brands.

Learned and Hand-Tuned Features

Figure 36:
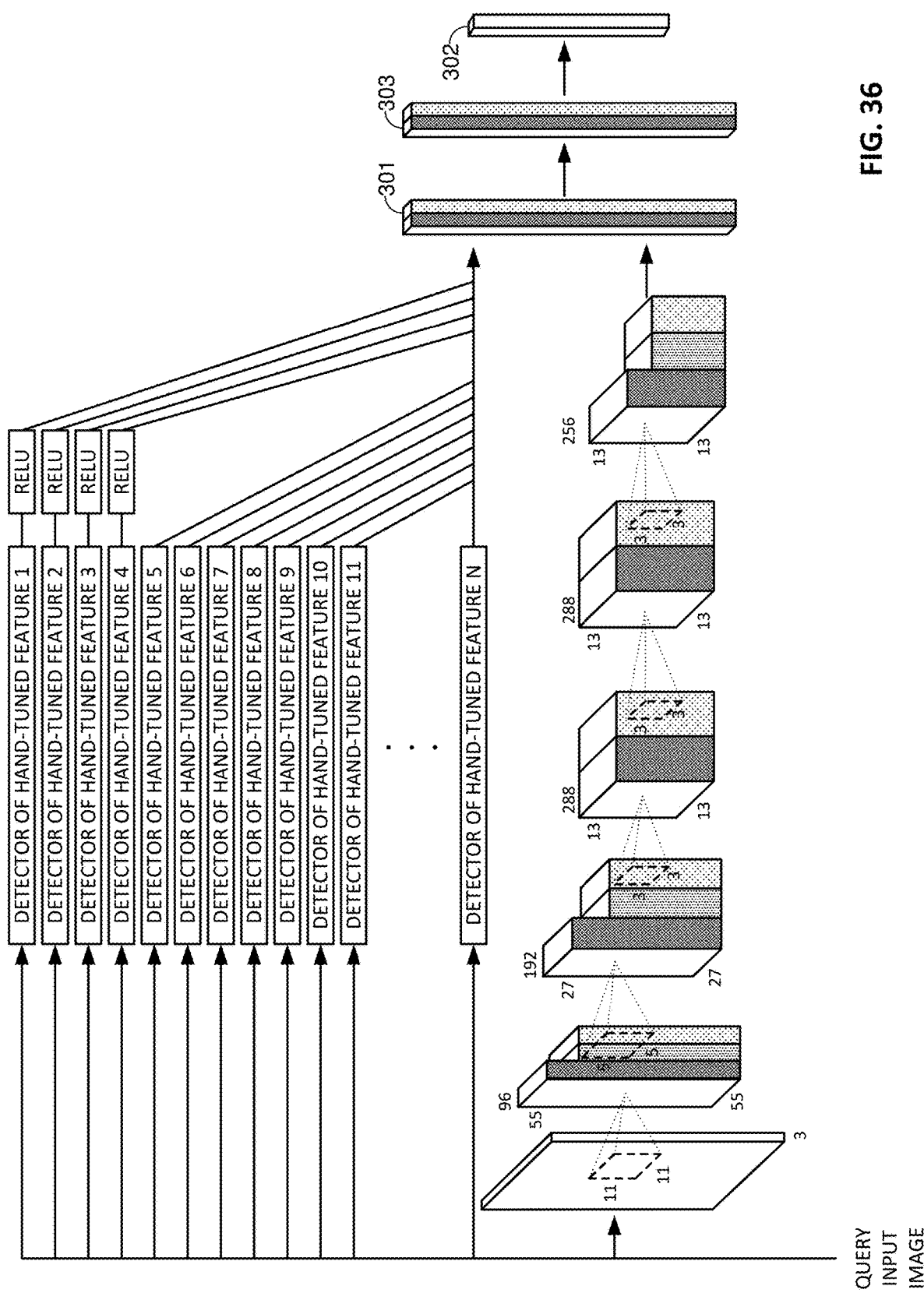
FIG. 36 shows an architecture employing both machine-learned features, and "hand-tuned" features.

FIG. 36 shows a different architecture. In this arrangement, the first fully-connected layer 301 does not receive input data only from a convolutional network that has been trained (e.g., by reverse gradient descent). Instead, it also receives data corresponding to so-called "hand-tuned" features.

"Hands" don't really play a role in the "hand-tuned" features. Rather, this moniker is used as a shorthand for image features that are different than those learned by a machine learning system in an iterative training procedure (e.g., by reverse gradient descent or other back-propagation methods). Hand-tuned features thus include, e.g., SIFT- and other image fingerprint-points, bag of feature descriptors, color histograms, OCR'd text, and other features by which image recognition has been performed in the prior art.

Fully-connected layers commonly work on binary, or quasi-binary data. E.g., a machine-learned feature is present at a particular region of a query image, or it isn't. Some of the prior art image recognition features, in contrast, are scalars (or vectors) having a range of output values. Thus, certain of the depicted hand-tuned feature detectors are followed by a "ReLU" stage—borrowing from the machine learning vocabulary. Such a stage provides no output signal over one set of input signal values (typically low or negative input signal values), but then switches to provide an output signal for higher values. The output signal may be binary (off-on), or may increase with further increases in the input signal.

To illustrate, one of the hand-tuned feature detectors may examine the query image for a color histogram in which more than half of the image pixels have red channel values of 128 or more (in a 0-255 scale). If so, this detector may output a value of "1," else "0." A different hand-tuned feature detector may examine the query image to determine whether the average red channel value—across all pixels in the image—exceeds 150. Again, if so, a "1" is output, else a "0."

Some of the hand-tuned features may be based on the entirety of the query image. Others may be based on different regions in the visual field, e.g., pixel regions of 3×3, 8×8, 64×64 or larger.

Moreover, the hand-tuned features need not be elemental, e.g., the existence of a single particular SIFT point. Instead, a hand-tuned feature may indicate the presence of a combination of different elemental features, such as a particular constellation of SIFT points, or a particular text string of OCR'd characters.

A given system may employ dozens or thousands, or more, of different hand-tuned features.

Although iterative training is not used to define these hand-tuned features, iterative training can be used to establish the use to which such output data is employed by the fully-connected output stages. That is, the weight that should be assigned to each such datum, in activating a particular neuron, can be discovered by training—just as the weights given to the different convolutional stage output data in activating a neuron are discovered (e.g., by back-propagation methods).

The FIG. 36 network has two fully-connected layers before the final output layer 302. Instead of being input to the first fully-connected layer 301, the hand-tuned feature data may be input to the second fully-connected layer 303. Or some of the hand-tuned data may be introduced at layer 301, and other of the data at layer 303.

Figure 37:
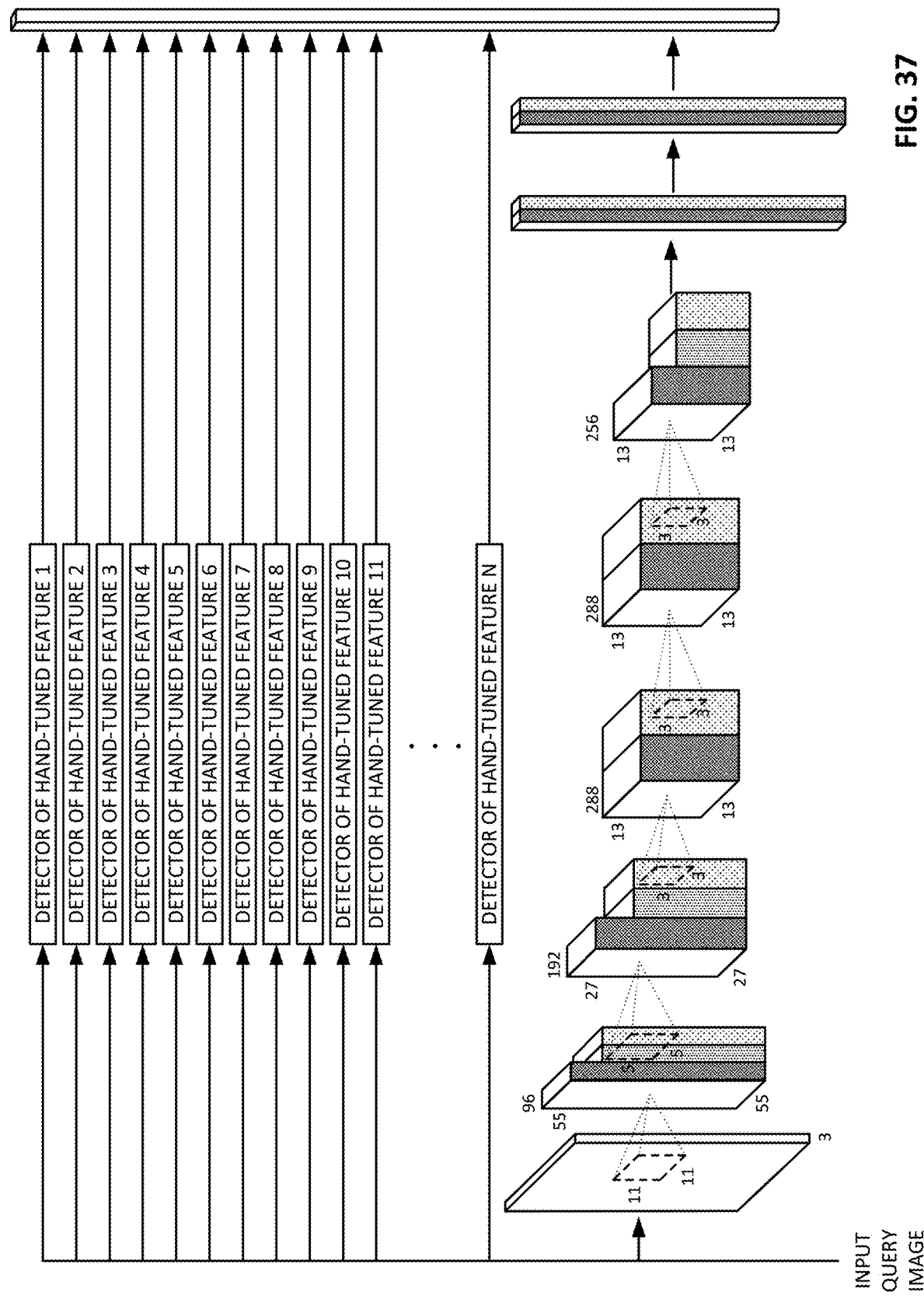
FIG. 37 shows a variant of the FIG. 36 architecture.

In still another arrangement, shown in FIG. 37, some or all of the output data from the hand tuned feature detectors serves as final output data—activating a corresponding network output neuron.

Single Object, Multiple Classes

If image recognition is to provide the greatest improvement to check-out speeds, it should work using imagery captured from any face of a product: front, back, etc.

Training imagery depicting the back of a product does not aid in recognition if the front of the product is presented. Indeed, it may decrease accuracy, since the back imagery typically doesn't look like the front imagery, but may look like back imagery from one or more different image classes.

In accordance with such embodiments of the technology, a single item is classified in several different classes. In an exemplary arrangement, a box of Wheaties cereal is classified in both Classes 1 and 2 of a neural network. Class 1 is trained with imagery that depicts the front of the box (e.g., at 5 degree increments, over the span of +/−60° from straight-on). Class 2 is trained with imagery that depicts the back of the box (at similar increments). If, in use, either the Class 1 or Class 2 neuron fires with an output signal greater than the threshold, e.g., 0.97, the item is identified as Wheaties cereal.

Some items may correspond to two classes. Others may correspond to only one (e.g., a bottle with only a front label). Others may correspond to three or more (e.g., a cylindrical package may be classified in three classes, with each class trained with views centered on different locations at 120° spacings around the cylindrical circumference). To keep things straight, a data structure that maps different of the neurons to different products can be used, e.g., as shown in FIG. 38. (The database can identify—for each neuron—various item metadata, such as the brand name, the generic name, the UPC identifier, etc.)

Training images for two different classes may depict common areas of a single item. FIG. 39A, for example, shows a training image for Class 1 of FIG. 38 (i.e., including a front face of a Wheaties cereal box), while FIG. 39B shows a training image for Class 2 (i.e., including a back face of the Wheaties cereal box). Both depict the same side panel of the Wheaties box.

After training, if a query image from such a cereal box is captured by a check-out scanner (e.g., as in FIG. 40) and analyzed by the network, the depiction of the side panel found in training images for both Class 1 and Class 2 will trigger activation of both the Class 1 and Class 2 output neurons. Since both neurons indicate the same product (per the data structure of FIG. 38), the responses of the two neurons may be combined. Thus, if neuron #1 outputs a 0.16 signal, and neuron #2 outputs a 0.79 signal, this can be an adequate response to positively identify the item as Wheaties cereal.

These output signals sum to 0.95—less than the 0.97 threshold that usually signals a positive item identification. A lower threshold can be employed when the two neurons producing the highest output signals both indicate the same product, since the chance of both neurons indicating the wrong product is exponentially less probable than a single neuron indicating a wrong item. Thus, a system according to this aspect of the present technology can involve varying thresholds, depending on whether the item being identified is categories in a single class (in which case a higher threshold, such as 0.95, 0.97 or 0.99 may be appropriate), or in multiple classes (in which case a lower threshold, such as 0.94, 0.9, or 0.85 may be appropriate).

The output signals from neurons indicating the same item may be combined by adding, but need not be so. A polynomial equation, or other weighted sum, for example, can alternatively be used.

Single Image Depicting Multiple Items

In many embodiments, not just identification of an item depicted in an image, but also the item's location within the image, is determined by the neural network. By considering both identification and location, the present technology can deal with images in which two different items are depicted in an image frame, and both are recognizable. In such case, each would be identified with a confidence value well below the usual threshold, e.g., 0.97 (since the data produced across all the output neurons normally sum to 1.0). For example, if a network is presented an image depicting two cans of Campbell's soup—one tomato and one mushroom— it may identify each with a confidence of 0.49. If localization data indicates that two items are found in the input image, at two different locations, then the confidence threshold required to be surpassed in order to constitute a valid item identification can be adjusted accordingly (e.g., to 0.485 if two items, to 32.33 for three items, etc.).

A suitable arrangement for localization of recognized items (sometimes termed "semantic segmentation") is detailed in the Girshick paper referenced above and attached to incorporated-by-reference application 62/404,721. Another suitable arrangement is the Oquab paper referenced above, and attached to incorporated-by-reference application 62/418,047.

In some applications, such as shopper self-checkout, only one item should be identified in an image. However, due to the nature of self-checkout, the image is typically captured while the shopper is standing in an aisle of the supermarket—sometimes with other items in the background. A problem then arises: to identify the intended item, and not a different item that accidentally is also depicted within the image frame In accordance with a further aspect of the technology, a captured image is divided into portions, and each portion is separately classified by a neural network. The portion that yields the largest neuron output signal serves to identify the depicted item.

FIG. 41A shows an image of an item captured by a shopper in an aisle of a store. FIGS. 41B-41D show examples of how the image can be divided into different portions—each for separate analysis. (The three portions of FIG. 41D may be rotated 90° for analysis, since the network is typically trained to be robust against the angle at which an item is depicted, and since vertically-oriented rectangular images are re-mapped to squares for network analysis.)

In a variant embodiment, instead of different regions of the image being excerpted, different regions may be obscured. For example, in FIG. 41B, all but the upper left quadrant may be blurred, or masked with a solid or gradient color, and the thus-altered image can be submitted to the network. Three other images, in which the other three quadrants are respectively featured—and others obscured—can be submitted to the network. Whichever altered image yields the highest signal above a threshold value serves to identify the depicted object.

In another variant arrangement, multiple output signals are derived from an image, as above, and identification is based on a voting arrangement. If plural of the votes (e.g., two) identify the same item, and those plural votes are expressed by neuron output signals each having a value in excess of a threshold, then the thus-identified item is taken as the final result. (As in the arrangement just-discussed, the threshold can be lower than that used for identification based on a single analysis of a single image, since multiple votes for the same item identification, itself, indicates confidence in the result. Thus, for example, if two votes identify the same item—each with a neuron output value greater than 0.9, or if three votes identify the same item—each with a neuron output value greater than 0.8, then that item may be considered to be correctly identified.)

A single item may also be identified in the presence of other, background, items, by heuristics such as frame location, or depth. Typically, the intended item extends into the center of the frame (as in FIG. 41A).

Figure 42:
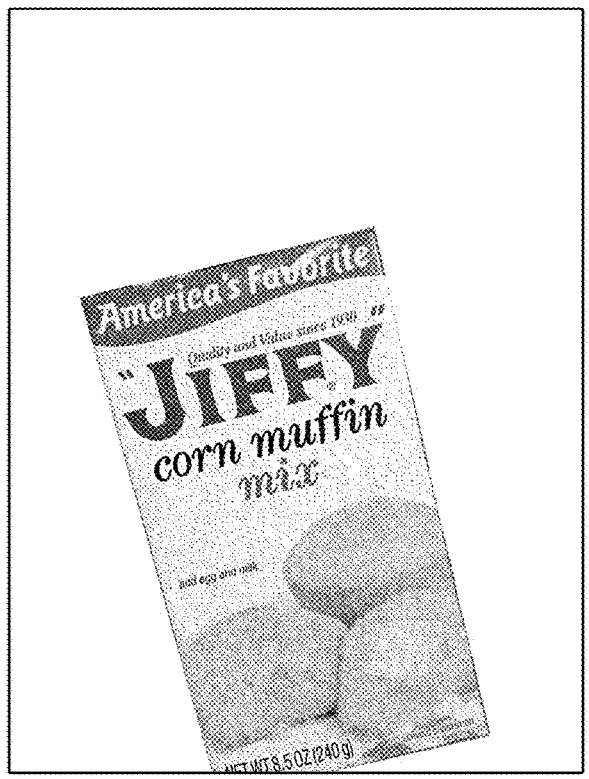
FIG. 42 shows the product depicted in FIG. 41A, with background elements removed.

Region-growing segmentation techniques can extend a "region of interest" away from the center location in all directions until, e.g., a lengthy straight edge is encountered. By such arrangement, the product held by the shopper can be segmented from the background. The captured image—with the background removed (as in FIG. 42) or obscured—can then be submitted to the image recognition system for identification.

Figure 43:
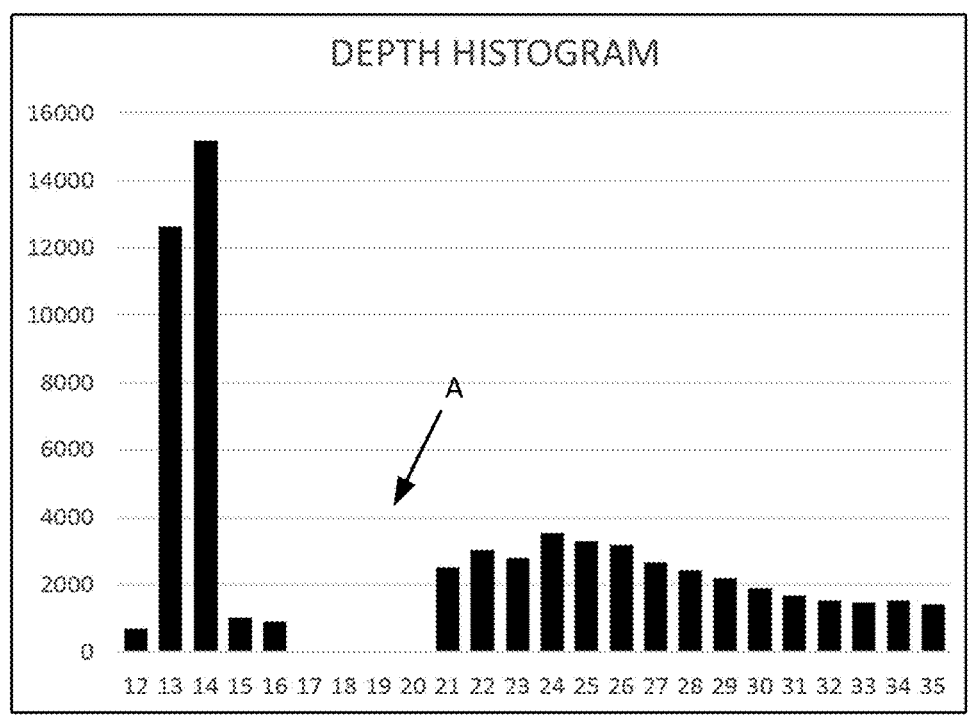
FIG. 43 shows a depth histogram corresponding to the image of FIG. 41A.

Segmentation can also be performed by reference to depth data (e.g., for camera systems that output red, green, blue, and depth information for each pixel). A histogram of depth information can be computed, as in FIG. 43 (which plots pixel counts as a function of distance—quantized into one inch measurements). An intermediate distance can be found having a minimum between two maxima (e.g., "A" in FIG. 43). Pixels at distances above this intermediate distance can be obscured before submitting the image for item classification.

Segmentation

Reference was made, above and elsewhere, to segmenting item depictions from imagery. The artisan will recognize this can be accomplished in multiple ways. To capture images for training, an item can be photographed against a background of uniform color, like the "green-screen" techniques employed by TV weathermen. The background can then readily be identified and removed from the images. Other color-based methods of image segmentation are detailed in Lucchese, Color image segmentation: a state-of-the-art survey, Proceedings of the Indian National Science Academy, 67(2), 207-221, 2001.

Other segmentation methods are based on edge and texture detection. See, e.g., Senthilkumaran, et al, Edge detection techniques for image segmentation—a survey of soft computing approaches, International Journal of Recent Trends in Engineering 1.2 (2009), and du Buf, et al, Texture feature performance for image segmentation, Pattern Recognition 23.3 (1990). Still other methods are detailed in Zhang, et al, Image segmentation evaluation: A survey of unsupervised methods, Computer Vision and Image Understanding, May 31, 2008, pp. 260-280.

Segmentation can also be performed by different motion profiles of different points in images, if video or multiple still image frames are available. Consider video captured of an item held in a user's hand, with a more distant background. Points on the item all share common motion, and points in the background all share common motion, but the motion of the former can differ from motion of the latter, allowing the two to be distinguished.

As noted, segmentation is also readily accomplished in imagery that includes depth information (e.g., of the sort increasingly available by smartphones and other camera systems equipped with two lenses, in which image features depicted in two captured images exhibit parallax-based position shifts, due to their different subject viewpoints; and in devices equipped with Tango- or Kinect-like depth sensors, in which an infrared pattern is projected into a viewed space, is sensed by an IR camera, and is analyzed to discern—from apparent distortion of the pattern—the 3D shape of the viewed space). Image points closest to the camera are the intended subject. Those spaced further behind are background and can be removed.

More on Generating Training Images

Applicant found that green screen techniques sometimes cast a greenish tint on photographed objects. Unlike television production—where the green screen is a planar backdrop—stages for photographing supermarket items must typically have curved backdrops—to assure a green background even when the camera is looking down towards the item, or looking up towards the item. Faces of the item that are within view of the camera may also be in view of an expanse of green drape, contributing green reflected light to the imaged surface—a situation that does not occur with TV weathermen.

One approach is to use a grey backdrop—instead of green. The light reflected from visible parts of a grey drape onto the surfaces being photographed is then polychromatic. But even with such improvement, applicant has found that robotic/turntable arrangements to image an item from various angles and elevations is—despite its automation—labor intensive and time-consuming.

Figure 45A:
FIG. 45A shows a depiction of artwork for a carton of beer, from an artwork origination file.

Applicant has found it preferable, in many situations, to generate synthetic training images based on 2D origination artwork, e.g., digital image files used to print packaging for supermarket items. FIG. 45A shows an exemplary item of origination artwork, for a carton of beer.

In particular, a digital image file depicting the packaging artwork is texture-mapped onto a 3D shape primitive (e.g., a box or cylinder) corresponding to the product shape (or approximate product shape, such as a cuboid for the beer carton of FIG. 45A). This virtual model of the product is then rendered as it would appear from a particular viewpoint.

For example, if the center of the model is at the origin in X, Y, Z space (i.e., coordinates (coordinates {0,0,0}), a virtual viewpoint is established by coordinates $\{V_X, V_Y, V_Z\}$. A 2D image is then generated depicting the product's appearance to a camera located at that viewpoint, with its lens directed towards the origin of the coordinate system.

From the product artwork, applicant may generate hundreds or thousands of synthetic images, by randomly choosing the viewpoint coordinates $\{V_X, V_Y, V_Z\}$, and rendering the model as depicted from such viewpoint.

The coordinate parameters are desirably chosen from a bounded universe, corresponding to realistic viewpoints from which the physical product may actually be viewed, in use of the technology. (The product won't be viewed from ten feet away, or ten millimeters away—at least not with any expectation of success.) Applicant finds it convenient to express the viewing distance in terms of an inverse quantity—the apparent scale of the viewed object. Scale can be expressed in relation to a nominal scale, in which the object is viewed from a distance causing the object depiction to just span the full height or width of the camera frame (i.e., so that no part of the object is clipped out of the frame). This nominal scale can be regarded as 100%. Scales for the synthetic images can be randomly selected from a bounded range, such as 40% to 250%. Depending on the camera model and size of the product, this might correspond to viewing distances of, e.g., 3-18 inches (from the center of the product).

The selection of the camera viewpoint coordinates $\{V_X, V_Y, V_Z\}$ may be further bounded, e.g., so as to exclude views that primarily consist of the bottom of a product, and possibly the top. (It is unlikely that a shopper would try to identify a can of soup by presenting the unmarked metal bottom of a can to a camera.) Additionally, viewpoints may be constrained to avoid positions from which the front (or back) face of the product is viewed at too oblique an angle. (A "plan" view of a surface is generally best—with the camera axis oriented parallel to the surface-normal of the item. As the viewing angle diverges from this optimum, the apparent expanse of the surface diminishes, and perspective distortion becomes greater. Thus, if the viewing angle is more than a threshold angle away from this optimum view, e.g., more than 60° or 70° away, then such viewpoint may be excluded from consideration.) By considerations such as those just reviewed, a 3D volume of candidate viewpoints is determined, and each of the synthetic views of the product is rendered as if viewed from a randomly-selected one of these viewpoints.

The viewpoint may be characterized by three additional parameters: pitch, roll and yaw, yielding six viewpoint parameters in all. Pitch, roll and yaw are most easily conceptualized in the camera's frame of reference. Roll, for example, can be regarded as rotation of the camera around its lens axis. Different values of roll correspond to different rotations of the product as viewed by the camera. Pitch and yaw can be regarded as rotation of the camera about its other two axes: vertical and horizontal. Variation of either of these parameters has the effect of pointing the camera away from the coordinate system origin, so that the center of the object is depicted closer and closer to the edge of the camera frame.

These parameters, too, can be randomly selected—each from a bounded universe of values. Roll can be limited to the range −90° to +90,° if it is unlikely that a product would be presented essentially upside-down to a camera. Pitch and yaw can be more tightly bounded, since either of these parameters—if too large, would point the camera in a direction in which no part of the virtual model is depicted in the image frame. In a particular embodiment, these parameters are bounded so that the center of the image frame includes some part of the modeled item.

FIGS. 45B and 46A-E illustrate the foregoing with some examples. FIG. 45B shows the front artwork for a product that is essentially 2D—a packet of gravy mix. FIGS. 46A-46B show synthetic images formed by modeling the gravy packet artwork of FIG. 45B from random viewpoints, constrained as described as above.

Reference was made above to a camera model. A pinhole camera model is a simple model that can be used, but more accurate models, e.g., better representing perspective projection (or weak-perspective), are desirably employed. See, e.g., Kolb, et al, A Realistic Camera Model for Computer Graphics, Proc. 22nd Annual ACM Conference on Computer Graphics and Interactive Techniques, pp. 317-324, 1995; and Potmesil, et al, A Lens and Aperture Camera Model for Synthetic Image Generation, ACM SIGGRAPH Computer Graphics 15.3, pp. 297-305, 1981.

Applicant commonly fills the blank parts of the synthetic images (e.g., FIGS. 46A-E) with random imagery from Flickr, as discussed earlier.

By generating N synthetic images depicting an item with random viewpoint parameters, and augmenting M instances of each such image with a different Flickr background, N×M training (or testing) images can be obtained. Thus, if 2000 training images of a can of Pepsi are desired, a cylindrical shape draped with the Pepsi product artwork can be modeled as viewed from 400 different 6D viewpoints, and each resulting synthesized image can be overlaid on five different Flickr images, yielding 2000 in all. (Or such images may be generated from 200 different viewpoints, and each can be overlaid on ten different Flickr backgrounds, etc.) Further augmentations may also be applied if desired (e.g., glare spots, blur, randomized color variations, etc.).

More on a Particular Embodiment

The following description is drawn from text prepared for possible journal publication.

Deep learning methods using convolutional neural networks (CNNs) have shown promising results in classifying images in large datasets containing many classes, e.g., ImageNet, with very high accuracy. Consequently, deep learning is finding increasing applications from recognition systems to retail to self-driving vehicles. In such real-world systems, minimizing false positives (objects or examples outside the classes contained in the training sets) can often have critical importance. Although there has been tremendous focus recently on improving the overall accuracy (detection rate) of CNNs, there has been scant attention on optimizing for false positive performance. In this discussion, we detail a novel approach for false positive reduction. We introduce a new class, "Class 0," during training and feed random, but targeted, images through this class into the training process to reduce false positive detections. Composition of the Class 0 training set is adversarially defined. This approach adds the ability of making "I do not know" decisions to the network while facing new objects, and forces the network to learn detailed features for each class through the impetus provided by the added class containing very diverse content. We demonstrate that our approach effectively reduces false positives with acceptable loss on true detections.

In this paper, we detail three new methods for mitigating false positives in CNNs. First, we introduce a large, highly diverse background class into the training process, which forces the system to learn the fine-grained details that distinguish positive classes. Second, we require a 90% confidence threshold for making a positive detection, and default anything with a lower confidence value to a negative detection. This approach interprets uncertain classifier outputs as negative detections, and, when combined with training the network on class 0, has the effect of driving down false positives while minimally affecting true detection rates. Lastly, we fine-tune the network by emphasizing training images from Class 0, to further push the network to learn fine-grained detail of positive samples.

In their typical design, CNNs produce a probability or confidence score that an input matches each target class, and the highest-confidence class is taken as the final output. Not only the correct class should have the highest confidence, but also having the correct class among the top-5 highest scores, even with a small confidence, seems to be an acceptable measure in computer vision competitions. However, relying only on the metrics based on confidence score for gauging the performance of these classifiers does not allow the system to demonstrate a reliable performance in the face of out-of-class objects.

Sole reliance on a high confidence score cannot alleviate the problem of having false positive rate in these networks. Suppose we want to classify an input image $x_i$ using a convolutional neural network model which is trained on a dataset $D^K$ with K different classes. Our input image does not belong to any of the trained classes, $x_i \notin D^K$, and attains scores $S_i^n$ from each class where $n \in \{1, 2, \ldots, K\}$. Normally the network classifies $x_i$ as class k which has highest score $S_i^k$ among the outputs which is a wrong decision. In order to resolve this issue we need to impose a threshold $\tau$ on top of the confidence scores as the minimum acceptable bar for an object to be categorized as one of the trained classes. This also enables the network to reject classifying an input image whenever the highest confidence score among all classes does not satisfy the threshold requirements. Using a proper threshold $\tau$ in our case, the network will not misclassify an unknown object as one of the classes in $D^K$ since $S_i^k < \tau$.

Evidently, imposing such threshold creates a tradeoff between detection accuracy versus false positive rate. The more we increase the detection threshold $\tau$ in order to lower the false positive rate the more we lose on the detection power by raising the acceptance bar on scores. As our detailed study below shows, setting a proper threshold could help us create a good balance between the model's detection and false positive rates, but in order to achieve very low false positive rates while maintaining an acceptable detection rate this approach is not sufficient by its own. In order to realize this goal, we introduce into the training set a new class with random but targeted images biased towards the classes having highest false positive rates, in order to force the network to learn more detailed representations for the objects inside main classes. We illustrate details of our approach below.

On top of deploying thresholds on output scores, in order to further reduce the trained model's false positive rate while maintaining an acceptable detection rate, we introduce a new class called "Class 0" among the training classes, which adds the "I do not know" label among existing class labels. Having this new class enables us to include random images that do not belong to any of the original classes inside each input batch of training images. This enables the network to learn features that can be general representatives of the world outside our intended training classes. Benefits from adding this new class are twofold. Not only does the network have a representative class for samples that do not belong to any of the main classes, but this highly diverse negative class also contains images that look quite similar to our positive classes, and training on these negative samples forces the network to learn more detailed features. This level of detailed learning by itself could prevent the score of random images to be high for main classes, hence lowering false positive rate.

Proper execution of our approach requires special means that are not readily available within commonly-used frameworks for training convolutional neural networks. The main problem is having unbalanced sizes of class training data. While all of the main classes have a fixed number of samples, our Class 0 may encompass a much larger number of random images. This can bias the whole training process by favoring the gradients' updates towards the class with the majority of the samples. To resolve this issue we started from the latest version of the widely used deep learning framework, Caffe [16], and built our own input image data layer.

To address the problem of unbalanced training class sizes, our new data layer introduces the concept of weighted buckets as class containers. Each bucket has three properties: the source file of its contents, the unique label that represents its contents, and the weight that determines the likelihood with which a sample from the bucket might get picked as a member of each training batch. In this design, samples of a single class may be represented using several buckets with the same label, and if desired different weights, but each bucket is not capable of holding more than a single class. Each bucket's weight enables us to uniformly represent classes for which we have different numbers of training images, by assigning equal weights to their corresponding buckets.

This novel data layer also enables us to add or remove class samples during training simply by modifying the bucket contents on the fly. Moreover, this approach enables us to isolate a group of samples from a class in a different bucket with the same class label, but with a different weight, in order to increase or decrease the emphasis of that group on the training process. This paves the way to putting more emphasis on the training samples that the network has more difficulty in classifying. We use these capabilities in the following discussion as we add targeted samples to our Class 0 during the training process, using several different buckets of random but targeted images, in order to reduce the false positive rates of specific classes.

As our results in FIG. 48 show, adding random images that do not belong to any of the training classes, as a Class 0, noticeably decreases the false positive rate of the trained model as a whole. However, due to the large size of this class and the non-uniformity of its samples, the benefit is not uniform. The network learns features that enable it to discriminate some of the main classes, from class 0, more than others. Particularly for main classes characterized by relatively less detail and texture, relatively less discriminative learning takes place with the introduction of a class 0. False positive statistics for such classes remain high.

In order to address this non-uniformity in false positive rates among different classes, we detail an adversarial training approach to compile a tailored collection of Class 0 training images. In particular, we successively train and then test with random Flickr images—each time adding a new Class 0 bucket consisting of those random images that the network most-recently misclassified, with the highest confidence, as belonging to one of the main classes.

Figure 47:
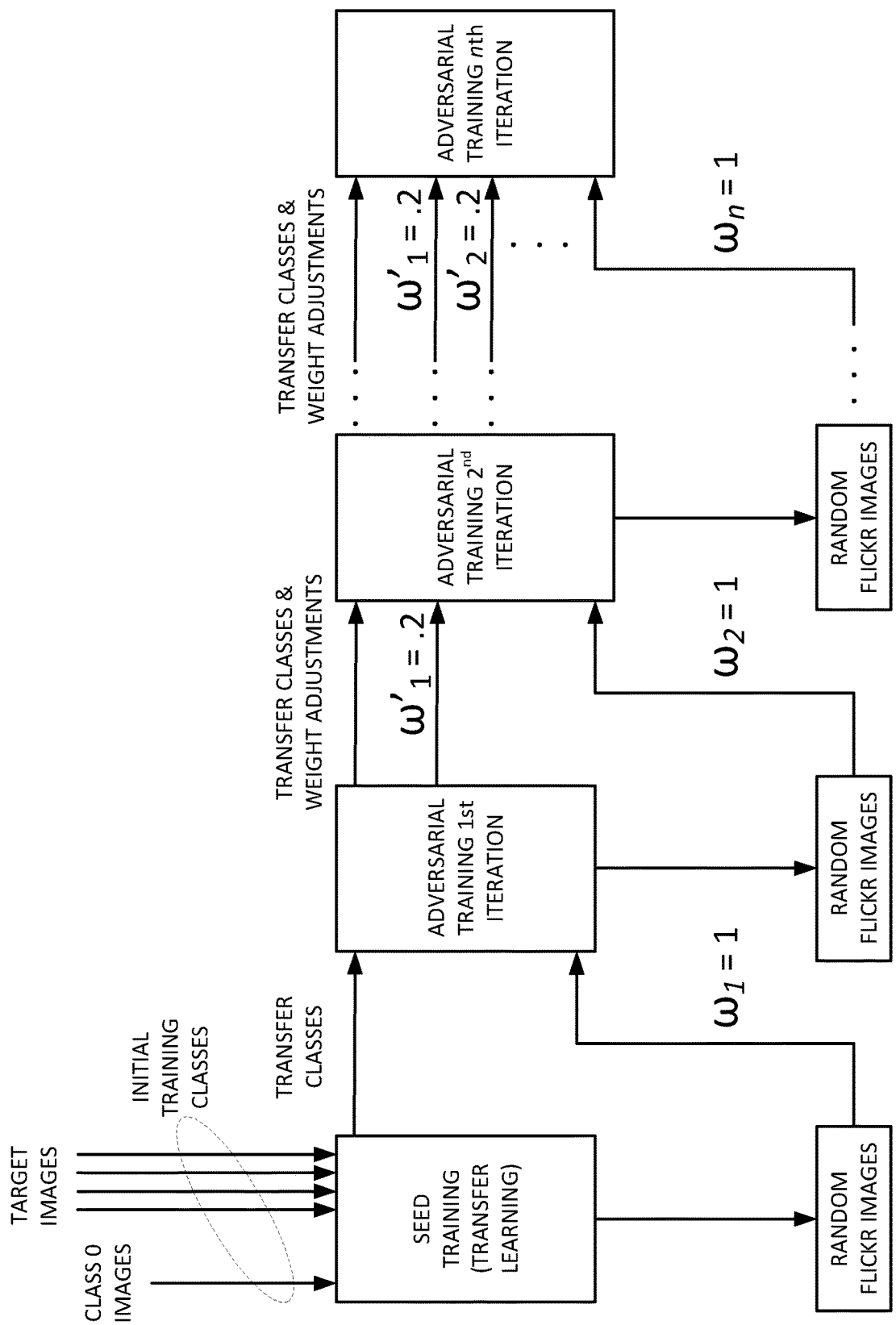
FIG. 47 is a block diagram of another embodiment employing aspects of the present technology.

FIG. 47 shows a simplified block diagram of this adversarial training process. We start with a baseline network model that is based on transfer learning, which we train through 2000 iterations, using K+1 buckets of training images: one corresponding to each main class, and one corresponding to a Class 0—populated with random Flickr images. Each of these buckets is assigned a weight of 1, a weight which is maintained constant throughout the training process. We next test this trained baseline model with a large set of random Flickr test images. From the network's resulting confidence scores, we identify the 1000 random images that scored the highest against any of the K main classes. These collected images then serve as a second bucket of Class 0 training images, to which a weight $\omega_0$, of 1, is initially assigned.

A first round of adversarial training follows based on this enlarged training set, including two buckets for Class 0—one of which is completely focused on reducing false positives for main classes just-found to be most false positive-vulnerable. After training for another 2000 iterations we test the resulting model against a new random Flickr image set, and collect a new set of 1000 top false positive candidates having the high confidence scores against the K main classes. This new set is added as a third Class 0 training bucket, and is initially assigned a weight $\omega_0$ of 1.

A second round of adversarial training then follows. In order to put the training emphasis on the newly added Class 0 bucket while not forgetting about the one before it, we reduce the weight of the predecessor to $\omega_0'=0.2$. Testing with more random Flickr images follows, generating another set of 1000 problematic images, which are again assembled into a further Class 0 bucket. We set the values of all parameters using a grid search on a held out set. (It is also worth noting that random images might co-exist between several Class 0 buckets depending on how difficult they might be for the network to learn.)

We continue in this fashion for a total of 20 rounds of adversarial training, yielding a total of 40,000 training iterations. Through this process we successively compile a total of 20 extra targeted buckets for Class 0—the newest always being assigned a weight of 1, and its predecessors being assigned weights of 0.2, for the ensuing round of training. Treating plural Class 0 buckets in this fashion can be interpreted as creating a weak long memory for the network from the samples that were the most challenging. It ensures that the network maintains good performance on the images selected for prior iterations, even while fine-tuning on new difficult images.

Through such process, false-positive behavior of the network is improved, with the improvements being focused on the main classes with which random images are most likely confused.

For our experiments, we used the CaffeNet model which has an architecture similar to AlexNet proposed in [14]. We replace the neurons in the last layer with a number of neurons equal to our number of classes, and randomly initialize their weights using Xavier initialization. The weights for the rest of the network are transferred from a 1000 class model that is initially trained on the ImageNet database. We use transfer learning to retrain this model for 48,000 iterations with a base learning rate of 0.0001, which is reduced by 50% every 16000 iterations during the training process. The rest of the parameters are those of the original model. The output of this training process is our Baseline model.

We next add one more neuron in the last layer, and retrain similarly, but this time additionally using Class 0 training images.

For the adversarial training strategy we kept the training parameters the same, and every 2000 iterations added a new targeted bucket for Class 0 to the training set, as described above. We trained this model for 40,000 iterations with a learning rate of 0.0001 that was maintained constant during the whole process. The same objects but with the variations in viewing angle, lighting and background. This makes training process more challenging and also contributes to the problem of having high false positives for trained models.

One of the main challenges in training large convolutional neural networks is having enough representative data points for each of the classes in the training set. Augmentation is an effective strategy that is commonly used for training neural networks on datasets with small number of samples per each class. Even when the training set has an acceptable size, augmentation can still help in increasing the generalizability of the trained model.

We augment our training set in two different ways to build the Augmented Set. First, due to lack of cluttered background in our training set we cut our object classes and paste them against random backgrounds [17]. This step is useful to simulate the cluttered background around the objects at the test time. This way the network will learn proper filters to discern the object of interest in busy scenes. Second, on top of the normal augmentation techniques, e.g. cropping, flipping, and lighting changes [15], we apply in-plane rotation, blurring, and color augmentation to each input image. During our experiments we realized that different lighting conditions will change the observed color by the camera sensor. In order to tackle this issue we applied a different liner transformation to each color channel separately. This approach helps in simulating the effect of color variation.

Two different datasets are used for training and testing in our studies, each with depictions of 106 different classes of 3D retail products. Each class contains 1500 images from each object. Our training dataset, Desk Set, is composed of product images captured in a studio setup, from various viewpoints and with a neutral backdrop. The face of each product that is visible from the capture viewpoint is completely depicted in the captured image. Our testing dataset, Concordia Set, contains images captured from each physical object in a real life scenario. In particular, images are captured in a grocery-store-like environment with a cluttered background, including shelves of other products. These image captures sometimes do not span the full face of a product, but may depict the product only partially. We use this set specifically for evaluating the performance of our trained models. The test set is kept constant during all of our experiments in order to assure meaningful comparisons.

To reduce the source-mismatch problem between our training and testing sets, we also create an augmented version of our training set from a single frontal capture of each object in the Desk Set. We refer to this training set in our experiments as the Augmented Set. Details of our augmentation strategies are presented below.

For our false positive studies we create two different sets of random images by crawling Flickr [Creative Commons licensed images]. We downsample these random images to have the same 256×256 dimensions as our input images and form Flickr-1M set and Flickr-5M sets out of them, containing 1 million and 5 million random images respectively. Flickr-1M is used for training the Baseline model and for the adversarial training process, while Flickr-5M is set aside for evaluating false positive performance.

It is worth noting that compared to regular training sets used for training convolutional neural networks, our training classes have much smaller intra-class variation. The samples for most of the objects in the ImageNet dataset classes are very different from each other, whereas our classes always contain the same objects but with the variations in viewing angle, lighting and background. This makes the training process more challenging and also contributes to the problem of having high false positives for trained models.

One of the main challenges in training large convolutional neural networks is having enough representative data points for each class in the training set. Augmentation is an effective strategy that is commonly used for training neural networks on datasets with small numbers of samples per class. Even when the training set has an acceptable size, augmentation can still help in increasing the generalizability of the trained model.

We augment our Desk Set training set in two different ways to build the Augmented Set. First, we segment the object depictions from their neutral backgrounds, and paste them against random backgrounds. This step is critical in order to simulate the cluttered background around objects at test time. This aids the network in learning proper filters to discern the object of interest in busy scenes. Second, on top of the normal augmentation techniques, e.g. cropping, flipping, and lighting changes, we apply in-plane rotation, translation, blurring, and color augmentation to each input image. During our experiments we realized that different lighting conditions change the colors observed by the camera sensor. In order to tackle this issue we applied a different random transformation to each color channel separately (e.g., +/−10%). This approach helps in simulating the effect of color variation.

In the following discussion, we detail several experiments to numerically evaluate the effectiveness of our approach in reducing CNN false positive rate. One part of the discussion evaluates the performance of the Baseline models that we trained using two different training sets, Desk Set and Augmented Set. Adding a Class 0 for reducing the false positive rate is studied in a further part of the discussion. We then show the effect of our adversarial training strategy, and compare it against the Baseline models. We conclude by studying the effect of having a variable threshold for prediction scores.

The Baseline models are trained by transfer learning from CaffeNet based on the ImageNet dataset. The models are often fooled by images having a coarse structure similar to true class. The top false matches for a valid class typically have a common base structure. One way to mitigate these false positives is by applying a global threshold $\tau$ to the prediction score. But in most of these cases, the (wrong) prediction score is very high. This indicates the network is relying primarily on the coarse structure of the objects, and gives little consideration to fine details and textures in classifying the query images. Hence, these models have relatively high misread and false positive rates. We hypothesize that this is due to the fact that the network does not have any means for making "I do not know" decisions. When a query image not belonging to any of the training classes is processed by the network, the prediction probabilities are fitted among the already existing classes. To minimize false positive risk, all the class probabilities should be equally low and below the set threshold $\tau$. To achieve this, the model should learn fine features characterizing each of the training classes. This process is governed by the quality of input training data and intra-class variations. Due to lack of having a uniform realization of this level of quality in training datasets, Baseline models can easily get confused by similarities in the structures causing high false positives. In the following discussion we create a representative class for the samples that do not belong to any of the training classes to alleviate this problem.

On top of the existing classes in the training set, the training set of this model has an extra class, Class 0, which contains random images (background images). The Class 0 samples are randomly selected from Flickr and consequently have very high intra-class variations. If we consider the convolutional layers in the CNN as feature extractors whose purpose is to extract features that are clustered in a higher dimensional space, and the fully connected layers as mappers who map the features to individual clusters in that space, then the features generated by such large intra-class variance will not be clustered in the higher dimensional space. In contrast, for a true class sample, the extracted features will be close to a local cluster in the higher dimensional space. Hence, when we feed a query image that does not belong to any of the initial classes, instead of mapping the features coming out of this image to some cluster of features from a true class, we want the network to reduce the prediction score for all the true classes and increase the prediction score for class 0. This strategy enables the network to give an "I do not know" answer and substantially reduces the false positive rate of the model.

FIG. 48 shows data for three models: a Baseline (seed) model, a model with a single Class 0, and a model that is adversarially trained with multiple sets of Class 0 images. All three models employ confidence thresholds of 0.9. This figure shows that switching from the Baseline model to the Class 0 model improves the false positive rate by a factor of about 15 for both training sets. The existence of a Class 0 gives more space to the network to embrace random features arising from random background images. We conclude from this that just by introducing a Class 0, we are forcing the network to look into finer texture details of the image, rather can making a decision from the coarse image structure alone. Although this strategy brings the false positive rate down by a considerable factor (e.g., to 1%), it is still insufficient for many practical applications. We employ a new strategy that biases the randomness of the samples inside Class 0 in order to further, and dramatically, reduce the false positive rate.

As our results in FIG. 48 show, adding a Class 0 is a big step towards reducing the false positive rate, but this may not be sufficient for some applications. We need to equip the network to learn finer details for each class if necessary. To achieve this goal, we employ an adversarial training strategy which forces the system to learn by giving more importance to random images with which the network may most readily be fooled. The adversarial training happens in multiple steps.

At each step, after getting the network's response for a set of random test images and selecting only the falsely classified ones, we fill the class 0 bucket with these images, so that in the next training step, whenever the network sees a class 0 image, it would be one of the images that confused the network in the past. FIG. 48 shows that this strategy reduces the false positive rate by a factor of ~18 for the Augmented Set and ~76 for the Desk set. We hypothesize that this happens because by feeding just the confusion-causing images, the network starts becoming more robust to such confusing images and overtime, becomes better at avoiding such confusions.

To push down the false positive rate even more, we use the long memory strategy. In this approach, instead of renewing the class 0 bucket by all the confusion causing images from the current step, we use the confusion causing images from the previous steps as well. The weights for class zero buckets are arranged in a way that more of the confusion causing random images are fed from the present step and less from the previous steps. Since the confusion causing images from previous steps have fooled the network sometime in the past, they still have some potential to fool the network again. Hence feeding them helps to reduce the false positive rate. FIG. 48 shows that the false positive rate is slashed by a factor of ~19 for the augmented set (4 in 100k false positive images) and a factor of ~5 for Desk set (2 in 100K false positive images). This evidences that employing challenging/confusing random images, as further training images, causes the network to eventually learn to rely on more subtle image features, which were previously overlooked in classification, thereby reducing the false positive rate.

From the same set of results we also see that the misread rate goes down as a result of this strategy. We hypothesize that this is happening because the network is directed to look into finer details for classification and we have a very small intra-class variance for some of the training classes.

In all of our experiments we had the value of the confidence threshold fixed at $\tau=0.9$. An input image is categorized as a class member if and only if its confidence score is above the threshold $\tau$. In this discussion we review the effect of varying this threshold to measure the tradeoff between false positive and detection rate of the trained models.

The ROC of the trained models results from changing threshold $\tau$ in the range [0,1]. Acting as a control knob, we can adjust this threshold until we reach a satisfactory level for detection or false positive rates. Decreasing the false positive rate by increasing this threshold adversely decreases the detection rate, and vice versa. For Class 0 models, we can reduce the false positive rate by one order of magnitude in log scale, at a cost of about 18% drop in detection rate. FIG. 48 shows a 14.84% reduction in false positive rate at a cost of a 7.57% reduction in detection rate, for the Baseline model and Augmented Set. Correspondingly, if we increase the false positive rate for the Adversarially-trained Class 0 model for Augmented Set by 0.0069%, we can increase the detection rate by 5.55%. These interesting examples show the rather drastic effect on false positive and detection rates resulting in changes from the confidence threshold.

By adjusting the confidence threshold, network performance can thus be tailored to balance false positive and detection rate in whatever manner a particular application may require.

(Although the foregoing discussion has described the methodology in the context of improving false-positive behavior, the same principles can be employed in improving object detection statistics. That is, the bucket arrangement can instead be used to devote more training attention to those classes with lower detection rates, causing such rates to rise.)

[1] I. Goodfellow, J. Pouget-Abadie, M. Mirza, B. Xu, D. Warde-Farley, S. Ozair, A. Courville, and Y. Bengio. Generative adversarial nets. In Proc. NIPS, 2014.

[2] L. Gatys, A. Ecker, and M. Bethge. Image style transfer using convolutional neural networks. In Proc. CVPR, 2016.

[3] D. Yoo, N. Kim, S. Park, A. Paek, and I. Kweon. Pixel-level domain transfer. In Proc. ECCV, 2016.

[4] M. K. Johnson, K. Dale, S. Avidan, H. Pfister, W. T. Freeman, and W. Matusik. Cg2real: Improving the realism of computer generated images using a large collection of photographs. IEEE Transactions on Visualization and Computer Graphics, 17(9):1273-1285, 2011

[5] A. Nguyen, J. Yosinski, and J. Clune, "Deep neural networks are easily fooled: High confidence predictions for unrecognizable images," in In Computer Vision and Pattern Recognition (CVPR 2015). IEEE, 2015.

[6] A. Cully, J. Clune, and J.-B. Mouret. Robots that can adapt like natural animals. arXiv preprint arXiv: 1407.3501, 2014

[7] I. J. Goodfellow, J. Shlens, and C. Szegedy, "Explaining and harnessing adversarial examples," in Proceedings of the 2015 International Conference on Learning Representations. Computational and Biological Learning Society, 2015.

[8] Nicolas Papernot, et al., "Distillation as a defense to adversarial perturbations against deep neural networks." In Proceedings of the 37th IEEE Symposium on Security and Privacy (S&P), 2015.

[9] Ross Girshick, "Fast R-CNN", International Conference on Computer Vision (ICCV), 2015.

[10] Sermanet, P., Eigen, D., Zhang, X., Mathieu, M., Fergus, R., and LeCun, Y., "OverFeat: Integrated Recognition, Localization and Detection using Convolutional Networks." In Proc. ICLR, 2014.

[11] A. Shrivastava, A. Gupta, and R. Girshick., "Training region-based object detectors with online hard example mining." In CVPR, 2016.

[12] K. Sung and T. Poggio., "Example-based learning for viewbased face detection." In IEEE Patt. Anal. Mach. Intell., volume 20, pages 39-51, 1998.

[13] S. Gupta, R. Girshick, P. Arbelaez, and J. Malik. "Learning rich features from RGB-D images for object detection and segmentation." In ECCV. Springer, 2014.

[14] J. Dai, Y. Li, K. He, and J. Sun, "R-fcn: Object detection via region based fully convolutional networks," arXiv: 1605.06409, 2016.

[15] A. Krizhevsky, I. Sutskever, and G. Hinton. "ImageNet classification with deep convolutional neural networks." In NIPS, 2012.

[16] Y. Jia, E. Shelhamer, J. Donahue, S. Karayev, J. Long, R. Girshick, S. Guadarrama, and T. Darrell. "Caffe: Convolutional architecture for fast feature embedding." arXiv:1408.5093, 2014.

[17] Held, D., Thrun, S., Savarese, S., "Robust single-view instance recognition." In: ICRA (2016).

Feature Recognition

As noted, implementations of the detailed technology can employ feature descriptors (e.g., SIFT, SURF, and ORB) derived from imagery, to perform item identification.

Generally speaking, such techniques rely on locations within imagery where there is a significant local variation with respect to one or more chosen image features—making such locations distinctive and susceptible to detection. Such features can be based on simple parameters such as luminance, color, texture, etc., or on more complex metrics (e.g., difference of Gaussians). Each such point can be represented by data indicating its location within the image, the orientation of the point, and/or a feature vector representing information associated with that location. (A feature vector commonly used in SURF implementations comprises 64 data, detailing four values of luminance gradient information for each of 16 different square pixel blocks arrayed around the interest point.)

Such image features may comprise individual pixels (or sub-pixel locations within an image), but these technologies typically focus on 2D structures, such as corners, or consider gradients within square areas of pixels.

SIFT is an acronym for Scale-Invariant Feature Transform, a computer vision technology pioneered by David Lowe and described in various of his papers including "Distinctive Image Features from Scale-Invariant Keypoints," International Journal of Computer Vision, 60, 2 (2004), pp. 91-110; and "Object Recognition from Local Scale-Invariant Features," International Conference on Computer Vision, Corfu, Greece (September 1999), pp. 1150-1157, as well as in U.S. Pat. No. 6,711,293.

SIFT works by identification and description—and subsequent detection—of local image features. The SIFT features are local and based on the appearance of the object at particular interest points, and are robust to image scale, rotation and affine transformation. They are also robust to changes in illumination, noise, and some changes in viewpoint. In addition to these properties, they are distinctive, relatively easy to extract, allow for correct object identification with low probability of mismatch, and are straightforward to match against a (large) database of local features. Object description by a set of SIFT features is also robust to partial occlusion; as few as three SIFT features from an object are enough to compute its location and pose.

The technique starts by identifying local image features ("keypoints") in a reference image. This is done by convolving the image with Gaussian blur filters at different scales (resolutions), and determining differences between successive Gaussian-blurred images. Keypoints are those image features having maxima or minima of the difference of Gaussians occurring at multiple scales. (Each pixel in a difference-of-Gaussian frame is compared to its eight neighbors at the same scale, and corresponding pixels in each of the neighboring scales (e.g., nine other scales). If the pixel value is a maximum or minimum from all these pixels, it is selected as a candidate keypoint.

(It will be recognized that the just-described procedure is a blob-detection method that detects space-scale extrema of a scale-localized Laplacian transform of the image. The difference of Gaussians approach is an approximation of such Laplacian operation, expressed in a pyramid setting.)

The above procedure typically identifies many keypoints that are unsuitable, e.g., due to having low contrast (thus being susceptible to noise), or due to having poorly determined locations along an edge (the Difference of Gaussians function has a strong response along edges, yielding many candidate keypoints, but many of these are not robust to noise). These unreliable keypoints are screened out by performing a detailed fit on the candidate keypoints to nearby data for accurate location, scale, and ratio of principal curvatures. This rejects keypoints that have low contrast, or are poorly located along an edge.

More particularly this process starts—for each candidate keypoint—by interpolating nearby data to more accurately determine keypoint location. This is often done by a Taylor expansion with the keypoint as the origin, to determine a refined estimate of maxima/minima location.

The value of the second-order Taylor expansion can also be used to identify low contrast keypoints. If the contrast is less than a threshold (e.g., 0.03), the keypoint is discarded.

To eliminate keypoints having strong edge responses but that are poorly localized, a variant of a corner detection procedure is applied. Briefly, this involves computing the principal curvature across the edge, and comparing to the principal curvature along the edge. This is done by solving for eigenvalues of a second order Hessian matrix.

Once unsuitable keypoints are discarded, those that remain are assessed for orientation, by a local image gradient function. Magnitude and direction of the gradient is calculated for every pixel in a neighboring region around a keypoint in the Gaussian blurred image (at that keypoint's scale). An orientation histogram with 36 bins is then compiled—with each bin encompassing ten degrees of orientation. Each pixel in the neighborhood contributes to the histogram, with the contribution weighted by its gradient's magnitude and by a Gaussian with a 1.5 times the scale of the keypoint. The peaks in this histogram define the keypoint's dominant orientation. This orientation data allows SIFT to achieve rotation robustness, since the keypoint descriptor can be represented relative to this orientation.

From the foregoing, plural keypoints of different scales are identified—each with corresponding orientations. This data is invariant to image translation, scale and rotation. 128 element descriptors are then generated for each keypoint, allowing robustness to illumination and 3D viewpoint.

This operation is similar to the orientation assessment procedure just-reviewed. The keypoint descriptor is computed as a set of orientation histograms on (4×4) pixel neighborhoods. The orientation histograms are relative to the keypoint orientation and the orientation data comes from the Gaussian image closest in scale to the keypoint's scale. As before, the contribution of each pixel is weighted by the gradient magnitude, and by a Gaussian with a 1.5 times the scale of the keypoint. Histograms contain 8 bins each, and each descriptor contains a 4×4 array of 16 histograms around the keypoint. This leads to a SIFT feature vector with (4×4×8=128 elements). This vector is normalized to enhance invariance to changes in illumination.

The foregoing procedure is applied to training images to compile a reference database. An unknown image is then processed as above to generate keypoint data, and the closest-matching image in the database is identified by a Euclidian distance-like measure. (A "best-bin-first" algorithm is typically used instead of a pure Euclidean distance calculation, to achieve several orders of magnitude speed improvement.) To avoid false positives, a "no match" output is produced if the distance score for the best match is close—e.g., 25% to the distance score for the next-best match.

To further improve performance, an image may be matched by clustering. This identifies features that belong to the same reference image—allowing unclustered results to be discarded as spurious. A Hough transform can be used—identifying clusters of features that vote for the same object pose.

An article detailing a particular hardware embodiment for performing the SIFT procedure is Bonato et al, "Parallel Hardware Architecture for Scale and Rotation Invariant Feature Detection," IEEE Trans on Circuits and Systems for Video Tech, Vol. 18, No. 12, 2008. Another is Se et al, "Vision Based Modeling and Localization for Planetary Exploration Rovers," Proc. of Int. Astronautical Congress (IAC), October, 2004.

Published patent application WO07/130688 concerns a cell phone-based implementation of SIFT, in which the local descriptor features are extracted by the cell phone processor, and transmitted to a remote database for matching against a reference library.

While SIFT is perhaps the most well-known technique for generating robust local descriptors, there are others, which may be more or less suitable—depending on the application. These include GLOH (c.f., Mikolajczyk et al, "Performance Evaluation of Local Descriptors," IEEE Trans. Pattern Anal. Mach. Intell., Vol. 27, No. 10, pp. 1615-1630, 2005); and SURF (c.f., Bay et al, "SURF: Speeded Up Robust Features," Eur. Conf. on Computer Vision (1), pp. 404-417, 2006; as well as Chen et al, "Efficient Extraction of Robust Image Features on Mobile Devices," Proc. of the 6th IEEE and ACM Int. Symp. On Mixed and Augmented Reality, 2007; and Takacs et al, "Outdoors Augmented Reality on Mobile Phone Using Loxel-Based Visual Feature Organization," ACM Int. Conf. on Multimedia Information Retrieval, October 2008. A feature vector commonly used in SURF implementations comprises 64 data, detailing four values of luminance gradient information for each of 16 different square pixel blocks arrayed around the interest point.)

ORB feature-based identification is detailed, e.g., in Calonder et al, BRIEF: Computing a Local Binary Descriptor Very Fast, IEEE Transactions on Pattern Analysis and Machine Intelligence, Vol. 34, No. 7, pp. 1281-1298; Calonder, et al, BRIEF: Binary Robust Independent Elementary Features, ECCV 2010; and Rublee et al, ORB: an efficient alternative to SIFT or SURF, ICCV 2011. ORB, like the other noted feature detection techniques, is implemented in the popular OpenCV software library (e.g., version 2.4.13).

Still other fingerprinting techniques (as well as other relevant subject matter) are detailed in patent publications 20090282025, 20060104598, WO2012004626 and WO2012156774 (all by LTU Technologies of France).

Yet other fingerprinting techniques are variously known as Bag of Features, or Bag of Words methods. Such methods extract local features from patches of an image (e.g., SIFT points), and automatically cluster the features into N groups (e.g., 168 groups)—each corresponding to a prototypical local feature. A vector of occurrence counts of each of the groups (i.e., a histogram) is then determined, and serves as a reference signature for the image. To determine if a query image matches the reference image, local features are again extracted from patches of the image, and assigned to one of the earlier-defined N-groups (e.g., based on a distance measure from the corresponding prototypical local features). A vector occurrence count is again made, and checked for correlation with the reference signature. Further information is detailed, e.g., in Nowak, et al, Sampling strategies for bag-of-features image classification, Computer Vision-ECCV 2006, Springer Berlin Heidelberg, pp. 490-503; and Fei-Fei et al, A Bayesian Hierarchical Model for Learning Natural Scene Categories, IEEE Conference on Computer Vision and Pattern Recognition, 2005; and references cited in such papers.

CONCLUDING REMARKS

It will be recognized that the above-detailed arrangements serve variously to increase the accuracy of image recognition systems (including both false positive and item-confusion behaviors), and otherwise improve system performance.

Having described and illustrated certain arrangements, it should be understood that applicant's technology is not so-limited.

For example, while embodiments of the technology were described based on one illustrative neural network architecture, it will be recognized that different network topologies—now existing (as detailed in the incorporated-by-reference documents) and forthcoming—can be used, depending on the needs of particular applications. (Recognizing 50,000 classes requires a network that is deeper, or otherwise more complex, than a network that recognizes 1,000 classes—if the same detection rate or false-positive behavior is to be achieved in each.)

Some researchers are urging more widespread use of deeper networks. See, e.g., the He paper cited above and attached to incorporated-by-reference application 62/404,721. With deeper networks, it can be cumbersome to manually select filter dimensions for each layer. Many researchers have thus proposed using higher level building blocks, such as "Inception modules" to simplify network design. Inception modules commonly include filters of several different dimensionalities (typically 1×1, 3×3, and sometimes 1×3, 3×1 and 5×5). These and other features of deeper networks are further detailed, e.g., in the following papers about the "GoogLeNet" architecture (an exemplary embodiment of which has 22 layers):

Ioffe, et al, Batch normalization: Accelerating deep network training by reducing internal covariate shift, arXiv preprint arXiv:1502.03167 (2015).

Szegedy, et al, Going deeper with convolutions, Proceedings of the IEEE Conference on Computer Vision and Pattern Recognition (2015).

Szegedy, et al, Rethinking the inception architecture for computer vision, arXiv preprint arXiv:1512.00567 (2015).

Szegedy, et al, Inception-v4, inception-resnet and the impact of residual connections on learning, arXiv preprint arXiv:1602.07261 (2016).

Reference was made to training just latter stages of a network, e.g., as items are added to a supermarket's inventory, and leaving earlier stages with their original parameters unaltered. Applicant has confirmed that a network trained on a large set of supermarket items can be repurposed to recognize different supermarket items, without retraining of the entire network, drawing on the work by Donahue et al cited above and attached to incorporated-by-reference application 62/404,721. (This process is sometimes referenced as "transfer learning"—taking knowledge developed in solving one problem, and transferring it to solution of a different problem.)

In a variant embodiment, sometimes one or more final stage(s) of a network can be frozen, and one or more earlier stages can be re-trained to achieve certain ends (e.g., enhancing robustness to certain gross distortions, such as blurring). In this connection see Zhou, et al, On Classification of Distorted Images with Deep Convolutional Neural Networks, arXiv preprint arXiv:1701.01924 (2017).

Given the large number of items sought to be classified in certain applications of the present technology, the correspondingly-large model sizes can be a challenge for implementation in certain embodiments, e.g., on mobile devices. Arrangements such as that taught by Iandola, SqueezeNet: AlexNet-level accuracy with 50× fewer parameters and <0.5 MB model size, arXiv preprint arXiv:1602.07360, 2016 (attached to incorporated-by-reference application 62/418,047) can be employed to realize classifiers of lower complexity.

Another approach to reducing the network size is to employ a different type of classifier output structure. Most of the network size (required memory) is due to the fully-connected-layers (multi-layer perceptron) output arrangement. Different classification networks can be employed instead, such as an SVM or tree classifier, which may create decision boundaries otherwise—such as by a hyperplane. In one particular embodiment, the network is originally configured, and trained, using a multi-layer perceptron classifier. After training, this output structure is removed and a different classifier structure is employed in its stead. Further training of the network can proceed with the new output structure in place. If new object classes are introduced, the network—employing the new output classifier—can be retrained as necessary to recognize the new classes.

Contrary to prevailing wisdom, applicant generally prefers to use a batch training approach. That is, instead of adjusting network parameters for every training image, based on the desired network output versus the actual network output (sometimes termed an "online" approach), applicant prefers to process a batch of 5, 50, 150, or more, images, and average the indicated adjustments before applying them to the network parameters. This reduces the amount of RAM required, and seems to help the training reach convergence sooner. Additionally, such averaging helps against overfitting, and also reduces the chance of the training getting stuck at a local minimum error rather than proceeding to a global minimum error.

Optical character recognition (OCR) can be advantageously employed in different aspects of applicant's detailed technologies. For example, OCR analysis of an input frame for the word "SEEDLESS" can be conducted, and used in verifying an item identification made by the system, to increase identification accuracy, and reduce false-positives. If such word is not found, for example, then the system can discount or rule-out the possibility that the depicted item is Item A or Item B in FIG. 1 (both of which include this term just above the "Red Raspberry" text). Similarly, OCR text (such as the presence of the word "SEEDLESS" can be employed as one of the "hand-tuned" features in the arrangements discussed in connection with FIGS. 36 and 37.

Figure 44:
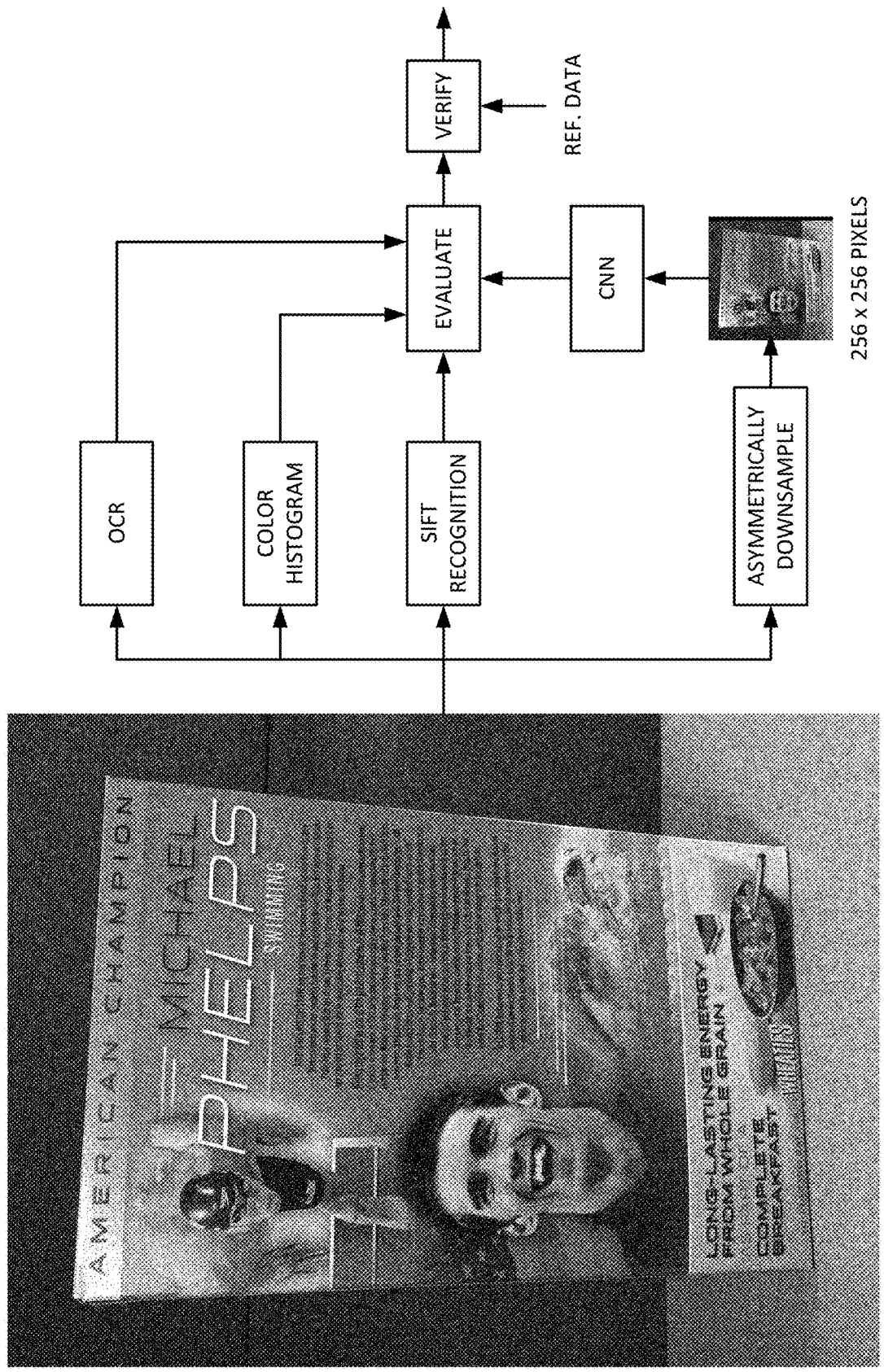
FIG. 44 shows a system employing multiple recognition technologies, operating on image data of different aspect ratios and different resolutions.

FIG. 44 shows that in some embodiments, different recognition operations are performed with image counterparts of different resolutions. OCR, for example, should be performed on high resolution imagery—preferably before any JPEG compression or the like has been applied. Likewise with SIFT-based image recognition. ("SIFT" is here used as a shorthand for all manner of fingerprint- and other feature-based recognition technologies.) A convolutional neural network, in contrast, can operate (and should operate, given present constraints) on image data that has been asymmetrically down-sampled, e.g., to 256×256 pixels, from 3264× 2448 native imagery. Color histogramming can be performed either using the native format imagery, or the down-sampled imagery.

FIG. 44 shows all of these recognition technologies providing inputs to an evaluation stage, which looks for consistency or consensus among and between the item identifications indicated by the different technologies. The evaluation stage may produce a confidence score for the indicated item, based on a polynomial combination of confidence scores from the individual recognition stages, e.g., of the form:

$$S = aC_1^d + bC_2^e + cC_3^f \ldots$$

where $C_1$, $C_2$, $C_3$, etc., are the individual confidence scores, and the other symbols represent constants (e.g., heuristically determined).

Less than all of these component technologies can naturally be used (e.g., just OCR and CNN). Alternatively, others may be added. An optional further module is shown to perform verification—which can employ any of the just-noted approaches, or may perform a point-wise matching (e.g., correlation operation) between the query image and reference data. (Reference data can be accessed from a database, based on the item identification output by the Evaluate stage).

Naturally, the stages shown in FIG. 44 can be distributed between different hardware platforms, e.g., mobile phone/POS scanner, intermediate server, remote server, etc.

In another embodiment, a network is trained to recognize, e.g., 1000 classes, and is thereafter tested to determine the detection rate for each class. Such detection rates are ranked, and objects with the poorest detection rates (e.g., having the lowest 10%, 3%, or 1% of detection rates) are fingerprinted using known techniques (e.g., SIFT). Resultant reference fingerprint data for such objects is stored in a database—in association with metadata identifying the corresponding objects. In use, incoming imagery is routed both to the trained network, and to software that computes fingerprint data from the imagery and compares it with reference fingerprint data in the database. If a fingerprint match is found, the item identification is determined by the associated fingerprint metadata in the database rather than by the neural network (the output of which is disregarded). In a variant embodiment, the input imagery is first fingerprint-analyzed for a match with one of the fingerprinted objects. The input imagery is applied to the neural network only if no fingerprint match is found. By such arrangement, the network is safeguarded from being relied on to identify the worst-performing classes.

The same safeguard approach can likewise be used to improve false positive behavior. That is, a trained network is tested to identify the classes that are most susceptible to being incorrectly indicated. Again, objects for such classes are fingerprinted, and recognition of such objects proceeds by reference to fingerprint-based recognition, rather than relying on the neural network output.

Naturally, such arrangements can be used in combination, with fingerprint-based identification being used both for those objects with the lowest detection rates, and for those objects with the highest false positive rates.

In addition to fingerprint-based recognition (or as an alternative), OCR and/or histogram-based identification may be used for these trouble-prone classes. That is, the worst-performing object classes are each analyzed for distinguishing text content or color histograms, and such data is stored in association with object identification data. Input imagery is analyzed by OCR and/or histogramming software to determine whether the object can be identified on such basis. If so, such output is employed, and the output from the neural network is disregarded. (Naturally, the same method can employ recognition technologies other than OCR and histogramming. Barcode decoding and watermark decoding are two examples of such other recognition technologies.)

In distributed systems, in which color image capture is performed on one system, and certain recognition processing is performed on a spatially-remote system, bandwidth (and latency) can be reduced by processing the color image on the first system to produce both a color histogram for the image, and a black and white counterpart image. These latter two data are sent to the remote second system for recognition processing—conserving bandwidth compared with transmitting the original color image.

In the detailed embodiments, features extracted from imagery by stages of a neural network can be processed to refine certain features and remove noisy features, e.g., by dimensionality reduction techniques such as probabilistic cellular automata (PCA) or t-distributed stochastic neighbor embedding (t-SNE). Such processed features can be used for coarse level classification, e.g., discriminating boxes from cans from jars from bags from wine bottles from beer sixpacks, etc., but not for discriminating cheddar cheese from provolone cheese. Such coarse features can be used as a dictionary in a bag-of-words sense, enabling high level classification groupings—based on the prevalence of different coarse features. (This may be regarded in the sense of a histogram of coarse features.) If one certain combination of coarse features is detected, e.g., indicating the object is a jar, the fine-grained features from the network can be applied to fully-connected perceptron layers that have been trained to distinguish among the individual members within that coarse "jar" classification. If a different combination of coarse features is detected, e.g., indicating the object is a box, the fine-grained features can be applied to fully-connected layers that have been trained to distinguish among the individual members within that coarse "box" classification.

Such arrangement employs a limited number of initial, coarse classes (bins)—each of which corresponds to a (smaller) subset of the universe of individual items. It also becomes easier to modify the network to add or delete objects, since it is composed of modular, simpler elements.

Except as expressly indicated otherwise (e.g., in the section entitled Improving Performance by Training for Ambiguous Cases), references to neurons "firing," "activating" or "triggering" refer to the condition when the output signal from a neuron crosses a predetermined confidence threshold, e.g., 0.95, 0.97, etc. When this document refers to activating two output neurons, it should be understood that they both cannot have an output signal of 0.9, 0.95, or 0.97, etc. Instead, in such case, the activation refers to the two signals from the two neurons summing to at least 0.9, 0.95, 0.97, etc. Relatedly, when this document refers to activating only one neuron, etc., it is contemplated that other neurons may nonetheless have very low level output signals, e.g., the complement of the "triggered" neuron threshold, i.e., 0.05 if the triggering threshold is 0.95.

This document sometimes refers to two items that "risk visual confusion," or are "confusingly similar," etc. Such expressions should be understood to refer to two different items that, when viewed from a distance of ten feet, in normal retail lighting (e.g., overhead fluorescent illumination of 75—100 foot-candles), cannot be readily distinguished from each other by an untrained human observer (i.e., one who has not previously been trained specifically to distinguish such items).

In this specification, references to image data, imagery, and the like should be understood to refer not only to pixel data representing imagery, but also derivatives thereof (including transform domain representations, filtered versions, intermediate products of recognition operations such as SIFT points and other fingerprint data, etc.), unless the context clearly indicates a contrary intent.

Various references were made to Flickr images. Any other images can naturally be used; the Flickr service is simply a convenient source.

Similarly, while this specification repeatedly refers to supermarkets, it should be recognized that use of the detailed technologies is not so-limited.

Moreover, while many embodiments were described in connection with neural network implementations, some such embodiments do not require neural networks, but can be practiced instead with other image recognition technologies (e.g., based on SIFT, or color histogramming, or digital watermarking, etc.). To illustrate, the arrangement in which an image is divided into portions, and each portion is separately classified—with the most certain identification being taken as the correct identification—can be implemented with recognition technologies other than neural networks. Similarly with other aspects of the disclosed technology. Except where an embodiment requires—by its nature—a neural network implementation, it should be understood that other recognition technologies can be substituted.

The present technologies can be advantageously utilized in the described supermarket applications even if only a fraction of the inventory is thereby identified. For example, to speed checkout, if half of a supermarket's top-selling 500 products can be identified by image recognition rather than barcode, then checkout speeds can be significantly enhanced, since a large fraction of the items presented for checkout can then be identified without first finding the barcode, and manipulating the product to turn the barcode towards the scanner.

In one particular arrangement, the performance of an image recognition system is assessed for all of the items in a supermarket's inventory. A subset of the items is identified, for which the system meets the stringent accuracy metrics that a supermarket may impose (e.g., accuracy greater than 99.99%). In operation, if the system identifies an item not in that subset, it reports no identification (e.g., by issuing a distinctive tone), in response to which the checkout clerk identifies the item by scanning its barcode.

If the universe of anticipated items includes some items that may be digitally watermarked, then examining the imagery for the presence of a digital watermark may be done before, or concurrently with, the image identification processes detailed herein. If an item bears a digital watermark, such identification is more accurate, by at least an order of magnitude, than identification by image recognition approaches.

Reference was made to two different classes of errors that may arise, false positive, and item confusion. In designing networks for supermarket item recognition, Applicant has found it advantageous to aim to minimize these error occurrences, rather than to maximize the number of occurrences in which the network correctly recognizes items. As noted earlier, these two are not equivalent.

Naturally, the detailed arrangements can be implemented in a variety of different contexts and applications. For example, supermarket checkout scanners, mobile phones, and desktop computers, can all be equipped with arrangements of the sort detailed above—either implemented in standalone or distributed fashion.

Still further, while the technology was described in connection with classifying images, the same principles are more generally applicable, to classifying input stimulus of different types—including for applications including vehicle navigation, speech recognition, medical diagnosis, etc.

There are an increasing number of toolsets that have been designed specifically for developing and training neural networks. Applicant uses Caffe—an open source framework for deep learning algorithms, distributed by the Berkeley Vision and Learning Center and detailed, e.g., in the paper by Jia attached to incorporated-by-reference application 62/404,721. (Caffe provides a version of the "AlexNet" architecture that is pre-trained to distinguish 1000 "ImageNet" object classes.) Other suitable platforms to realize the arrangements detailed above include TensorFlow from Google, Theano from the Montreal Institute for Learning Algorithms, the Microsoft Cognitive Toolkit, Torch from the Dalle Molle Institute for Perpetual AI, MX-Net from a consortium including Amazon, Baidu and Carnegie Mellon University, and Tiny-DNN on Github.

For training, applicant uses the Caffe toolset in conjunction with a computer equipped with multiple Nvidia TitanX GPU cards. Each card includes 3,584 CUDA cores, and 12 GB of fast GDDR5X memory.

Once trained, the processing performed by the detailed neural networks is relatively modest. Some hardware has been developed especially for this purpose, e.g., to permit neural networks to be realized within the low power constraints of mobile devices. Examples include the Snapdragon 820 system-on-a-chip from Qualcomm, and the Tensilica T5 and T6 digital signal processors from Cadence. (Qualcomm provides an SDK designed to facilitate implementation of neural networks with its 820 chip: the Qualcomm Neural Processing Engine SDK.)

Alternatively, the trained neural networks can be implemented in a variety of other hardware structures, such as a microprocessor, an ASIC (Application Specific Integrated Circuit) and an FPGA (Field Programmable Gate Array). Hybrids of such arrangements can also be employed, such as reconfigurable hardware, and ASIPs.

By microprocessor, Applicant means a particular structure, namely a multipurpose, clock-driven, integrated circuit that includes both integer and floating point arithmetic logic units (ALUs), control logic, a collection of registers, and scratchpad memory (aka cache memory), linked by fixed bus interconnects. The control logic fetches instruction codes from a memory (often external), and initiates a sequence of operations required for the ALUs to carry out the instruction code. The instruction codes are drawn from a limited vocabulary of instructions, which may be regarded as the microprocessor's native instruction set.

A particular implementation of one of the above-detailed arrangements on a microprocessor—such as the processing of input image data to determine its classification, by convolutional neural network techniques—can begin by first defining the sequence of operations in a high level computer language, such as MatLab or C++ (sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

Many microprocessors are now amalgamations of several simpler microprocessors (termed "cores"). Such arrangements allow multiple operations to be executed in parallel.

(Some elements—such as the bus structure and cache memory may be shared between the cores.)

Examples of microprocessor structures include the Intel Xeon, Atom and Core-I series of devices. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data (e.g., pixels or pixel blocks). Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

GPUs are attractive structural choices for execution of the detailed arrangements, due to the nature of the data being processed, and the opportunities for parallelism.

While microprocessors can be reprogrammed, by suitable software, to perform a variety of different algorithms, ASICs cannot. While a particular Intel microprocessor might be programmed today to perform neural network item identification, and programmed tomorrow to prepare a user's tax return, an ASIC structure does not have this flexibility. Rather, an ASIC is designed and fabricated to serve a dedicated task, or limited set of tasks. It is purpose-built.

An ASIC structure comprises an array of circuitry that is custom-designed to perform a particular function. There are two general classes: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology. (A consequence of this hardware structure is that many of the fabricated gates—commonly a majority—are typically left unused.)

In full-custom ASICs, however, the arrangement of gates is custom-designed to serve the intended purpose (e.g., to perform a specified function). The custom design makes more efficient use of the available substrate space—allowing shorter signal paths and higher speed performance. Full-custom ASICs can also be fabricated to include analog components, and other circuits.

Generally speaking, ASIC-based implementations of the detailed arrangements offer higher performance, and consume less power, than implementations employing microprocessors. A drawback, however, is the significant time and expense required to design and fabricate circuitry that is tailor-made for one particular application.

An ASIC-based implementation of one of the above arrangements again can begin by defining the sequence of algorithm operations in a source code, such as MatLab or C++. However, instead of compiling to the native instruction set of a multipurpose microprocessor, the source code is compiled to a "hardware description language," such as VHDL (an IEEE standard), using a compiler such as HDL-Coder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to implement the above-detailed arrangements is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, a memory (which may be external). By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Again, the reconfigurable interconnect that characterizes FPGAs enables such additional elements to be incorporated at desired locations within a larger circuit.

Examples of FPGA structures include the Stratix FPGA from Altera (now Intel), and the Spartan FPGA from Xilinx.

As with the other hardware structures, implementation of the above-detailed arrangements begins by specifying the operations in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to implement the detailed arrangements. One structure employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Another hybrid approach, termed reconfigurable hardware by the Applicant, employs one or more ASIC elements. However, certain aspects of the ASIC operation can be reconfigured by parameters stored in one or more memories. For example, the weights of convolution kernels can be defined by parameters stored in a re-writable memory. By such arrangement, the same ASIC may be incorporated into two disparate devices, which employ different convolution kernels. One may be a device that employs a neural network to recognize grocery items. Another may be a device that employs a neural network to read license plates. The chips are all identically produced in a single semiconductor fab, but are differentiated in their end-use by different kernel data stored in memory (which may be on-chip or off).

Yet another hybrid approach employs application-specific instruction set processors (ASIPS). ASIPS can be thought of as microprocessors. However, instead of having multipurpose native instruction sets, the instruction set is tailored— in the design stage, prior to fabrication—to a particular intended use. Thus, an ASIP may be designed to include native instructions that serve operations associated with some or all of: convolution, max-pooling, ReLU, etc., etc. However, such native instruction set would lack certain of the instructions available in more general purpose microprocessors.

Reconfigurable hardware and ASIP arrangements are further detailed in application Ser. No. 14/842,575, filed Sep. 1, 2015, the disclosure of which is incorporated herein by reference.

In addition to the toolsets developed especially for neural networks, familiar image processing libraries such as OpenCV can be employed to perform many of the methods detailed in this specification. Software instructions for implementing the detailed functionality can also be authored by the artisan in C, C++, MatLab, Visual Basic, Java, Python, Tcl, Perl, Scheme, Ruby, etc., based on the descriptions provided herein.

Software and hardware configuration data/instructions are commonly stored as instructions in one or more data structures conveyed by tangible media, such as magnetic or optical discs, memory cards, ROM, etc., which may be accessed across a network.

Different of the functionality can be implemented on different devices. Thus, it should be understood that description of an operation as being performed by a particular device (e.g., a point of sale scanner) is not limiting but exemplary; performance of the operation by another device (e.g., a cloud computer), or shared between devices, is also expressly contemplated.

In like fashion, description of data being stored on a particular device is also exemplary; data can be stored anywhere: local device, remote device, in the cloud, distributed, etc.

Some of applicant's other work involving neural networks and machine learning is detailed in patent application Ser. No. 15/059,690, filed Mar. 3, 2016, Ser. No. 15/149,477, filed May 9, 2016, Ser. No. 15/255,114, filed Sep. 1, 2016, and in published applications 20150030201, 20150055855 and 20160187199.

The use of context to trigger and control certain operations—including image processing operations—is detailed in applicant's U.S. Pat. Nos. 8,805,110, 9,197,736, and 9,196,028. The former two documents also elaborate on the concept of recognition agents in smartphones and distributed systems.

Techniques related to capturing item images from different viewpoints, and related technologies, are detailed in applicant's published applications 20150016712 and 20140304122.

In some instances, an item may be identified by a steganographic digital watermark formed on the item or its packaging. Applicant's patent documents concerning digital watermarking include U.S. Pat. No. 6,590,996, publications 20160217547 and 20100150434, and pending application Ser. No. 15/211,944, filed Jul. 15, 2016.

Items may likewise be identified by barcode markings. Applicant's patent filings on barcode recognition include application Ser. No. 15/059,690, filed Mar. 3, 2016, and Ser. No. 15/094,925, filed Apr. 8, 2016.

Third party item recognition technologies are detailed in Girod et al, Mobile Visual Search, IEEE Signal Processing Magazine 28.4 (2011): 61-76, and in published patent applications 20150278224 (Nant Holdings) and 20160267358 (Microsoft). Techniques detailed in those documents can be advantageously incorporated into embodiments of applicant's technology.

This specification has discussed several different arrangements. It should be understood that the methods, elements and features detailed in connection with one arrangement can be combined with the methods, elements and features detailed in connection with other arrangements. While some such arrangements have been particularly described, many have not—due to the large number of permutations and combinations.

By way of example and not limitation, in the arrangement in which different images are successively examined to build confidence in an otherwise uncertain result, the later-submitted image frames may first be tested to confirm that they exhibit at least a threshold difference from the previously-submitted image, before being submitted for neural network analysis. Such test was not detailed in the description of such arrangement, but draws from a different arrangement.

Similarly, in this same arrangement, the respective thresholds (0.95, 0.9, etc.) can be cut in half if semantic segmentation indicates the image depicts two items, or in thirds if the image is found to depict three items. Again, such modification was not particularly detailed above, but is drawn from an arrangement detailed elsewhere.

Still further, the Amazon Mechanical Turk service was detailed in connection with one arrangement, but can be used in conjunction with others, to label training data.

In like fashion, the distributed architecture arrangements of FIGS. 28-34, employing both a local and a remote server, can be employed in conjunction with the arrangements earlier described.

While the focus of this specification has been on item recognition by neural networks and image fingerprinting, based on inherent appearance, it will be recognized that items may also be identified by machine-readable identifiers with which they are expressly encoded, such as barcodes and steganographic digital watermarks. Thus, embodiments that refer to either of the foregoing forms of item identification can likewise be practiced using the latter forms of item identification. (Each may be regarded as a type of "recognition agent" in the vocabulary of applicant's U.S. Pat. Nos. 8,805,110 and 9,197,736.)

The foregoing is just a small sampling of the features that can be interchanged between the different arrangements. Unless an artisan recognizes that combining a feature from one arrangement into another arrangement would render the latter inoperative, then such combination should be regarded as expressly anticipated by this specification.

To further illustrate, applicant details, below, a few of the ways in which features detailed herein can be combined into particular systems.

Various forms of pre-classification were detailed above, by which image data may be routed to a specialized recognition system particularly suited for that that type of data. (See, e.g., FIGS. 8 and 35, and associated discussions.) Pre-classification can be performed using neural network techniques, or using other technologies. Such other technologies can include characterizing the data by attributes such as color, texture, shape, contrast, frequency spectra, etc. The pre-classification can also categorize some image data as likely containing digital watermark data, overt barcode data, or other machine readable indicia, so that these types of data can be further-processed accordingly. Pre-classification can be performed on a mobile device, or on a remote device (e.g., server), or distributed between them.

Following the pre-classification (if any) are one or more recognition systems. These can similarly be implemented with various image processing technologies, e.g., neural network, local descriptors, bag of words, color, texture, shape, watermark and barcode reading, etc.—either singly, or in combination (e.g., as in FIGS. 36 and 37). Each such recognition system can be implemented on the mobile device, a remote server, an intermediate server (as in FIGS. 29-34) or distributed (e.g., in the manners detailed above in connection with FIGS. 26A and 26B). The technologies detailed in applicants' publications 20110212717, 20110161076, and 20130150117 can be employed, e.g., by which a system can select one or more specialized recognition agents to handle content data of different types, based on context, user profile data, auction competitions, etc.

After a recognition operation has been performed, the results can be checked using a different one of the above-noted image processing methods to verify the outcome, and to thereby further enhance accuracy (both false positive and item-confusion). Such verification can be performed on the mobile device, a remote server, an intermediate server, or distributed therebetween. Verification can be selectively applied, e.g., to results from certain types of recognition processes, and not others.

One particular embodiment—out of the many possible—employs a smartphone to capture and pre-classify audio and image content. If audio is classified as music, the smartphone derives fingerprint data from the captured audio and sends it to a Shazam server for music recognition. If audio is classified as speech, it is band-limited and sent to Nuance for speech recognition. If audio is classified as silence, attempts at recognition are suppressed.

If captured imagery is classified as possibly containing a barcode, the smartphone tries executing a barcode decoding operation on the image data to extract a payload. If the imagery is classified as possibly containing a digital watermark, the smartphone tries executing a digital watermark decoding operation on the image data to extract a payload. Meanwhile, if the imagery has any hallmarks of being an in-focus depiction of a scene (as opposed, e.g., to being wholly dark and/or devoid of edges, etc.), the smartphone computes image recognition fingerprints, and compares them against a locally-cached library of reference fingerprints—to try to perform a quick, local, recognition. (This operation is performed in addition to any attempted barcode/watermark decoding.) Some of the reference fingerprints are downloaded to the smartphone cache periodically from a remote service to allow recognition of items of transitory importance. Other reference fingerprints are static and serve to identify objects such as the SmartLabel logo that serves as a portal to nutritional information on foods, and other such graphical icons that may be of persistent interest to users.

If the captured imagery has hallmarks of text (e.g., exceeding a threshold value of local contrast and/or high frequency content), the smartphone immediately sends the imagery to a remote server that performs OCR on received imagery—while the processes described in the preceding paragraph may be on-going at the smartphone. If the remote server is able to decode text, it is returned to the smartphone, which can present same (or write the text into the smartphone's copy/paste buffer).

If fingerprints derived from the captured imagery do not match any of the fingerprint data cached at the smartphone, and if no barcode or watermark data is decoded, the smartphone sends the earlier-computed fingerprint data to two destinations: a remote service for matching with a large universe of reference fingerprint data, and an intermediate server, both transmissions being accompanied by a transaction ID. On finding a good match to the received imagery, the remote service sends related information—including the transaction ID, an identification of the recognized object, a match score, and homography, to the intermediate server. Based on the object identification, the intermediate server accesses a data structure to determine what type of verification operation should be employed on the image data earlier received from smartphone with the same transaction ID. If the remote server recognizes the object as Smucker's Simply Fruit seedless raspberry preserves, the data structure may indicate that the match should be verified by reference to text detection—in particular, the presence of the word "SEEDLESS" in the imagery. If the remote server recognizes the object as Dawn Ultra Dishwashing Liquid—Original Scent, the data structure may indicate that the match should be verified by reference to color histogram data confirming a large expanse of blue pixels (as contrasted, e.g., with the large expanse of yellow pixels that characterize Dawn Ultra Dishwashing Liquid—Lemon Scent). If the remote server recognizes the object as a box of Jiffy corn muffin mix, the data structure may indicate that the match should be verified by transforming the area of the captured imagery found to match such product in accordance with the homography parameters, and do a correlation of the result with reference data for Jiffy corn muffin mix available at a particular URL. The intermediate server undertakes whatever verification operation is indicated by the data structure and, if it confirms the remote server's object identification, forwards such identification to the smartphone for display or other action.

In a variant embodiment, recognition operations are performed by more than one device/system, and several results are combined to yield a final outcome (which may be termed decision fusion).

The smartphone operations detailed above may be performed by a single app on the smartphone, such as applicant's Digimarc Discover app, or they may involve several disparate apps.

Applicant similarly recognizes and intends that the methods, elements and concepts of this specification can be combined, substituted and interchanged—not just among and between themselves, but also with those known from the cited prior art.

For example, the prior art stochastic gradient descent methods that employ back-propagation techniques to train networks, detailed in incorporated-by-reference application 62/371,601, can be used with all of the above-detailed arrangements.

The Held paper, cited above and attached to incorporated-by-reference application 62/404,721, teaches that a network can be trained to recognize items from novel viewpoints, without use of training images depicting such items at such viewpoints, if multiple viewpoint depictions of other items are added to the training data set. Again, this technique, and the other techniques detailed in the cited papers, can be advantageously used in systems according to applicant's technology.

In addition to the prior art works identified above, other papers from which useful techniques can be drawn include:
Ouyang, et al, DeepID-Net: Deformable Deep Convolutional Neural Networks for Object Detection, Proc. IEEE Conference on Computer Vision and Pattern Recognition, 2015.

Yang, at al, Craft objects from images, Proc. IEEE Conference on Computer Vision and Pattern Recognition, 2016.

Zeng, et al, Gated Bi-directional CNN for Object Detection, European Conference on Computer Vision, 2016.

Ouyang, et al, Factors in Finetuning Deep Model for Object Detection with Long-tail Distribution, Proc. IEEE Conference on Computer Vision and Pattern Recognition, 2016.

Ouyang, et al, Learning Deep Representation with Large-scale Attributes, Prov. IEEE International Conference on Computer Vision, 2015.

Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of Applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, Applicant incorporates-by-reference each of the documents referenced herein. (Such materials are incorporated in their entireties, even if cited above in connection with specific of their teachings.) These references disclose technologies and teachings that Applicant intends be incorporated into the arrangements detailed herein, and into which the technologies and teachings presently-detailed be incorporated.

The invention claimed is:

1. A method of training a neural network, the network being trained to classify objects depicted in images, the method including the acts:

assigning training images to a plurality of buckets or pools corresponding thereto, said assigning including assigning training images that exemplify a first object class to a first bucket, and assigning training images that exemplify a second object class to a second bucket;

picking training images from said plurality of buckets to conduct a training cycle for the neural network;

changing contents of one or more of the plurality of buckets prior to conducting a next training cycle for the neural network;

wherein the method further includes:

discovering a hot-spot excerpt within a training image that depicts an object of a particular object class, said hot-spot excerpt being more important to classification of the image by the neural network than another excerpt within said training image;

creating a new image by overlaying a copy of said hot-spot excerpt on a background image; and assigning the new image to a bucket that is not associated with said particular object class, and presenting the new image to the neural network during a training cycle;

wherein presentation of the new image to the neural network has an effect of reducing importance of the hot-spot excerpt in classifying an image that depicts an object of said particular object class.

2. The method of claim 1 that further includes:

conducting a testing cycle before conducting said next training cycle, the testing cycle determining that the trained network has more difficulty in recognizing objects of the first object class than the second object class;

in said next training cycle, increasing a rate at which training images for said first object class are picked from the first bucket, compared to a rate at which training images for said second object class are picked from the second bucket.

3. The method of claim 2 in which said testing cycle determines a first recognition rate for the first object class and determines a second recognition rate for the second object class, and the method includes, in said next training cycle, picking training images from the first and second buckets in inverse proportion to said first and second recognition rates, respectively.

4. The method of claim 1 in which first and second of said buckets contain different numbers of training images.

5. The method of claim 1 in which said act of picking training images comprises picking training images from said plurality of buckets based on weights respectively associated with said buckets, wherein said weights are not all uniform.

6. The method of claim 5 that includes:

assigning training images that exemplify a third object class to a third bucket;

assigning training images that exemplify a fourth object class to a fourth bucket; and associating the third bucket with a weight, and associating the fourth bucket with said same weight;

wherein the third bucket and fourth buckets are assigned different numbers of training images, but due to their same weights, the third and fourth object classes are represented uniformly among training images presented to the neural network.

7. The method of claim 1 in which the neural network is trained to classify up to N classes of objects, and the plurality of buckets comprises more than N, wherein the method further includes:

assigning training images that exemplify none of said N classes of objects to one or more buckets of said plurality of buckets not associated with an object class; and picking training images from said plurality of buckets, including said one or more further buckets, based on weights respectively associated with said buckets, and presenting the picked training images to the neural network in said training cycle;

wherein one of said further buckets includes more training images than any bucket associated with an object class.

8. The method of claim 1 in which one of said object classes comprises images depicting a particular retail product, and at least one of said training images comprises a synthetically-generated image produced from imagery in a digital artwork file for packaging of said retail product, which imagery is texture-mapped onto a shape corresponding to said product, virtually imaged from a viewpoint, and overlaid over background imagery.

9. The method of claim 8 in which the synthetically-generated image is produced during said training cycle, rather than generated offline in a batch process.

10. The method of claim 1 in which the act of discovering comprises a step for discovering a hot-spot excerpt.

11. A method of training a neural network, the network being trained to classify objects depicted in images, the method including the acts:
assigning training images to a plurality of buckets or pools corresponding thereto, said assigning including assigning training images that exemplify a first object class to a first bucket, and assigning training images that exemplify a second object class to a second bucket;
picking training images from said plurality of buckets to conduct a training cycle for the neural network;
changing contents of one or more of the plurality of buckets prior to conducting a next training cycle for the neural network;
wherein the method further includes:
discovering a cold-spot excerpt within a first training image that depicts an object of a particular object class, said cold-spot excerpt being less important to classification of the image by the neural network than another excerpt within said training image;
generating a modified training image by obscuring the cold-spot excerpt from said first training image; and
assigning the modified training image to a bucket that is associated with said particular object class, and presenting the modified image to the neural network during training;
wherein said modified training image is richer in information useful to the neural network in classifying the training image than said training image prior to modification, and thus serves to help the neural network learn to distinguish depictions of said object from depictions of other objects.

12. The method of claim 11 that further includes:
conducting a testing cycle before conducting said next training cycle, the testing cycle determining that the trained network has more difficulty in recognizing objects of the first object class than the second object class;
in said next training cycle, increasing a rate at which training images for said first object class are picked from the first bucket, compared to a rate at which training images for said second object class are picked from the second bucket.

13. The method of claim 12 in which said testing cycle determines a first recognition rate for the first object class and determines a second recognition rate for the second object class, and the method includes, in said next training cycle, picking training images from the first and second buckets in inverse proportion to said first and second recognition rates, respectively.

14. The method of claim 11 in which first and second of said buckets contain different numbers of training images.

15. The method of claim 11 in which said act of picking training images comprises picking training images from said plurality of buckets based on weights respectively associated with said buckets, wherein said weights are not all uniform.

16. The method of claim 15 that includes:
assigning training images that exemplify a third object class to a third bucket;
assigning training images that exemplify a fourth object class to a fourth bucket; and
associating the third bucket with a weight, and associating the fourth bucket with said same weight;
wherein the third bucket and fourth buckets are assigned different numbers of training images, but due to their same weights, the third and fourth object classes are represented uniformly among training images presented to the neural network.

17. The method of claim 11 in which the neural network is trained to classify up to N classes of objects, and the plurality of buckets comprises more than N, wherein the method further includes:
assigning training images that exemplify none of said N classes of objects to one or more buckets of said plurality of buckets not associated with an object class; and
picking training images from said plurality of buckets, including said one or more further buckets, based on weights respectively associated with said buckets, and presenting the picked training images to the neural network in said training cycle;
wherein one of said further buckets includes more training images than any bucket associated with an object class.

18. The method of claim 11 in which one of said object classes comprises images depicting a particular retail product, and at least one of said training images comprises a synthetically-generated image produced from imagery in a digital artwork file for packaging of said retail product, which imagery is texture-mapped onto a shape corresponding to said product, virtually imaged from a viewpoint, and overlaid over background imagery.

19. The method of claim 18 in which the synthetically-generated image is produced during said training cycle, rather than generated offline in a batch process.

20. The method of claim 11 in which the act of discovering comprises a step for discovering a cold-spot excerpt.

21. The method of claim 1 that further includes modifying certain of said training images by adding glare spots thereto, and assigning the modified images to buckets from which training images are picked to conduct a training cycle for the neural network.

22. The method of claim 1 that further includes:
processing an image that exemplifies the first object class by: (i) separating said image into plural color planes; (ii) multiplying each color plane by a different scaling factor; and (iii) recombining the plural color planes after said multiplying, thereby producing a color-distorted image; and
assigning the color distorted image to said first bucket, for use in conducting a training cycle for the neural network.

23. The method of claim 1 in which the neural network is trained to classify up to N classes of objects, and comprises M output nodes that each produces a signal indicating a confidence that a depicted object belongs to a corresponding class, wherein M>N, wherein the first object class has a single output node corresponding thereto and the second object class has multiple output nodes corresponding thereto.

24. The method of claim 7 in which the plurality of buckets comprises at least N+2 buckets.

25. A neural network trained using the method of claim 1.

26. A neural network trained using the method of claim 11.

* * * * *

UNITED STATES PATENT AND TRADEMARK OFFICE
CERTIFICATE OF CORRECTION

PATENT NO. : 10,664,722 B1
APPLICATION NO. : 15/726290
DATED : May 26, 2020
INVENTOR(S) : Ravi K. Sharma et al.

Page 1 of 1

It is certified that error appears in the above-identified patent and that said Letters Patent is hereby corrected as shown below:

On the Title Page

Column 2, item (56) U.S. Patent Documents delete "1,000,786 A1" and insert --10,007,863 B1--.

Signed and Sealed this
Fourth Day of August, 2020

Andrei Iancu
*Director of the United States Patent and Trademark Office*